(12) United States Patent
Chen

(10) Patent No.: US 12,352,930 B2
(45) Date of Patent: Jul. 8, 2025

(54) IMAGING OPTICAL LENS ASSEMBLY INCLUDING NINE LENSES OF -+-++-+-, ++-++--+-, -+-++--+-, -+-++-++-, +--++--+- OR +--++-++- REFRACTIVE POWERS, IMAGE CAPTURING UNIT AND ELECTRONIC DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/586,107

(22) Filed: Feb. 23, 2024

(65) Prior Publication Data

US 2024/0201473 A1  Jun. 20, 2024

Related U.S. Application Data

(63) Continuation of application No. 18/101,029, filed on Jan. 24, 2023, now Pat. No. 11,947,088, which is a
(Continued)

(30) Foreign Application Priority Data

May 20, 2020 (TW) .................................. 109116712

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ....... G02B 13/0045; G02B 9/64; G02B 13/06
See application file for complete search history.

(56) References Cited

U.S. PATENT DOCUMENTS 5,161,060 A  11/1992  Watz
7,656,593 B2  2/2010  Do
(Continued)

FOREIGN PATENT DOCUMENTS

CN  101365975 A  2/2009
CN  101553748 A  10/2009
(Continued)

OTHER PUBLICATIONS

TW Office Action dated Oct. 7, 2020 as received in Application No. 109116712.
(Continued)

*Primary Examiner* — Wen Huang
(74) *Attorney, Agent, or Firm* — Maschoff Brennan

(57) ABSTRACT

An imaging optical lens assembly includes nine lens elements which are, in order from an object side to an image side along an optical path: a first lens element, a second lens element, a third lens element, a fourth lens element, a fifth lens element, a sixth lens element, a seventh lens element, an eighth lens element and a ninth lens element. The first lens element has positive refractive power. The eighth lens element with positive refractive power has an image-side surface being convex in a paraxial region thereof. The ninth lens element has an image-side surface being concave in a paraxial region thereof, and the image-side surface of the ninth lens element has at least one convex critical point in an off-axis region thereof.

12 Claims, 33 Drawing Sheets

Related U.S. Application Data continuation of application No. 16/991,973, filed on Aug. 12, 2020, now Pat. No. 11,598,935.

(56) References Cited

U.S. PATENT DOCUMENTS

| | | |
|---|---|---|
| 8,014,083 B2 | 9/2011 | Do |
| 2013/0162886 A1 | 6/2013 | Morooka et al. |
| 2017/0010441 A1 | 1/2017 | Kondo et al. |
| 2017/0307862 A1 | 10/2017 | Lin et al. |
| 2020/0209593 A1 | 7/2020 | Hirano |
| 2020/0209594 A1 | 7/2020 | Hirano |
| 2020/0393652 A1* | 12/2020 | Kuo ......................... G02B 9/64 |

FOREIGN PATENT DOCUMENTS

| | | |
|---|---|---|
| JP | H05-80252 A | 4/1993 |
| JP | H09-033811 A | 2/1997 |
| JP | 2013-125213 A | 6/2013 |
| TW | I684807 B | 2/2020 |
| TW | I691751 B | 4/2020 |

OTHER PUBLICATIONS

CN Office Action dated May 19, 2022 as received in Application No. 202010575753.0.

\* cited by examiner

IMAGING OPTICAL LENS ASSEMBLY INCLUDING NINE LENSES OF -++-++-+-, ++-++--+-, -+-++--+-, -+-++-++-, +--++--+- OR +--++-++- REFRACTIVE POWERS, IMAGE CAPTURING UNIT AND ELECTRONIC DEVICE

RELATED APPLICATIONS

This application is a continuation patent application of U.S. application Ser. No. 18/101,029 filed on Jan. 24, 2023, which is a continuation patent application of U.S. application Ser. No. 16/991,973 filed on Aug. 12, 2020, which claims priority to Taiwan Application 109116712, filed on May 20, 2020, which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens assembly includes nine lens elements. The nine lens elements are, in order from an object side to an image side along an optical path, a first lens element, a second lens element, a third lens element, a fourth lens element, a fifth lens element, a sixth lens element, a seventh lens element, an eighth lens element and a ninth lens element.

The first lens element has positive refractive power. The eighth lens element with positive refractive power has an image-side surface being convex in a paraxial region thereof. The ninth lens element has an image-side surface being concave in a paraxial region thereof, and the image-side surface of the ninth lens element has at least one convex critical point in an off-axis region thereof.

When a curvature radius of an object-side surface of the eighth lens element is R15, a curvature radius of the image-side surface of the eighth lens element is R16, and an f-number of the imaging optical lens assembly is Fno, the following conditions are satisfied:

$-0.75<(R15+R16)/(R15-R16)$; and $Fno<2.60$.

According to another aspect of the present disclosure, an imaging optical lens assembly includes nine lens elements. The nine lens elements are, in order from an object side to an image side along an optical path, a first lens element, a second lens element, a third lens element, a fourth lens element, a fifth lens element, a sixth lens element, a seventh lens element, an eighth lens element and a ninth lens element.

The first lens element has an image-side surface being concave in a paraxial region thereof. The second lens element has positive refractive power. The eighth lens element with positive refractive power has an image-side surface being convex in a paraxial region thereof. The ninth lens element with negative refractive power has an image-side surface being concave in a paraxial region thereof, and the image-side surface of the ninth lens element has at least one convex critical point in an off-axis region thereof.

When a curvature radius of an object-side surface of the eighth lens element is R15, a curvature radius of the image-side surface of the eighth lens element is R16, and an f-number of the imaging optical lens assembly is Fno, the following conditions are satisfied:

$-0.50<(R15+R16)/(R15-R16)$; and $Fno<2.60$.

According to another aspect of the present disclosure, an image capturing unit includes one of the aforementioned imaging optical lens assemblies and an image sensor, wherein the image sensor is disposed on an image surface of the imaging optical lens assembly.

According to another aspect of the present disclosure, an electronic device includes at least two image capturing units which face the same direction and include the aforementioned image capturing unit. Maximum fields of view of the at least two image capturing units are different from each other, and the maximum fields of view of the at least two image capturing units differ by at least 20 degrees.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
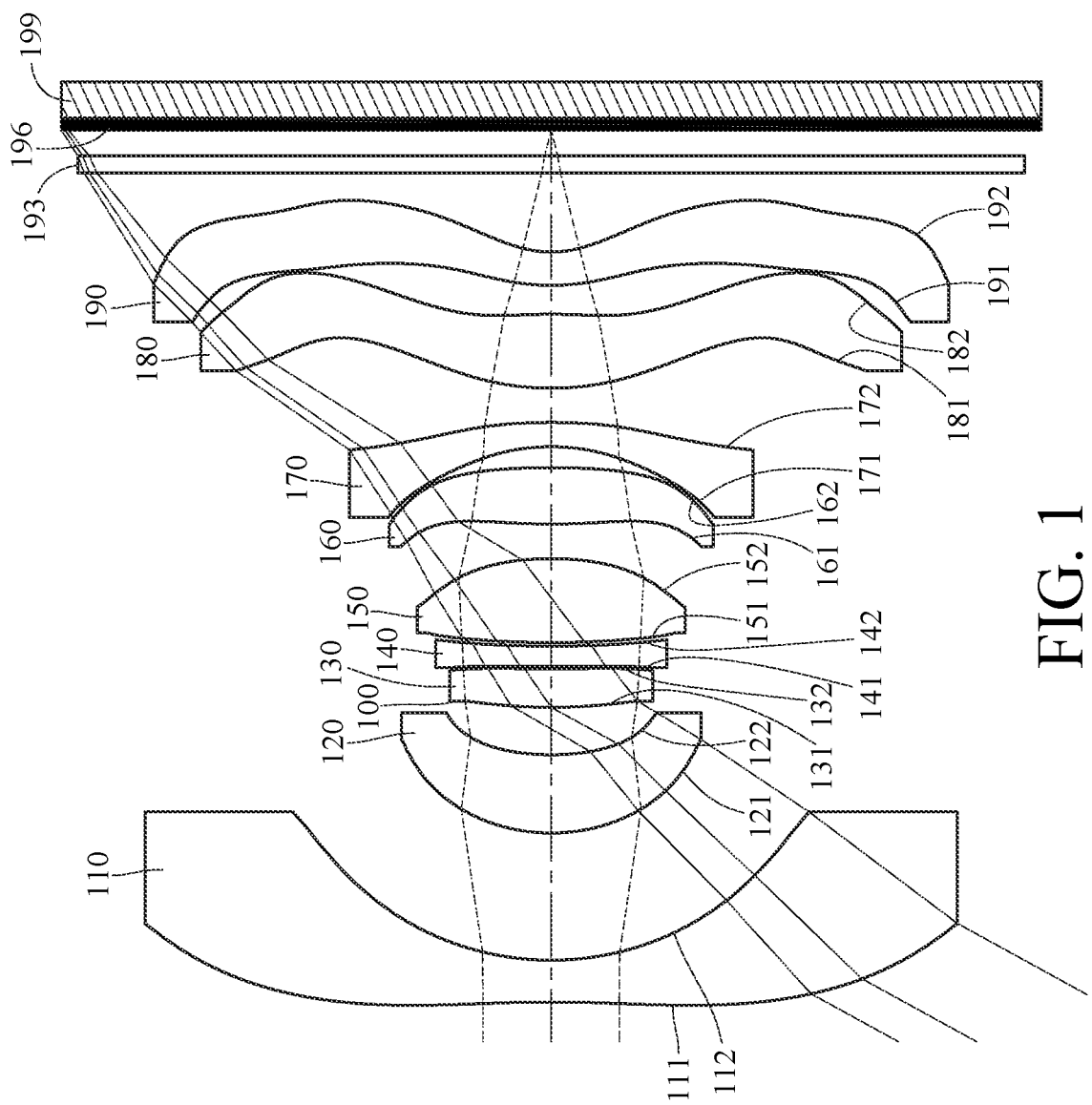
FIG. 1 is a schematic view of an image capturing unit according to the 1st embodiment of the present disclosure.

An imaging optical lens assembly includes nine lens elements. The nine lens elements are, in order from an object side to an image side along an optical path, a first lens element, a second lens element, a third lens element, a fourth lens element, a fifth lens element, a sixth lens element, a seventh lens element, an eighth lens element and a ninth lens element.

There can be an air gap in a paraxial region between each of all adjacent lens elements of the nine lens elements; that is, each of the first through ninth lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being properly cemented. In addition, during the cementing process, those two lens elements might not be well cemented due to misalignment, which is not favorable for the image quality. Therefore, having an air gap in a paraxial region between each of all adjacent lens elements of the imaging optical lens assembly in the present disclosure is favorable for preventing the problems of the cemented lens elements so as to improve the yield rate and to increase flexibility in designing the surface shapes of lens elements, thereby reducing the size of the imaging optical lens assembly and correcting aberrations.

The first lens element can have positive refractive power. Therefore, it is favorable for providing significant light convergence so as to effectively reduce the total track length of the imaging optical lens assembly for the requirement of miniaturization. The first lens element can have an object-side surface being concave in a paraxial region thereof. Therefore, it is favorable for adjusting the incident light path of the imaging optical lens assembly so as to improve image quality. The first lens element can have an image-side surface being concave in a paraxial region thereof. Therefore, it is favorable for adjusting the refractive power of the first lens element and correcting off-axis aberrations. At least one of the object-side surface and the image-side surface of the first lens element can have at least one critical point in an off-axis region thereof. Therefore, it is favorable for controlling the shape changes of the surfaces of the first lens element so as to improve peripheral image quality. Moreover, the object-side surface of the first lens element can have at least one convex critical point in an off-axis region thereof. Therefore, it is favorable for reducing the effective radius of the first lens element with a wide field of view so as to further reduce the size of the imaging optical lens assembly for configurations in various electronic devices or in devices with limited accommodation space. Please refer to FIG. 28, which shows a schematic view of a convex critical point C on the object-side surface 111 of the first lens element 110 according to the 1st embodiment of the present disclosure.

The second lens element can have positive refractive power. Therefore, it is favorable for correcting the light path after refraction by the first lens element.

The eighth lens element has positive refractive power. Therefore, it is favorable for providing significant positive refractive power so as to effectively enhance light convergence in front of an image surface. The eighth lens element has an image-side surface being convex in a paraxial region thereof. Therefore, it is favorable for adjusting the back focal length and further reducing the total track length of the imaging optical lens assembly. At least one of an object-side surface and the image-side surface of the eighth lens element can have at least one critical point in an off-axis region thereof. Therefore, it is favorable for improving the periphery illumination of the image surface and correcting aberrations at the image periphery. Please refer to FIG. 28, which shows a schematic view of critical points C on the object-side surface 181 and the image-side surface 182 of the eighth lens element 180 according to the 1st embodiment of the present disclosure.

Figure 28:
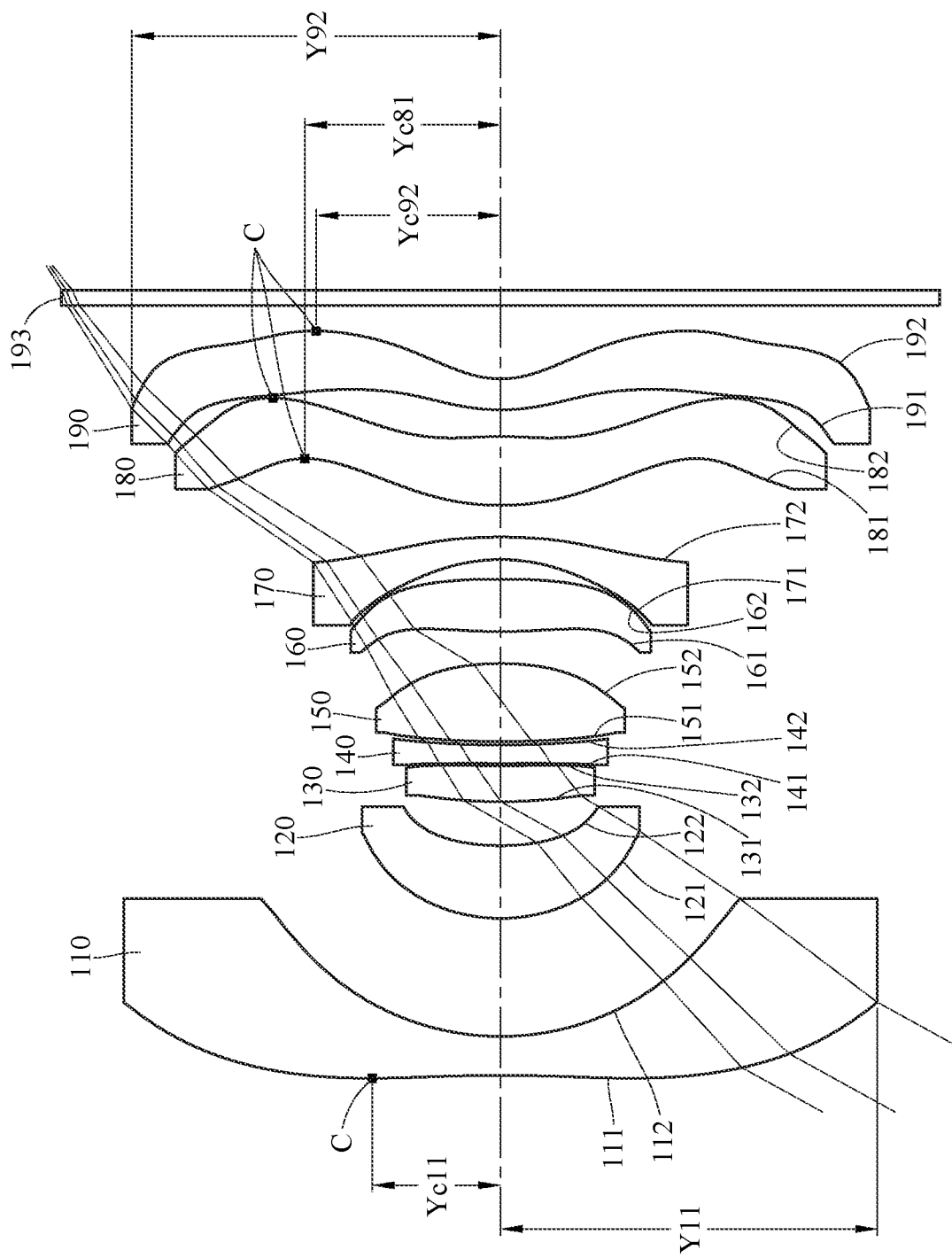
FIG. 28 shows a schematic view of Y11, Y92, Yc11, Yc81, Yc92 and several critical points of the lens elements according to the 1st embodiment of the present disclosure.

The ninth lens element can have negative refractive power. Therefore, it is favorable for adjusting the principle point and the back focal length while adjusting light on the image surface at a proper incident angle. The ninth lens element has an image-side surface being concave in a paraxial region thereof. Therefore, it is favorable for further adjusting the back focal length so as to satisfy the miniaturization requirement. The image-side surface of the ninth lens element has at least one convex critical point in an off-axis region thereof. Therefore, it is favorable for arranging the central light path with the periphery light path so as to obtain a proper back focal length for the imaging optical lens assembly. Please refer to FIG. 28, which shows a schematic view of critical points C on the object-side surface 191 and the image-side surface 192 of the ninth lens element 190 according to the 1st embodiment of the present disclosure. The critical points on the object-side surface of the first lens element, the object-side surface of the eighth lens element, the image-side surface of the eighth lens element, the object-side surface of the ninth lens element and the image-side surface of the ninth lens element in FIG. 28 are only exemplary. The other lens elements may also have one or more critical points.

When a curvature radius of the object-side surface of the eighth lens element is R15, and a curvature radius of the image-side surface of the eighth lens element is R16, the following condition is satisfied: $-0.75<(R15+R16)/(R15-R16)$. Therefore, it is favorable for providing the eighth lens element with sufficient structural strength and improved image quality. Moreover, the following condition can also be satisfied: $-0.50<(R15+R16)/(R15-R16)$. Moreover, the following condition can also be satisfied: $-0.30<(R15+R16)/(R15-R16)<4.0$. Moreover, the following condition can also be satisfied: $0.0<(R15+R16)/(R15-R16)<3.50$. Moreover, the following condition can also be satisfied: $0.30<(R15+R16)/(R15-R16)<3.0$.

When an f-number of the imaging optical lens assembly is Fno, the following condition is satisfied: $Fno<2.60$. Therefore, it is favorable for enhancing the aperture configuration so as to provide the imaging optical lens assembly sufficient incident light. Moreover, the following condition can also be satisfied: $1.0<Fno<2.30$. Moreover, the following condition can also be satisfied: $1.20<Fno<2.10$.

When a focal length of the imaging optical lens assembly is f, the curvature radius of the object-side surface of the eighth lens element is R15, and the curvature radius of the image-side surface of the eighth lens element is R16, the following condition can be satisfied: $1.0<|f/R15|+|f/R16|$. Therefore, the surface shape of the eighth lens element is favorable for correcting aberrations so as to improve image quality. Moreover, the following condition can also be satisfied: $1.33<|f/R15|+|f/R16|<8.0$.

When an axial distance between the object-side surface of the first lens element and the image surface is TL, and a maximum image height of the imaging optical lens assembly (half of a diagonal length of an effective photosensitive area of an image sensor) is ImgH, the following condition can be satisfied: $TL/ImgH<3.0$. Therefore, it is favorable for balancing between miniaturization and manufacturability of the imaging optical lens assembly. Moreover, the following condition can also be satisfied: $TL/ImgH<2.0$. Moreover, the following condition can also be satisfied: $1.0<TL/ImgH<1.50$.

When the focal length of the imaging optical lens assembly is f, the curvature radius of the image-side surface of the eighth lens element is R16, and a curvature radius of an object-side surface of the ninth lens element is R17, the following condition can be satisfied: $1.20<|f/R16|+|f/R17|$. Therefore, it is favorable for further reducing the back focal length so as to properly use the limited space inside the imaging optical lens assembly. Moreover, the following condition can also be satisfied: $1.60<|f/R16|+|f/R17|<8.0$.

When a vertical distance between a non-axial critical point on the object-side surface of the eighth lens element and an optical axis is Yc81, and a vertical distance between a non-axial critical point on the image-side surface of the ninth lens element and the optical axis is Yc92, the following condition can be satisfied: $0.50<Yc92/Yc81<2.30$. Therefore, it is favorable for correcting off-axis aberrations on the image side while controlling the back focal length. Moreover, the following condition can also be satisfied: $0.50<Yc92/Yc81<1.75$. Please refer to FIG. 28, which shows a schematic view of Yc81 and Yc92 according to the 1st embodiment of the present disclosure.

When a total number of lens elements having an Abbe number smaller than 40 in the imaging optical lens assembly is V40, the following condition can be satisfied: $4 \leq V40$. Therefore, it is favorable for correcting chromatic aberration. Moreover, when a total number of lens elements having an Abbe number smaller than 26 in the imaging optical lens assembly is V26, the following condition can be satisfied: $3 \leq V26$. Moreover, when a total number of lens elements having an Abbe number smaller than 20 in the imaging optical lens assembly is V20, the following condition can be satisfied: $2 \leq V20$.

When the axial distance between the object-side surface of the first lens element and the image surface is TL, and the focal length of the imaging optical lens assembly is f, the following condition can be satisfied: $TL/f<4.0$. Therefore, it is favorable for effectively controlling the total track length of the imaging optical lens assembly so as to be configured in various devices. Moreover, the following condition can also be satisfied: $TL/f<1.40$. Moreover, the following condition can also be satisfied: $1.40<TL/f<3.50$.

When a maximum field of view of the imaging optical lens assembly is FOV, the following condition can be satisfied: $90 \text{ [deg.]}<FOV<150 \text{ [deg.]}$. Therefore, it is favorable for providing the most commonly used imaging range so as to meet the specification requirement for the majority of products on the market. Moreover, the following condition can also be satisfied: $70 \text{ [deg.]}<FOV<105 \text{ [deg.]}$.

When a curvature radius of the image-side surface of the ninth lens element is R18, and the maximum image height of the imaging optical lens assembly is ImgH, the following condition can be satisfied: $R18/ImgH<1.0$. Therefore, it is favorable for reducing the back focal length so as to further minimize the total track length of the imaging optical lens assembly. Moreover, the following condition can also be satisfied: $R18/ImgH<0.75$. Moreover, the following condition can also be satisfied: $R18/ImgH<0.70$.

When the axial distance between the object-side surface of the first lens element and the image surface is TL, the maximum image height of the imaging optical lens assembly is ImgH, and a chief ray angle at a maximum image height position of the imaging optical lens assembly is CRA, the following condition can be satisfied: $TL/[ImgH \times tan(CRA)]<3.0$. Therefore, it is favorable for balancing between miniaturization and image quality of the imaging optical lens assembly. Moreover, the following condition can also be satisfied: $TL/[ImgH \times tan(CRA)]<2.30$. Please refer to FIG.

30, which shows a schematic view of CRA according to the 1st embodiment of the present disclosure, wherein a chief ray CR is projected on the image surface 196 at the maximum image height, and the angle between a normal line of the image surface 196 and the chief ray CR is the chief ray angle CRA.

Figure 29:
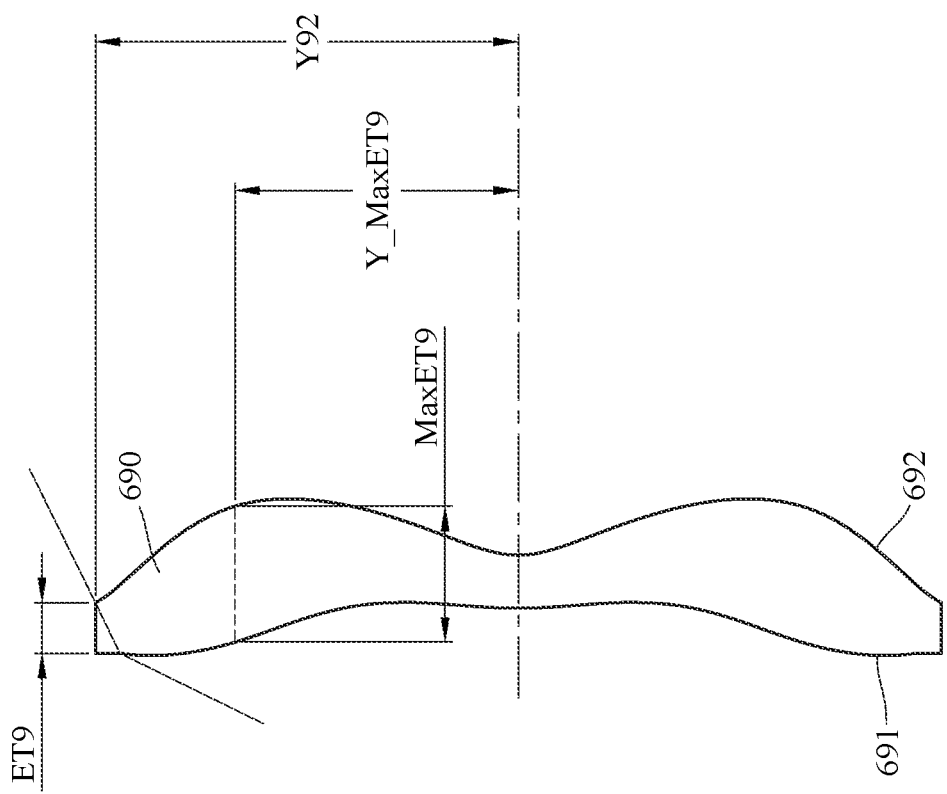
FIG. 29 shows a schematic view of Y92, ET9, MaxET9 and Y_MaxET9 according to the 6th embodiment of the present disclosure.
Figure 30:
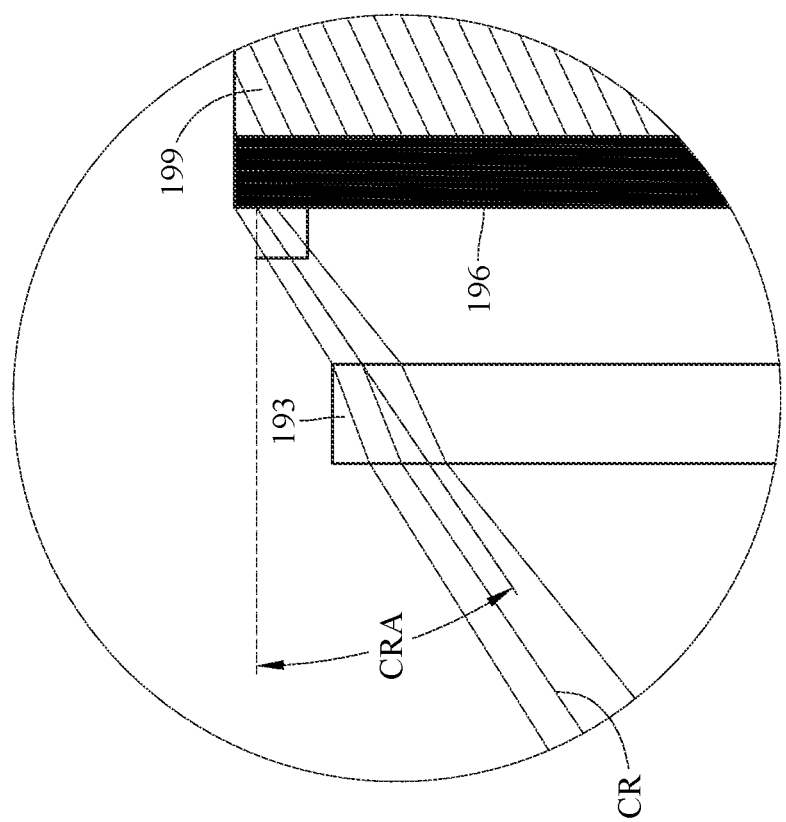
FIG. 30 shows a schematic view of CRA according to the 1st embodiment of the present disclosure.

When a maximum distance in parallel with the optical axis between the object-side surface and the image-side surface of the ninth lens element is MaxET9, and a distance in parallel with the optical axis between a maximum effective radius position of the object-side surface of the ninth lens element and a maximum effective radius position of the image-side surface of the ninth lens element is ET9, the following condition can be satisfied: 1.25<MaxET9/ET9<4.0. Therefore, it is favorable for ensuring the thickness of the ninth lens element is relatively uniform so as to provide sufficient structural strength. Moreover, the following condition can also be satisfied: 1.60<MaxET9/ET9<3.50. Please refer to FIG. 29, which shows a schematic view of MaxET9 and ET9 according to the 6th embodiment of the present disclosure.

When a maximum effective radius of the image-side surface of the ninth lens element is Y92, and an axial distance between the image-side surface of the ninth lens element and the image surface is BL, the following condition can be satisfied: 2.0<Y92/BL<20. Therefore, it is favorable for obtaining the proper back focal length so as to balance between miniaturization and image quality. Moreover, the following condition can also be satisfied: 3.0<Y92/BL<15. Moreover, the following condition can also be satisfied: 4.0<Y92/BL<10. Please refer to FIG. 28, which shows a schematic view of Y92 according to the 1st embodiment of the present disclosure.

When an axial distance between the object-side surface of the first lens element and the image-side surface of the ninth lens element is Td, and a sum of central thicknesses of all lens elements of the imaging optical lens assembly is ΣCT, the following condition can be satisfied: Td/ΣCT<2.0. Therefore, it is favorable for preventing overly large or small space between adjacent lens elements so as to optimize the space utilization of lens elements. Moreover, the following condition can also be satisfied: Td/ΣCT<1.80. Moreover, the following condition can also be satisfied: 1.20<Td/ΣCT<1.70.

When a minimum value among Abbe numbers of all lens elements of the imaging optical lens assembly is Vmin, the following condition can be satisfied: Vmin<20. Therefore, it is favorable for correcting chromatic aberration.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, and a refractive index of the i-th lens element is Ni, at least one lens element of the imaging optical lens assembly can satisfy the following condition: 6.0<Vi/Ni<12.0, wherein i=1, 2, 3, 4, 5, 6, 7, 8 or 9. Therefore, it is favorable for controlling the lens material and thus correcting chromatic aberration. Moreover, at least one lens element of the imaging optical lens assembly can also satisfy the following condition: 6.0<Vi/Ni<11.2, wherein i=1, 2, 3, 4, 5, 6, 7, 8 or 9. Moreover, at least one lens element of the imaging optical lens assembly can also satisfy the following condition: 7.5<Vi/Ni<10, wherein i=1, 2, 3, 4, 5, 6, 7, 8 or 9.

When a vertical distance between a non-axial critical point on the object-side surface of the first lens element and the optical axis is Yc11, and a maximum effective radius of the object-side surface of the first lens element is Y11, the following condition can be satisfied: Yc11/Y11<0.75. Therefore, it is favorable for reducing the effective radius of the first lens element with a wide field of view so as to further minimize the imaging optical lens assembly for applications in various electronic devices or in devices with limited accommodation space. Moreover, the following condition can also be satisfied: 0.05<Yc11/Y11<0.60. Please refer to FIG. 28, which shows a schematic view of Yc11 and Y11 according to the 1st embodiment of the present disclosure.

When the focal length of the imaging optical lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, and a focal length of the ninth lens element is f9, the following conditions can be satisfied: −1.5<f/f1<4.0; −3.0<f/f2<2.0; −3.0<f/f3<3.0; −3.0<f/f4<3.0; −3.0<f/f5<3.0; −3.0<f/f6<3.0; −3.0<f/f7<3.0; 0<f/f8<4.0; and −4.0<f/f9<2.0. Therefore, it is favorable for preventing overly large differences of refractive power among lens elements so as to prevent excessive image corrections or generation of ghost images due to extreme changes in surface shapes of lens elements. Moreover, the following conditions can also be satisfied: −1.0<f/f1<2.50; −1.50<f/f2<1.0; —2.0<f/f3<2.0; −2.0<f/f4<2.0; −2.0<f/f5<2.0; −2.0<f/f6<2.0; −2.0<f/f7<2.0; 0.50<f/f8<3.50; and −4.0<f/f9<0.0. Moreover, the following condition can also be satisfied: 1.0<f/f8<3.0. Moreover, the following condition can also be satisfied: −3.50<f/f9<−0.50. Moreover, the following condition can also be satisfied: −3.0<f/f9<−1.0.

When a vertical distance from the optical axis to a position representing the maximum distance in parallel with the optical axis between the object-side surface and the image-side surface of the ninth lens element is Y_MaxET9 (i.e., when the maximum distance in parallel with the optical axis between the object-side surface and the image-side surface of the ninth lens element is MaxET9, a vertical distance from the optical axis to a position where said maximum distance (MaxET9) is located is Y_MaxET9), and the maximum effective radius of the image-side surface of the ninth lens element is Y92, the following condition can be satisfied: 0.40<Y_MaxET9/Y92<0.80. Therefore, it is favorable for providing the ninth lens element with sufficient structural strength. Moreover, the following condition can also be satisfied: 0.50<Y_MaxET9/Y92<0.75. Please refer to FIG. 29, which shows a schematic view of MaxET9, Y_MaxET9 and Y92 according to the 6th embodiment of the present disclosure.

According to the present disclosure, the aforementioned features and conditions can be utilized in numerous combinations so as to achieve corresponding effects.

According to the present disclosure, the lens elements of the imaging optical lens assembly can be made of either glass or plastic material. When the lens elements are made of glass material, the refractive power distribution of the imaging optical lens assembly may be more flexible, and the influence on imaging caused by external environment temperature change may be reduced. The glass lens element can either be made by grinding or molding. When the lens elements are made of plastic material, the manufacturing costs can be effectively reduced. Moreover, at least half number of lens elements of the imaging optical lens assembly provided by the present disclosure can be made of plastic material. Therefore, it is favorable for increasing shape design flexibility of lens elements, which is favorable for manufacturing lens elements and correcting aberrations. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the imaging optical lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, the image surface of the imaging optical lens assembly, based on the corresponding image sensor, can be flat or curved, especially a curved surface being concave facing towards the object side of the imaging optical lens assembly.

According to the present disclosure, an image correction unit, such as a field flattener, can be optionally disposed between the lens element closest to the image side of the imaging optical lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 31:
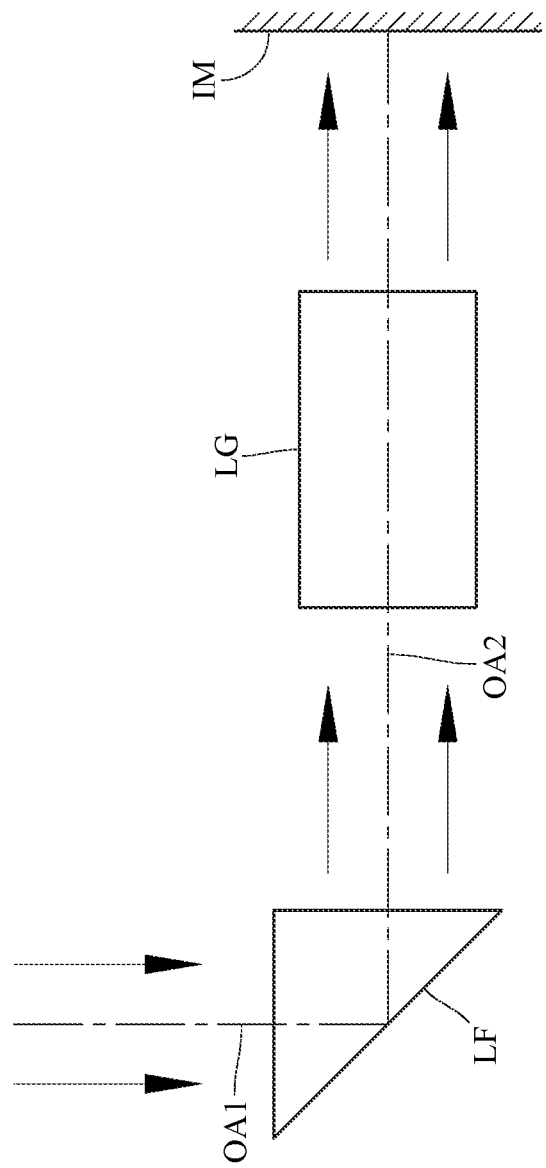
FIG. 31 shows a schematic view of a configuration of a light-folding element in an imaging optical lens assembly according to one embodiment of the present disclosure.
Figure 32:
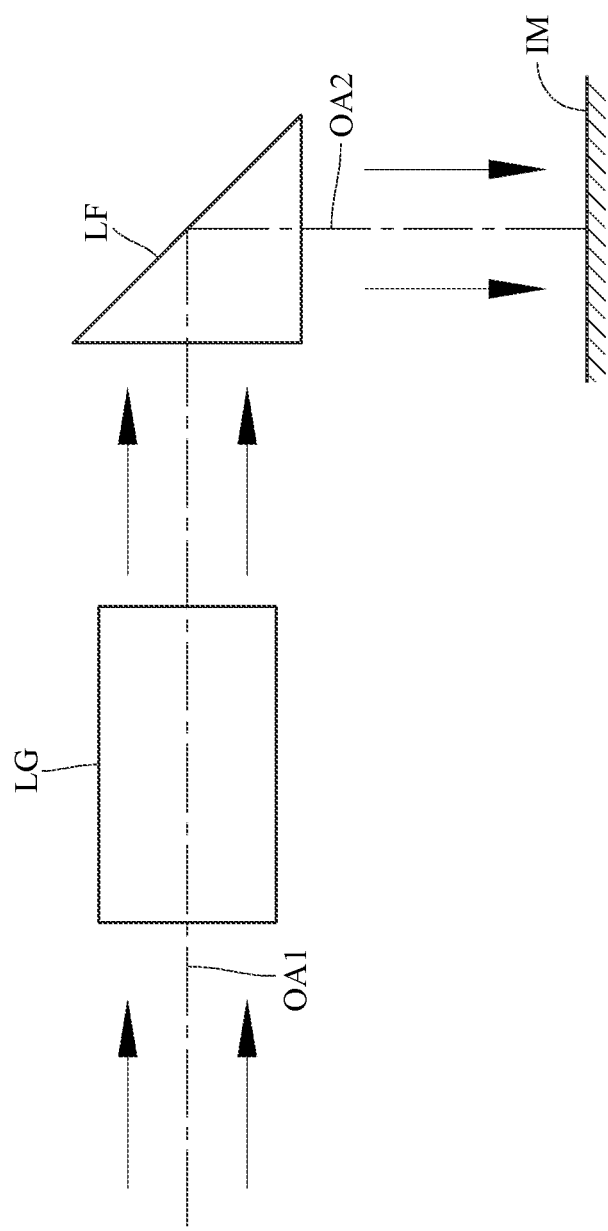
FIG. 32 shows a schematic view of another configuration of a light-folding element in an imaging optical lens assembly according to one embodiment of the present disclosure.
Figure 33:
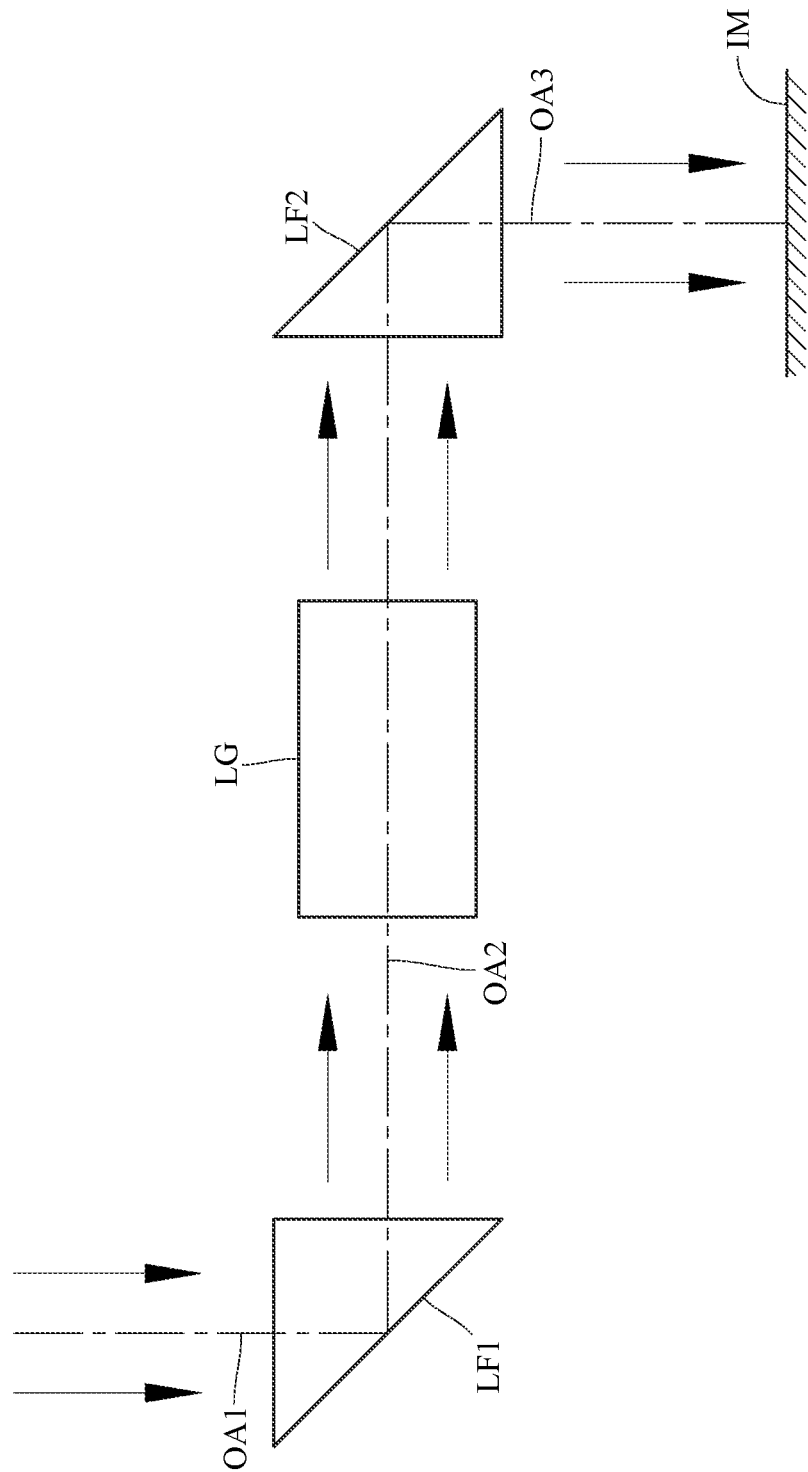
FIG. 33 shows a schematic view of a configuration of two light-folding elements in an imaging optical lens assembly according to one embodiment of the present disclosure.

According to the present disclosure, at least one light-folding element, such as a prism or a mirror, can be optionally disposed between an imaged object and the image surface on the imaging optical path, such that the imaging optical lens assembly can be more flexible in space arrangement, and therefore the dimensions of an electronic device is not restricted by the total track length of the imaging optical lens assembly. Specifically, please refer to FIG. 31 and FIG. 32. FIG. 31 shows a schematic view of a configuration of a light-folding element in an imaging optical lens assembly according to one embodiment of the present disclosure, and FIG. 32 shows a schematic view of another configuration of a light-folding element in an imaging optical lens assembly according to one embodiment of the present disclosure. In FIG. 31 and FIG. 32, the imaging optical lens assembly can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the imaging optical lens assembly as shown in FIG. 31 or disposed between a lens group LG of the imaging optical lens assembly and the image surface IM as shown in FIG. 32. Furthermore, please refer to FIG. 33, which shows a schematic view of a configuration of two light-folding elements in an imaging optical lens assembly according to one embodiment of the present disclosure. In FIG. 33, the imaging optical lens assembly can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging optical lens assembly, the second light-folding element LF2 is disposed between the lens group LG of the imaging optical lens assembly and the image surface IM, and the travelling direction of light on the first optical axis OA1 can be the same direction as the travelling direction of light on the third optical axis OA3 as shown in FIG. 33. The imaging optical lens assembly can be optionally provided with three or more light-folding elements, and the present disclosure is not limited to the type, amount and position of the light-folding elements of the embodiments disclosed in the aforementioned figures.

According to the present disclosure, the imaging optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens assembly and thereby provides a wider field of view for the same.

According to the present disclosure, the imaging optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
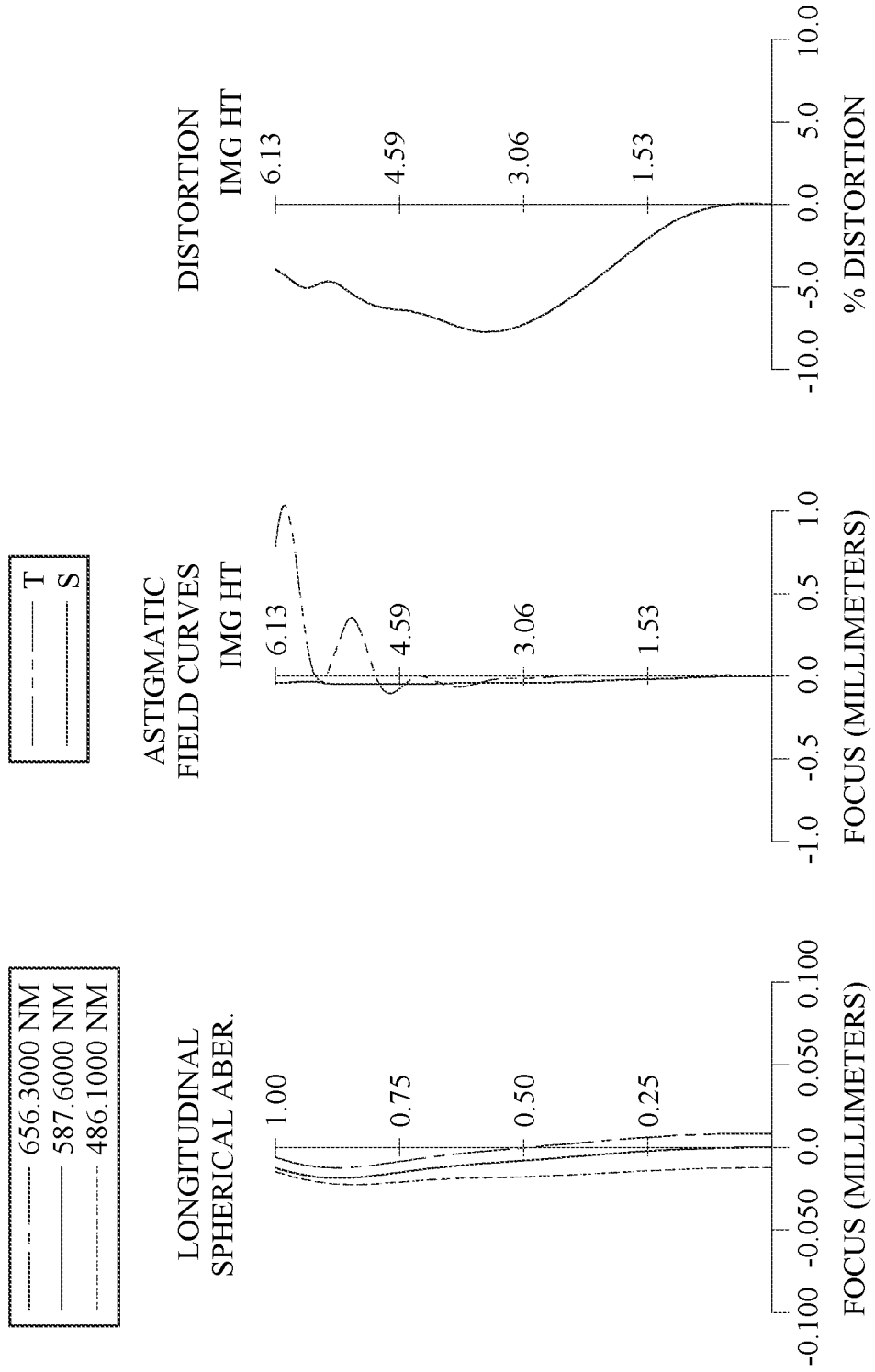
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens assembly (its reference numeral is omitted) of the present disclosure and an image sensor 199. The imaging optical lens assembly includes, in order from an object side to an image side along an optical path, a first lens element 110, a second lens element 120, an aperture stop 100, a third lens element 130, a fourth lens element 140, a fifth lens element 150, a sixth lens element 160, a seventh lens element 170, an eighth lens element 180, a ninth lens element 190, an IR-cut filter 193 and an image surface 196. In addition, the aperture stop 100 is attached on an object-side surface 131 of the third lens element 130. The imaging optical lens assembly includes nine lens elements (110, 120, 130, 140, 150, 160, 170, 180 and 190) with no additional lens element disposed between each of the adjacent nine lens elements, wherein there is an air gap between each of all adjacent lens elements.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has at least one convex critical point in an off-axis region thereof.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has the object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric.

The seventh lens element 170 with negative refractive power has an object-side surface 171 being concave in a paraxial region thereof and an image-side surface 172 being convex in a paraxial region thereof. The seventh lens element 170 is made of plastic material and has the object-side surface 171 and the image-side surface 172 being both aspheric.

The eighth lens element 180 with positive refractive power has an object-side surface 181 being convex in a paraxial region thereof and an image-side surface 182 being convex in a paraxial region thereof. The eighth lens element 180 is made of plastic material and has the object-side surface 181 and the image-side surface 182 being both aspheric. The object-side surface 181 of the eighth lens element 180 has at least one critical point in an off-axis region thereof. The image-side surface 182 of the eighth lens element 180 has at least one critical point in an off-axis region thereof.

The ninth lens element 190 with negative refractive power has an object-side surface 191 being convex in a paraxial region thereof and an image-side surface 192 being concave in a paraxial region thereof. The ninth lens element 190 is made of plastic material and has the object-side surface 191 and the image-side surface 192 being both aspheric. The image-side surface 192 of the ninth lens element 190 has at least one convex critical point in an off-axis region thereof.

The IR-cut filter 193 is made of glass material and located between the ninth lens element 190 and the image surface 196, and will not affect the focal length of the imaging optical lens assembly. The image sensor 199 is disposed on or near the image surface 196 of the imaging optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22 and 24.

In the imaging optical lens assembly of the image capturing unit according to the 1st embodiment, when a focal length of the imaging optical lens assembly is f, an f-number of the imaging optical lens assembly is Fno, and half of a maximum field of view of the imaging optical lens assembly is HFOV, these parameters have the following values: f=3.52 millimeters (mm), Fno=2.05, HFOV=61.2 degrees (deg.).

When the maximum field of view of the imaging optical lens assembly is FOV, the following condition is satisfied: FOV=122.4 [deg.].

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, an Abbe number of the eighth lens element 180 is V8, an Abbe number of the ninth lens element 190 is V9, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, a refractive index of the eighth lens element 180 is N8, and a refractive index of the ninth lens element 190 is N9, the following conditions are satisfied: V1/N1=37.34; V2/N2=19.74; V3/N3=36.26; V4/N4=10.90; V5/N5=36.26; V6/N6=36.26; V7/N7=12.84; V8/N8=36.26; and V9/N9=36.46.

When a total number of lens elements having an Abbe number smaller than 20 in the imaging optical lens assembly is V20, the following condition is satisfied: V20=1.

When a total number of lens elements having an Abbe number smaller than 26 in the imaging optical lens assembly is V26, the following condition is satisfied: V26=2.

When a total number of lens elements having an Abbe number smaller than 40 in the imaging optical lens assembly is V40, the following condition is satisfied: V40=3.

When a minimum value among Abbe numbers of all lens elements of the imaging optical lens assembly is Vmin, the following condition is satisfied: Vmin=18.4. In this embodiment, among the first through ninth lens elements (110-190), the Abbe number of the fourth lens element 140 is smaller than Abbe numbers of the other lens elements, and Vmin is equal to the Abbe number of the fourth lens element 140.

When an axial distance between the object-side surface 111 of the first lens element 110 and the image-side surface 192 of the ninth lens element 190 is Td, and a sum of central thicknesses of all lens elements of the imaging optical lens assembly is ECT, the following condition is satisfied: Td/ECT=1.66. In this embodiment, ECT is a sum of central thicknesses of the first lens element 110, the second lens element 120, the third lens element 130, the fourth lens element 140, the fifth lens element 150, the sixth lens element 160, the seventh lens element 170, the eighth lens element 180 and the ninth lens element 190.

When an axial distance between the object-side surface 111 of the first lens element 110 and the image surface 196 is TL, and the focal length of the imaging optical lens assembly is f, the following condition is satisfied: TL/f=3.13.

When the axial distance between the object-side surface 111 of the first lens element 110 and the image surface 196 is TL, and a maximum image height of the imaging optical lens assembly is ImgH, the following condition is satisfied: TL/ImgH=1.80.

When the axial distance between the object-side surface 111 of the first lens element 110 and the image surface 196 is TL, the maximum image height of the imaging optical lens assembly is ImgH, and a chief ray angle at a maximum image height position of the imaging optical lens assembly is CRA, the following condition is satisfied: TL/[ImgH×tan(CRA)]=2.67.

When a curvature radius of the object-side surface 181 of the eighth lens element 180 is R15, and a curvature radius of the image-side surface 182 of the eighth lens element 180 is R16, the following condition is satisfied: (R15+R16)/(R15−R16)=−0.20.

When the focal length of the imaging optical lens assembly is f, the curvature radius of the object-side surface 181 of the eighth lens element 180 is R15, and the curvature radius of the image-side surface 182 of the eighth lens element 180 is R16, the following condition is satisfied: |f/R15|+|f/R16|=1.64.

When the focal length of the imaging optical lens assembly is f, the curvature radius of the image-side surface 182 of the eighth lens element 180 is R16, and a curvature radius of the object-side surface 191 of the ninth lens element 190 is R17, the following condition is satisfied: |f/R16|+|f/R17|=1.94.

When a curvature radius of the image-side surface 192 of the ninth lens element 190 is R18, and a maximum image height of the imaging optical lens assembly is ImgH, the following condition is satisfied: R18/ImgH=0.21.

When a maximum effective radius of the image-side surface 192 of the ninth lens element 190 is Y92, and an axial distance between the image-side surface 192 of the ninth lens element 190 and the image surface 196 is BL, the following condition is satisfied: Y92/BL=3.25.

When a vertical distance between a non-axial critical point on the object-side surface 111 of the first lens element 110 and the optical axis is Yc11, and a maximum effective radius of the object-side surface 111 of the first lens element 110 is Y11, the following condition is satisfied: Yc11/Y11=0.35.

When a vertical distance between a non-axial critical point on the object-side surface 181 of the eighth lens element 180 and the optical axis is Yc81, and a vertical distance between a non-axial critical point on the image-side surface 192 of the ninth lens element 190 and the optical axis is Yc92, the following condition is satisfied: Yc92/Yc81=0.95.

When a maximum distance in parallel with the optical axis between the object-side surface 191 and the image-side surface 192 of the ninth lens element 190 is MaxET9, and a distance in parallel with the optical axis between a maximum effective radius position of the object-side surface 191 of the ninth lens element 190 and a maximum effective radius position of the image-side surface 192 of the ninth lens element 190 is ET9, the following condition is satisfied: MaxET9/ET9=2.39.

When a vertical distance from the optical axis to a position representing the maximum distance in parallel with the optical axis between the object-side surface 191 and the image-side surface 192 of the ninth lens element 190 is Y_MaxET9, and the maximum effective radius of the image-side surface 192 of the ninth lens element 190 is Y92, the following condition is satisfied: Y_MaxET9/Y92=0.90.

When the focal length of the imaging optical lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, a focal length of the eighth lens element 180 is f8, and a focal length of the ninth lens element 190 is f9, following conditions are satisfied: f/f1=−0.61; f/f2=0.34; f/f3=0.23; f/f4=−0.17; f/f5=0.64; f/f6=0.44; f/f7=−0.59; f/f8=0.86; and f/f9=−0.71.

The detailed optical data of the 1st embodiment are shown in Table 1 and the aspheric surface data are shown in Table 2 below.

TABLE 1

1st Embodiment
f = 3.52 mm, Fno = 2.05, HFOV = 61.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −17.296 | (ASP) | 0.528 | Plastic | 1.515 | 56.6 | −5.72 |
| 2 | | 3.584 | (ASP) | 1.605 | | | | |
| 3 | Lens 2 | 2.310 | (ASP) | 0.988 | Plastic | 1.591 | 31.4 | 10.25 |
| 4 | | 3.143 | (ASP) | 0.599 | | | | |
| 5 | Lens 3 | 7.121 | (ASP) | 0.488 | Plastic | 1.544 | 56.0 | 15.26 |
| 6 | | 48.773 | (ASP) | 0.032 | | | | |
| 7 | Lens 4 | 157.255 | (ASP) | 0.250 | Plastic | 1.686 | 18.4 | −20.89 |
| 8 | | 13.129 | (ASP) | 0.046 | | | | |
| 9 | Lens 5 | 11.462 | (ASP) | 1.060 | Plastic | 1.544 | 56.0 | 5.47 |
| 10 | | −3.888 | (ASP) | 0.436 | | | | |
| 11 | Lens 6 | 7.096 | (ASP) | 0.712 | Plastic | 1.544 | 56.0 | 8.08 |
| 12 | | −11.127 | (ASP) | 0.265 | | | | |
| 13 | Lens 7 | −2.560 | (ASP) | 0.306 | Plastic | 1.656 | 21.3 | −5.91 |
| 14 | | −7.892 | (ASP) | 0.432 | | | | |
| 15 | Lens 8 | 3.578 | (ASP) | 0.935 | Plastic | 1.544 | 56.0 | 4.10 |
| 16 | | −5.366 | (ASP) | 0.363 | | | | |
| 17 | Lens 9 | 2.740 | (ASP) | 0.420 | Plastic | 1.534 | 55.9 | −4.97 |
| 18 | | 1.277 | (ASP) | 1.000 | | | | |
| 19 | IR-cut filter | Plano | | 0.210 | Glass | 1.517 | 64.2 | — |
| 20 | | Plano | | 0.331 | | | | |
| 21 | Image | Plano | | 0.000 | | | | |

Note:
Reference wavelength is 587.6 nm (d-line).
The aperture stop 100 is located on the object-side surface 131 (Surface 5).
An effective radius of the object-side surface 181 (Surface 15) is 3.970 mm.

TABLE 2

Aspheric Coefficients

| Surface # | 1 | 2 | 3 | 4 | 5 |
|---|---|---|---|---|---|
| k = | −9.9000E+01 | −3.1280E−01 | 2.5641E−02 | 3.0490E+00 | −3.4664E+00 |
| A4 = | 3.7972E−03 | −1.2114E−03 | −4.8821E−04 | 1.9813E−02 | 2.1922E−03 |
| A6 = | −7.0074E−05 | 9.1465E−04 | 5.1027E−03 | 2.2066E−02 | 6.1279E−03 |
| A8 = | −2.0921E−05 | −2.0240E−04 | −6.4883E−03 | −6.0807E−02 | −3.3035E−02 |
| A10 = | 3.3467E−06 | 5.2806E−05 | 9.1445E−03 | 1.5368E−01 | 7.3160E−02 |
| A12 = | −2.5930E−07 | −1.3865E−05 | −7.6884E−03 | −2.2827E−01 | −1.0508E−01 |
| A14 = | 1.2320E−08 | 2.3529E−06 | 4.0589E−03 | 2.1157E−01 | 9.6858E−02 |
| A16 = | −3.6530E−10 | −2.1401E−07 | −1.2938E−03 | −1.1735E−01 | −5.6316E−02 |
| A18 = | 6.2570E−12 | 9.2416E−09 | 2.2987E−04 | 3.5856E−02 | 1.8913E−02 |
| A20 = | −4.7681E−14 | −1.4467E−10 | −1.7459E−05 | −4.6086E−03 | −2.8505E−03 |

| Surface # | 6 | 7 | 8 | 9 | 10 |
|---|---|---|---|---|---|
| k = | −1.0000E+00 | −1.0000E+00 | −3.4484E+01 | −4.9698E+00 | −1.1561E+01 |
| A4 = | 7.2730E−03 | 3.5007E−03 | 5.6641E−03 | 4.9173E−03 | −6.6966E−02 |
| A6 = | −6.8161E−02 | −5.7645E−02 | −3.1830E−02 | −2.2288E−02 | 3.0288E−02 |
| A8 = | 1.4585E−01 | 1.2029E−01 | 6.4224E−02 | 3.6668E−02 | −3.8723E−02 |
| A10 = | −2.2130E−01 | −1.5466E−01 | −6.6729E−02 | −3.3999E−02 | 4.0354E−02 |
| A12 = | 2.3787E−01 | 1.4263E−01 | 4.2162E−02 | 1.9305E−02 | −3.0599E−02 |
| A14 = | −1.7967E−01 | −9.8994E−02 | −1.6552E−02 | −6.4302E−03 | 1.5874E−02 |
| A16 = | 8.7935E−02 | 4.7560E−02 | 3.7884E−03 | 1.1504E−03 | −5.2679E−03 |
| A18 = | −2.4243E−02 | −1.3287E−02 | −4.1705E−04 | −8.0193E−05 | 1.0024E−03 |
| A20 = | 2.7606E−03 | 1.5608E−03 | 1.0500E−05 | −1.3794E−06 | −8.1570E−05 |

TABLE 2-continued

Aspheric Coefficients

| Surface # | 11 | 12 | 13 | 14 | 15 |
|---|---|---|---|---|---|
| k = | −1.1612E+01 | −9.0000E+01 | −3.0734E+00 | 1.1558E+00 | −3.2766E+00 |
| A4 = | −3.7127E−02 | −2.2332E−02 | −1.5108E−02 | −2.1285E−02 | 1.9428E−02 |
| A6 = | 1.3692E−02 | −2.1752E−02 | −2.8846E−02 | −1.1254E−03 | −8.6980E−03 |
| A8 = | −1.0854E−02 | 3.6772E−02 | 4.9540E−02 | 1.0165E−02 | 1.4585E−03 |
| A10 = | 3.7636E−03 | −3.0695E−02 | −3.4386E−02 | −5.2739E−03 | −9.7640E−05 |
| A12 = | −1.0013E−03 | 1.4829E−02 | 1.3710E−02 | 1.3573E−03 | −7.7868E−06 |
| A14 = | 3.7458E−04 | −4.5274E−03 | −3.4824E−03 | −2.0344E−04 | 1.9068E−06 |
| A16 = | −1.5521E−04 | 8.6484E−04 | 5.6491E−04 | 1.8047E−05 | −1.3846E−07 |
| A18 = | 3.6362E−05 | −9.4050E−05 | −5.3446E−05 | −8.8221E−07 | 4.5588E−09 |
| A20 = | −3.2360E−06 | 4.4247E−06 | 2.1990E−06 | 1.8406E−08 | −5.7917E−11 |

| Surface # | 16 | 17 | 18 |
|---|---|---|---|
| k = | −5.8253E+01 | −1.2174E+00 | −2.8796E+00 |
| A4 = | 9.7015E−02 | −6.8284E−03 | −2.3656E−02 |
| A6 = | −3.6627E−02 | −3.1458E−02 | −5.7674E−03 |
| A8 = | 8.3603E−03 | 1.5462E−02 | 3.6810E−03 |
| A10 = | −1.2743E−03 | −3.8108E−03 | −7.8844E−04 |
| A12 = | 1.2907E−04 | 5.7478E−04 | 9.0872E−05 |
| A14 = | −8.5012E−06 | −5.6382E−05 | −6.1460E−06 |
| A16 = | 3.4712E−07 | 3.6674E−06 | 2.4194E−07 |
| A18 = | −7.9326E−09 | −1.5692E−07 | −4.8350E−09 |
| A20 = | 7.7227E−11 | 4.2430E−09 | 1.4323E−11 |
| A22 = | — | −6.5683E−11 | 1.1330E−12 |
| A24 = | — | 4.4333E−13 | −1.4261E−14 |

In Table 1, the curvature radius, the thickness and the focal length are shown in millimeters (mm). Surface numbers 0-21 represent the surfaces sequentially arranged from the object side to the image side along the optical axis. In Table 2, k represents the conic coefficient of the equation of the aspheric surface profiles. A4-24 represent the aspheric coefficients ranging from the 4th order to the 24th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
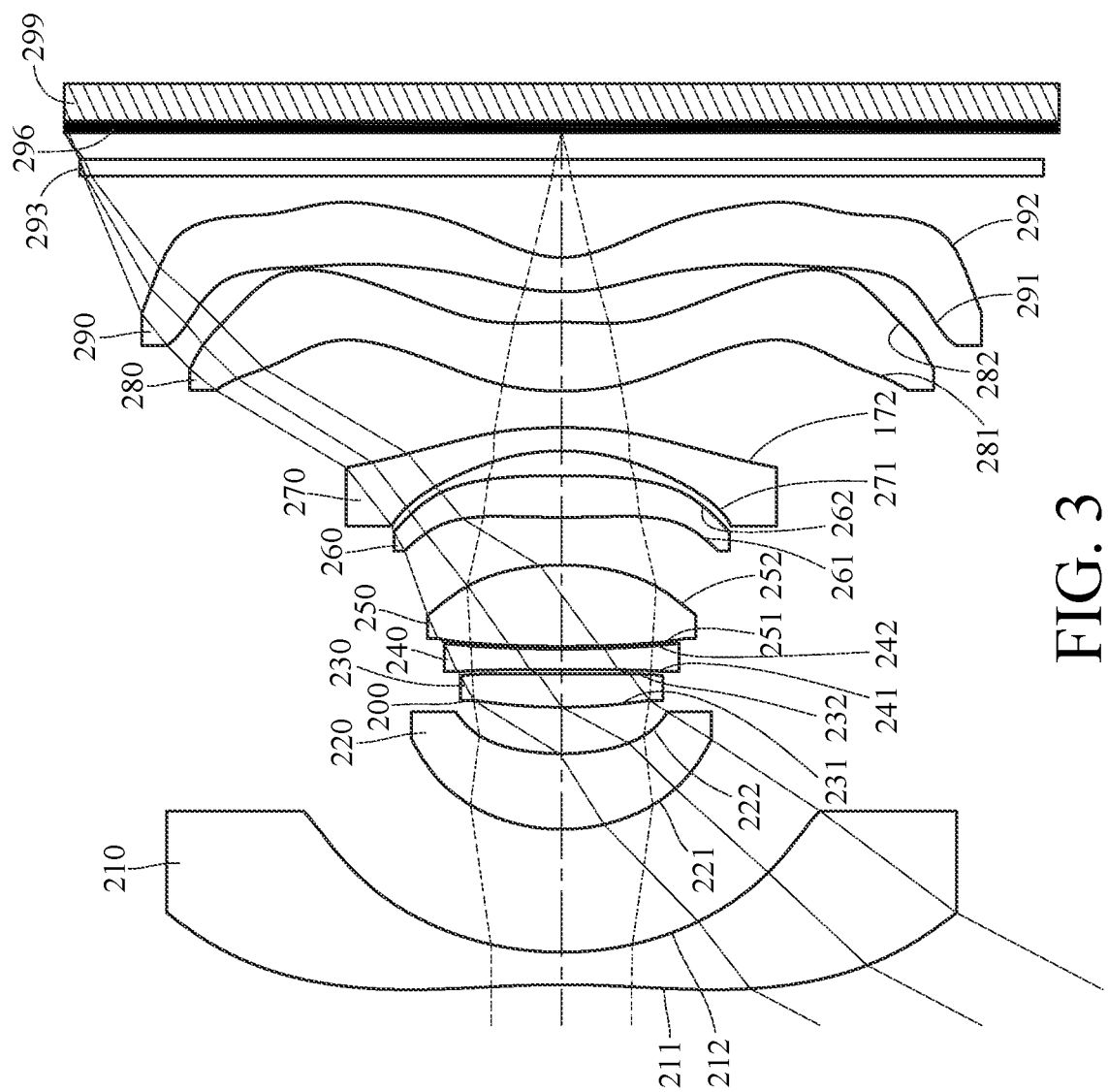
FIG. 3 is a schematic view of an image capturing unit according to the 2nd embodiment of the present disclosure.
Figure 4:
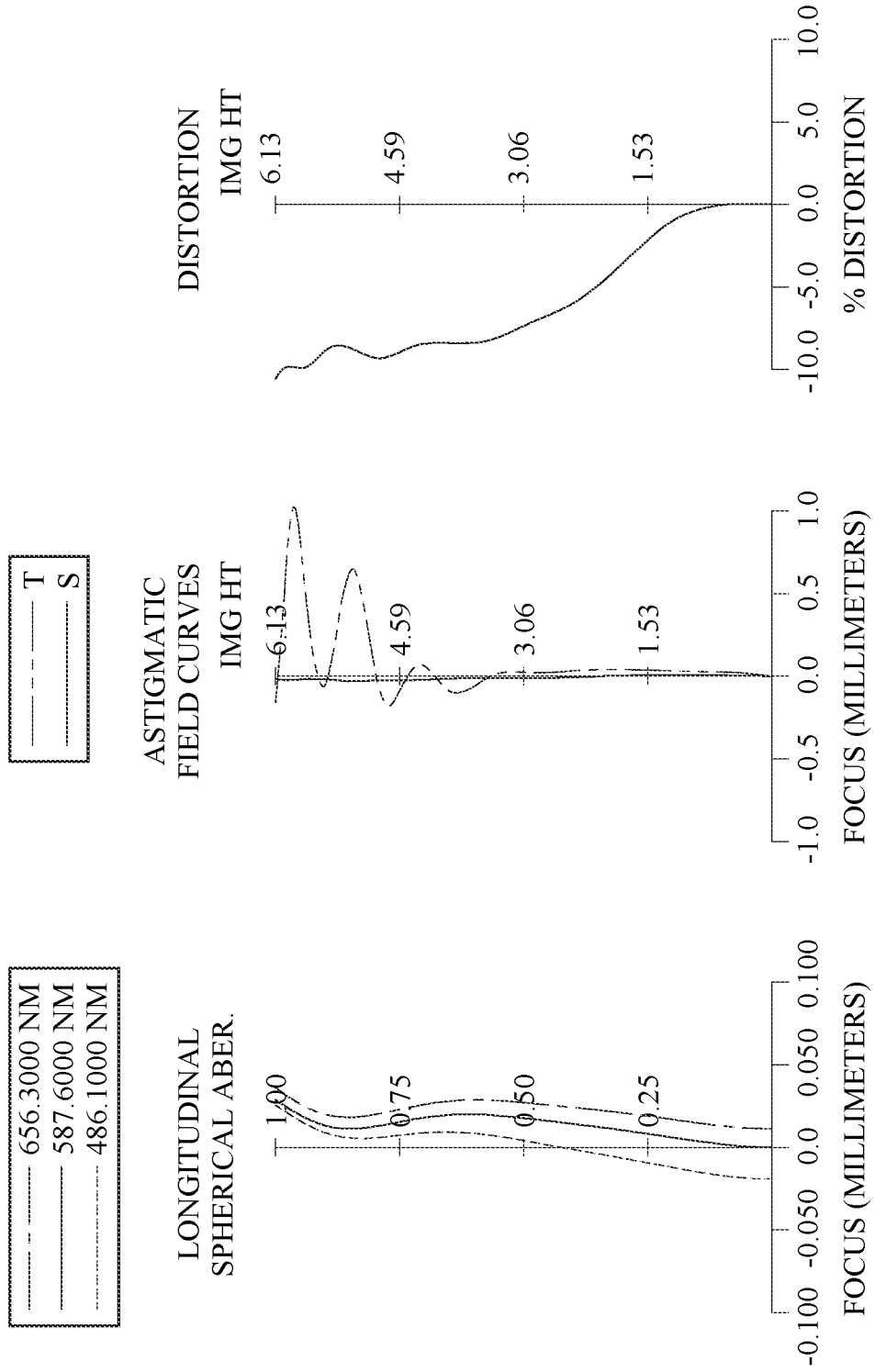
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging optical lens assembly (its reference numeral is omitted) of the present disclosure and an image sensor 299. The imaging optical lens assembly includes, in order from an object side to an image side along an optical path, a first lens element 210, a second lens element 220, an aperture stop 200, a third lens element 230, a fourth lens element 240, a fifth lens element 250, a sixth lens element 260, a seventh lens element 270, an eighth lens element 280, a ninth lens element 290, an IR-cut filter 293 and an image surface 296. In addition, the aperture stop 200 is attached on an object-side surface 231 of the third lens element 230. The imaging optical lens assembly includes nine lens elements (210, 220, 230, 240, 250, 260, 270, 280 and 290) with no additional lens element disposed between each of the adjacent nine lens elements, wherein there is an air gap between each of all adjacent lens elements.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has at least one convex critical point in an off-axis region thereof.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has the object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric.

The seventh lens element 270 with negative refractive power has an object-side surface 271 being concave in a paraxial region thereof and an image-side surface 272 being convex in a paraxial region thereof. The seventh lens element 270 is made of plastic material and has the object-side surface 271 and the image-side surface 272 being both aspheric.

The eighth lens element 280 with positive refractive power has an object-side surface 281 being convex in a paraxial region thereof and an image-side surface 282 being convex in a paraxial region thereof. The eighth lens element 280 is made of plastic material and has the object-side surface 281 and the image-side surface 282 being both aspheric. The object-side surface 281 of the eighth lens element 280 has at least one critical point in an off-axis region thereof. The image-side surface 282 of the eighth lens element 280 has at least one critical point in an off-axis region thereof.

The ninth lens element 290 with negative refractive power has an object-side surface 291 being convex in a paraxial region thereof and an image-side surface 292 being concave in a paraxial region thereof. The ninth lens element 290 is made of plastic material and has the object-side surface 291 and the image-side surface 292 being both aspheric. The image-side surface 292 of the ninth lens element 290 has at least one convex critical point in an off-axis region thereof.

The IR-cut filter 293 is made of glass material and located between the ninth lens element 290 and the image surface 296, and will not affect the focal length of the imaging optical lens assembly. The image sensor 299 is disposed on or near the image surface 296 of the imaging optical lens assembly.

The detailed optical data of the 2nd embodiment are shown in Table 3 and the aspheric surface data are shown in Table 4 below.

TABLE 3

2nd Embodiment
f = 3.59 mm, Fno = 2.08, HFOV = 62.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −11.986 | (ASP) | 0.400 | Plastic | 1.515 | 56.6 | −5.78 |
| 2 | | 3.998 | (ASP) | 1.515 | | | | |
| 3 | Lens 2 | 2.270 | (ASP) | 0.933 | Plastic | 1.583 | 30.2 | 10.03 |
| 4 | | 3.151 | (ASP) | 0.573 | | | | |
| 5 | Lens 3 | 6.943 | (ASP) | 0.407 | Plastic | 1.544 | 56.0 | 15.18 |
| 6 | | 42.638 | (ASP) | 0.059 | | | | |
| 7 | Lens 4 | −450.357 | (ASP) | 0.251 | Plastic | 1.686 | 18.4 | −24.91 |
| 8 | | 17.766 | (ASP) | 0.032 | | | | |
| 9 | Lens 5 | 15.834 | (ASP) | 1.003 | Plastic | 1.544 | 56.0 | 5.06 |
| 10 | | −3.257 | (ASP) | 0.588 | | | | |
| 11 | Lens 6 | 12.578 | (ASP) | 0.514 | Plastic | 1.544 | 56.0 | 12.04 |
| 12 | | −13.477 | (ASP) | 0.305 | | | | |
| 13 | Lens 7 | −2.795 | (ASP) | 0.287 | Plastic | 1.686 | 18.4 | −7.41 |
| 14 | | −6.469 | (ASP) | 0.450 | | | | |
| 15 | Lens 8 | 3.838 | (ASP) | 0.850 | Plastic | 1.544 | 56.0 | 4.36 |
| 16 | | −5.728 | (ASP) | 0.373 | | | | |
| 17 | Lens 9 | 2.604 | (ASP) | 0.424 | Plastic | 1.515 | 56.6 | −4.79 |
| 18 | | 1.196 | (ASP) | 1.000 | | | | |
| 19 | IR-cut filter | Plano | | 0.210 | Glass | 1.517 | 64.2 | — |
| 20 | | Plano | | 0.328 | | | | |
| 21 | Image | Plano | | 0.000 | | | | |

Note:
Reference wavelength is 587.6 nm (d-line).
The aperture stop 200 is located on the object-side surface 231 (Surface 5).

TABLE 4

Aspheric Coefficients

| Surface # | 1 | 2 | 3 | 4 | 5 |
|---|---|---|---|---|---|
| k = | −9.8363E+01 | −2.7766E−01 | −7.8274E−02 | 2.9188E+00 | −1.8529E+00 |
| A4 = | 3.5461E−03 | 2.1556E−03 | 6.0809E−04 | 2.6127E−02 | 2.7549E−03 |
| A6 = | 5.6951E−05 | −1.3287E−03 | −2.7839E−03 | −5.2469E−03 | 8.1475E−03 |
| A8 = | −4.6957E−05 | 9.1200E−04 | 1.0196E−02 | 4.0573E−02 | −4.3517E−02 |
| A10 = | 7.0465E−06 | −3.2480E−04 | −1.0923E−02 | −6.2517E−02 | 1.1027E−01 |
| A12 = | −5.9483E−07 | 7.3640E−05 | 7.4838E−03 | 6.1552E−02 | −1.7580E−01 |
| A14 = | 3.1605E−08 | −1.0803E−05 | −3.1024E−03 | −3.2455E−02 | 1.7712E−01 |
| A16 = | −1.0495E−09 | 1.0126E−06 | 7.4787E−04 | 8.9817E−03 | −1.1283E−01 |
| A18 = | 2.0034E−11 | −5.4948E−08 | −8.8441E−05 | −8.7925E−04 | 4.1962E−02 |
| A20 = | −1.6937E−13 | 1.2832E−09 | 3.0441E−06 | — | −7.0395E−03 |

| Surface # | 6 | 7 | 8 | 9 | 10 |
|---|---|---|---|---|---|
| k = | −1.0000E+00 | −1.0000E+00 | −7.6689E+00 | 2.8755E+01 | −9.2998E+00 |
| A4 = | −2.7793E−03 | −6.4248E−03 | 1.0330E−02 | 1.3102E−02 | −5.9928E−02 |
| A6 = | −3.9311E−02 | −4.1714E−02 | −5.5691E−02 | −5.1853E−02 | 1.6078E−02 |

TABLE 4-continued

| Aspheric Coefficients | | | | | |
|---|---|---|---|---|---|
| A8 = | 1.0365E−01 | 1.1733E−01 | 1.1770E−01 | 9.5623E−02 | −1.5019E−02 |
| A10 = | −1.9734E−01 | −1.9731E−01 | −1.2988E−01 | −1.0045E−01 | 1.2933E−02 |
| A12 = | 2.7330E−01 | 2.4584E−01 | 8.4994E−02 | 6.3064E−02 | −1.0147E−02 |
| A14 = | −2.6105E−01 | −2.1967E−01 | −3.2691E−02 | −2.2594E−02 | 6.3148E−03 |
| A16 = | 1.5394E−01 | 1.2513E−01 | 6.4783E−03 | 3.9239E−03 | −2.6459E−03 |
| A18 = | −4.8916E−02 | −3.9183E−02 | −3.3822E−04 | −1.0207E−04 | 6.3801E−04 |
| A20 = | 6.2113E−03 | 5.0334E−03 | −5.0989E−05 | −3.9335E−05 | −6.3584E−05 |

| Surface # | 11 | 12 | 13 | 14 | 15 |
|---|---|---|---|---|---|
| k = | −3.6213E+01 | −3.0279E+00 | −3.1922E+00 | 1.2660E+00 | −3.1600E+00 |
| A4 = | −3.3475E−02 | −1.3629E−02 | −6.9276E−03 | −1.4134E−02 | 4.1998E−02 |
| A6 = | 4.4259E−03 | −3.6403E−02 | −5.4804E−03 | −2.2095E−02 | −2.0329E−02 |
| A8 = | −6.4679E−04 | 4.9848E−02 | 7.7520E−02 | 3.1054E−02 | 3.8964E−03 |
| A10 = | −2.7616E−03 | −3.6322E−02 | −4.7998E−02 | −1.5719E−02 | −3.3145E−04 |
| A12 = | 6.8407E−04 | 1.5556E−02 | 1.6581E−02 | 4.3471E−03 | −2.4977E−06 |
| A14 = | 7.2188E−04 | −4.1998E−03 | −3.4759E−03 | −7.1850E−04 | 2.8171E−06 |
| A16 = | −4.9528E−04 | 7.0961E−04 | 4.4387E−04 | 7.1146E−05 | −2.2509E−07 |
| A18 = | 1.1837E−04 | −6.8021E−05 | −3.1387E−05 | −3.9150E−06 | 7.6212E−09 |
| A20 = | −1.0103E−05 | 2.7874E−06 | 8.4779E−07 | 9.2525E−08 | −9.8139E−11 |

| Surface # | 16 | 17 | 18 |
|---|---|---|---|
| k = | −4.9947E+01 | −1.2217E+00 | −2.9779E+00 |
| A4 = | 1.4197E−01 | −8.1731E−03 | −2.6040E−02 |
| A6 = | −6.0244E−02 | −3.4202E−02 | −5.6518E−03 |
| A8 = | 1.4435E−02 | 1.7927E−02 | 3.6753E−03 |
| A10 = | −2.2140E−03 | −4.5662E−03 | −7.0471E−04 |
| A12 = | 2.2241E−04 | 6.9794E−04 | 6.4533E−05 |
| A14 = | −1.4495E−05 | −6.8598E−05 | −2.5161E−06 |
| A16 = | 5.8670E−07 | 4.4422E−06 | −3.7525E−08 |
| A18 = | −1.3328E−08 | −1.8853E−07 | 8.0530E−09 |
| A20 = | 1.2933E−10 | 5.0454E−09 | −3.4037E−10 |
| A22 = | — | −7.7199E−11 | 6.5156E−12 |
| A24 = | — | 5.1459E−13 | −4.8968E−14 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.59 | TL/[ImgH × tan(CRA)] | 2.97 |
| Fno | 2.08 | (R15 + R16)/(R15 − R16) | −0.20 |
| HFOV [deg.] | 62.3 | \|f/R15\| + \|f/R16\| | 1.56 |
| FOV [deg.] | 124.6 | \|f/R16\| + \|f/R17\| | 2.01 |
| V1/N1 | 37.34 | R18/ImgH | 0.20 |
| V2/N2 | 19.11 | Y92/BL | 3.36 |
| V3/N3 | 36.26 | Yc11/Y11 | 0.39 |
| V4/N4 | 10.90 | Yc92/Yc81 | 1.01 |
| V5/N5 | 36.26 | MaxET9/ET9 | 3.16 |
| V6/N6 | 36.26 | Y_MaxET9/Y92 | 0.92 |
| V7/N7 | 10.90 | f/f1 | −0.62 |
| V8/N8 | 36.26 | f/f2 | 0.36 |
| V9/N9 | 37.34 | f/f3 | 0.24 |
| V20 | 2 | f/f4 | −0.14 |
| V26 | 2 | f/f5 | 0.71 |
| V40 | 3 | f/f6 | 0.30 |
| Vmin | 18.4 | f/f7 | −0.48 |
| Td/ΣCT | 1.77 | f/f8 | 0.82 |
| TL/f | 2.92 | f/f9 | −0.75 |
| TL/ImgH | 1.71 | — | — |

3rd Embodiment

Figure 5:
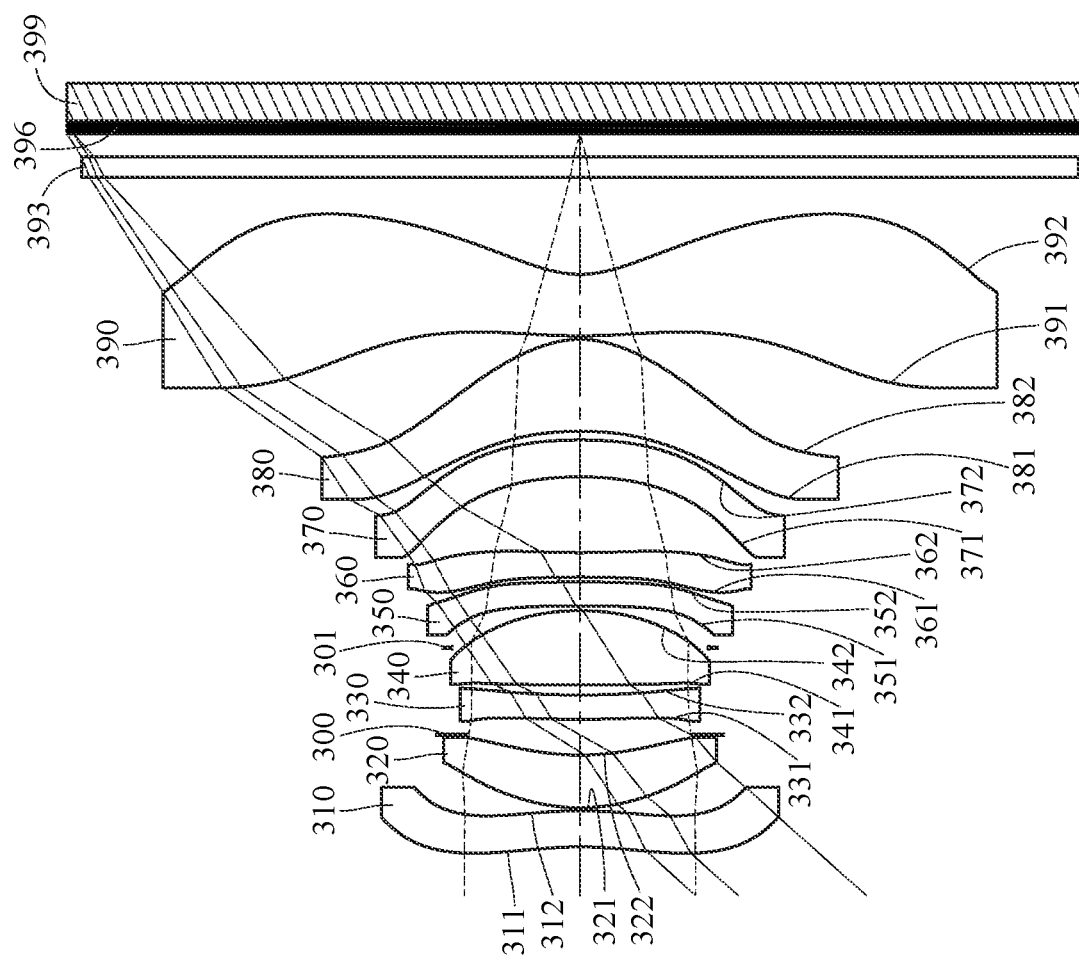
FIG. 5 is a schematic view of an image capturing unit according to the 3rd embodiment of the present disclosure.
Figure 6:
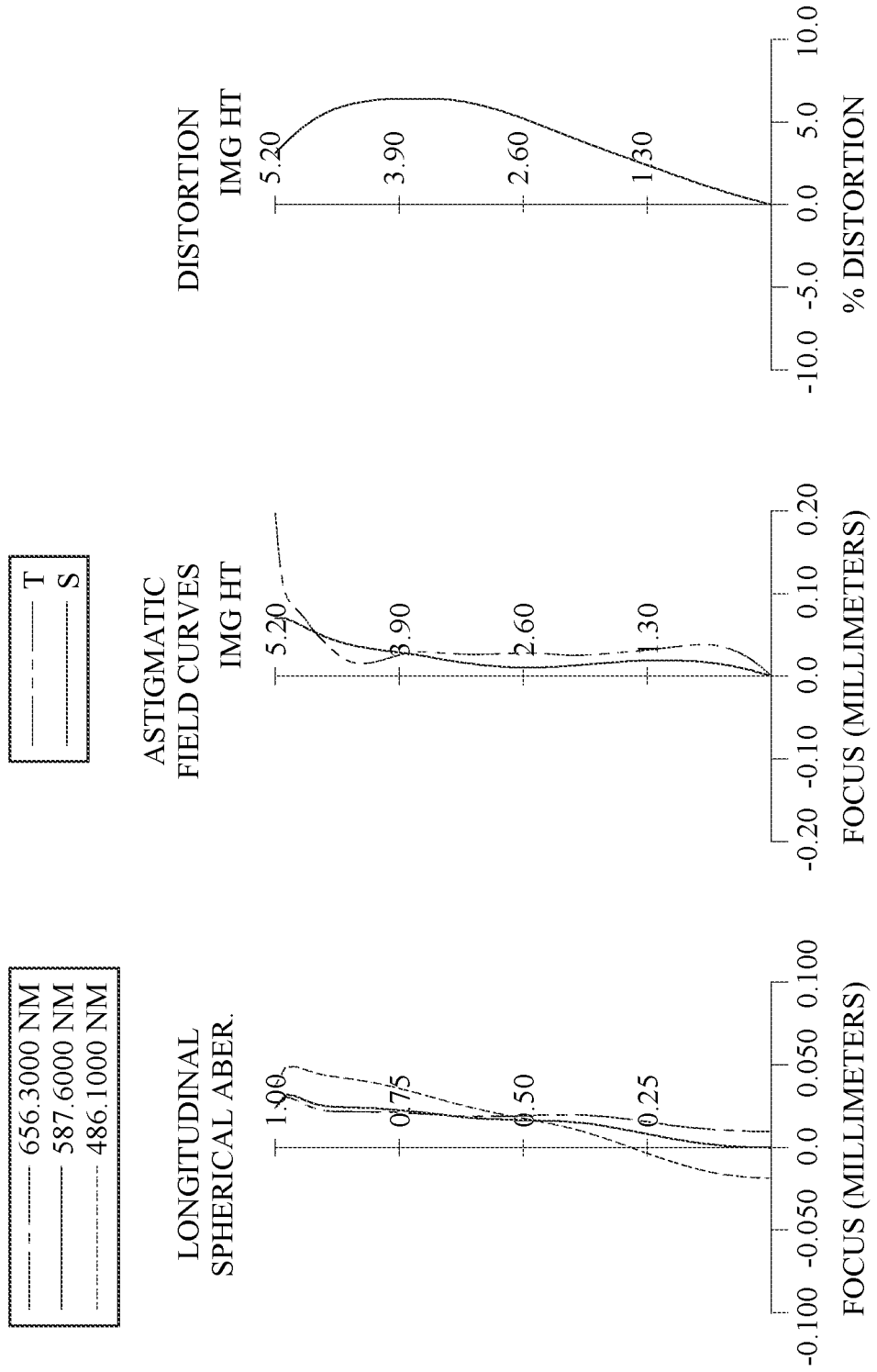
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens assembly (its reference numeral is omitted) of the present disclosure and an image sensor 399. The imaging optical lens assembly includes, in order from an object side to an image side along an optical path, a first lens element 310, a second lens element 320, an aperture stop 300, a third lens element 330, a fourth lens element 340, a stop 301, a fifth lens element 350, a sixth lens element 360, a seventh lens element 370, an eighth lens element 380, a ninth lens element 390, an IR-cut filter 393 and an image surface 396. The imaging optical lens assembly includes nine lens elements (310, 320, 330, 340, 350, 360, 370, 380 and 390) with no additional lens element disposed between each of the adjacent nine lens elements, wherein there is an air gap between each of all adjacent lens elements.

The first lens element 310 with positive refractive power has an object-side surface 311 being concave in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has at least one convex critical point in an off-axis region thereof. The image-side surface 312 of the first lens element 310 has at least one critical point in an off-axis region thereof.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being concave in a paraxial region thereof and an image-side surface 362 being concave in a paraxial region thereof. The sixth lens element 360 is made of plastic material and has the object-side surface 361 and the image-side surface 362 being both aspheric.

The seventh lens element 370 with negative refractive power has an object-side surface 371 being concave in a paraxial region thereof and an image-side surface 372 being convex in a paraxial region thereof. The seventh lens element 370 is made of plastic material and has the object-side surface 371 and the image-side surface 372 being both aspheric.

The eighth lens element 380 with positive refractive power has an object-side surface 381 being concave in a paraxial region thereof and an image-side surface 382 being convex in a paraxial region thereof. The eighth lens element 380 is made of plastic material and has the object-side surface 381 and the image-side surface 382 being both aspheric. The object-side surface 381 of the eighth lens element 380 has at least one critical point in an off-axis region thereof.

The ninth lens element 390 with negative refractive power has an object-side surface 391 being convex in a paraxial region thereof and an image-side surface 392 being concave in a paraxial region thereof. The ninth lens element 390 is made of plastic material and has the object-side surface 391 and the image-side surface 392 being both aspheric. The image-side surface 392 of the ninth lens element 390 has at least one convex critical point in an off-axis region thereof.

The IR-cut filter 393 is made of glass material and located between the ninth lens element 390 and the image surface 396, and will not affect the focal length of the imaging optical lens assembly. The image sensor 399 is disposed on or near the image surface 396 of the imaging optical lens assembly.

The detailed optical data of the 3rd embodiment are shown in Table 5 and the aspheric surface data are shown in Table 6 below.

TABLE 5

3rd Embodiment
f = 4.51 mm, Fno = 1.90, HFOV = 48.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.918 | (ASP) | 0.372 | Plastic | 1.559 | 40.4 | 448.07 |
| 2 | | −3.989 | (ASP) | 0.030 | | | | |
| 3 | Lens 2 | 1.926 | (ASP) | 0.541 | Plastic | 1.559 | 40.4 | 11.43 |
| 4 | | 2.480 | (ASP) | 0.209 | | | | |
| 5 | Ape. Stop | Plano | | 0.159 | | | | |
| 6 | Lens 3 | 12.024 | (ASP) | 0.250 | Plastic | 1.607 | 26.6 | −135.70 |
| 7 | | 10.411 | (ASP) | 0.107 | | | | |
| 8 | Lens 4 | −133.041 | (ASP) | 0.758 | Plastic | 1.544 | 55.9 | 4.89 |
| 9 | | −2.610 | (ASP) | −0.380 | | | | |
| 10 | Stop | Plano | | 0.426 | | | | |
| 11 | Lens 5 | −115.010 | (ASP) | 0.250 | Plastic | 1.686 | 18.4 | 12.41 |
| 12 | | −7.932 | (ASP) | 0.050 | | | | |
| 13 | Lens 6 | −9.109 | (ASP) | 0.250 | Plastic | 1.686 | 18.4 | −6.53 |
| 14 | | 8.922 | (ASP) | 0.779 | | | | |
| 15 | Lens 7 | −3.347 | (ASP) | 0.378 | Plastic | 1.686 | 18.4 | −17.05 |
| 16 | | −4.904 | (ASP) | 0.089 | | | | |
| 17 | Lens 8 | −3.944 | (ASP) | 0.945 | Plastic | 1.544 | 55.9 | 2.26 |
| 18 | | −1.015 | (ASP) | 0.035 | | | | |
| 19 | Lens 9 | 5.866 | (ASP) | 0.631 | Plastic | 1.559 | 40.4 | −2.30 |
| 20 | | 1.012 | (ASP) | 1.000 | | | | |
| 21 | IR-cut filter | Plano | | 0.210 | Glass | 1.517 | 64.2 | — |
| 22 | | Plano | | 0.236 | | | | |
| 23 | Image | Plano | | 0.000 | | | | |

Note:
Reference wavelength is 587.6 nm (d-line).
An effective radius of the stop 301 (Surface 10) is 1.320 mm.
An effective radius of the image-side surface 382 (Surface 18) is 2.650 mm.

TABLE 6

Aspheric Coefficients

| Surface # | 1 | 2 | 3 | 4 | 6 |
|---|---|---|---|---|---|
| k = | −3.4160E+01 | −1.4628E+01 | 3.7313E−01 | −1.0612E+01 | 0.0000E+00 |
| A4 = | 2.6519E−02 | 6.0867E−02 | −6.1170E−02 | −6.1102E−03 | −2.9223E−02 |
| A6 = | 2.3154E−03 | −9.5477E−03 | 5.1251E−02 | 2.6836E−02 | 1.9159E−02 |
| A8 = | −1.4625E−03 | −3.3541E−03 | −5.2262E−02 | −7.7331E−02 | −4.7841E−02 |
| A10 = | 1.0598E−03 | 1.5415E−02 | 3.1147E−02 | 1.6378E−01 | 3.0386E−02 |
| A12 = | −6.7508E−04 | −1.7076E−02 | −1.0532E−02 | −2.6716E−01 | −1.3646E−02 |
| A14 = | 3.1610E−04 | 1.0941E−02 | 1.0095E−03 | 2.8881E−01 | 3.6976E−03 |
| A16 = | −8.9981E−05 | −4.1804E−03 | — | −1.9541E−01 | — |
| A18 = | 1.4028E−05 | 8.8626E−04 | — | 7.3997E−02 | — |
| A20 = | −9.1814E−07 | −8.0211E−05 | — | −1.1834E−02 | — |

| Surface # | 7 | 8 | 9 | 11 | 12 |
|---|---|---|---|---|---|
| k = | 0.0000E+00 | 0.0000E+00 | −1.1818E+01 | −9.0000E+01 | 9.8245E+00 |
| A4 = | 3.4385E−03 | 9.0259E−03 | −2.0288E−01 | −7.0586E−02 | 1.9084E−01 |
| A6 = | 3.8596E−02 | 3.0985E−02 | 2.4414E−01 | −5.9524E−03 | −4.9598E−01 |
| A8 = | −5.0569E−02 | −2.3762E−02 | −2.5090E−01 | 4.3053E−02 | 5.4784E−01 |
| A10 = | 1.3680E−02 | −3.0190E−03 | 1.6797E−01 | −5.0571E−02 | −3.6484E−01 |
| A12 = | 1.6483E−03 | 4.5809E−03 | −7.4853E−02 | 1.0860E−02 | 1.4921E−01 |
| A14 = | −4.5975E−04 | −1.3638E−03 | 2.0391E−02 | 5.8534E−03 | −3.3493E−02 |
| A16 = | — | — | −2.7608E−03 | −1.9915E−03 | 3.0961E−03 |

| Surface # | 13 | 14 | 15 | 16 | 17 |
|---|---|---|---|---|---|
| k = | 1.2586E+01 | 2.0269E+01 | −2.3963E+00 | 0.0000E+00 | 4.0995E−01 |
| A4 = | 1.0965E−01 | −6.4403E−02 | −4.4804E−02 | −1.2243E−01 | −1.6329E−01 |
| A6 = | −3.2827E−01 | 1.1947E−02 | 3.8559E−03 | 1.4055E−01 | 2.2628E−01 |
| A8 = | 3.0192E−01 | −2.0424E−02 | −1.0834E−02 | −1.2476E−01 | −1.8494E−01 |
| A10 = | −1.3369E−01 | 4.1309E−02 | 1.3420E−02 | 6.6755E−02 | 9.4834E−02 |
| A12 = | 3.2353E−02 | −3.9984E−02 | −8.0388E−03 | −2.1594E−02 | −3.0782E−02 |
| A14 = | −4.1243E−03 | 2.1341E−02 | 2.4580E−03 | 3.9611E−03 | 6.3320E−03 |
| A16 = | 2.1723E−04 | −6.6280E−03 | −3.6911E−04 | −2.9360E−04 | −7.9930E−04 |
| A18 = | — | 1.1349E−03 | 2.3703E−05 | −1.3500E−05 | 5.6447E−05 |
| A20 = | — | −8.2300E−05 | — | 2.4178E−06 | −1.7073E−06 |

| Surface # | 18 | 19 | 20 |
|---|---|---|---|
| k = | −4.0051E+00 | −2.2206E+00 | −4.9265E+00 |
| A4 = | −1.1010E−01 | −5.5440E−02 | −3.0385E−02 |
| A6 = | 7.9588E−02 | 1.3948E−02 | 8.4776E−03 |
| A8 = | −4.3176E−02 | −2.6326E−03 | −1.7835E−03 |
| A10 = | 1.7737E−02 | 3.2398E−04 | 2.6148E−04 |
| A12 = | −4.8232E−03 | −2.2084E−05 | −2.6467E−05 |
| A14 = | 8.3969E−04 | 5.9190E−07 | 1.7809E−06 |
| A16 = | −9.0726E−05 | 1.5165E−08 | −7.5384E−08 |
| A18 = | 5.5564E−06 | −1.3218E−09 | 1.8089E−09 |
| A20 = | −1.4731E−07 | 2.3156E−11 | −1.8678E−11 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.51 | TL/[ImgH × tan(CRA)] | 2.09 |
| Fno | 1.90 | (R15 + R16)/(R15 − R16) | 1.69 |
| HFOV [deg.] | 48.1 | \|f/R15\| + \|f/R16\| | 5.58 |
| FOV [deg.] | 96.2 | \|f/R16\| + \|f/R17\| | 5.21 |
| V1/N1 | 25.95 | R18/ImgH | 0.19 |
| V2/N2 | 25.95 | Y92/BL | 2.96 |
| V3/N3 | 16.57 | Yc11/Y11 | 0.53 |
| V4/N4 | 36.23 | Yc92/Yc81 | 1.11 |
| V5/N5 | 10.90 | MaxET9/ET9 | 1.68 |
| V6/N6 | 10.90 | Y_MaxET9/Y92 | 0.72 |
| V7/N7 | 10.90 | f/f1 | 0.01 |
| V8/N8 | 36.23 | f/f2 | 0.39 |
| V9/N9 | 25.95 | f/f3 | −0.03 |
| V20 | 3 | f/f4 | 0.92 |
| V26 | 3 | f/f5 | 0.36 |
| V40 | 4 | f/f6 | −0.69 |
| Vmin | 18.4 | f/f7 | −0.26 |
| Td/ΣCT | 1.34 | f/f8 | 2.00 |
| TL/f | 1.63 | f/f9 | −1.96 |
| TL/ImgH | 1.41 | — | — |

4th Embodiment

Figure 7:
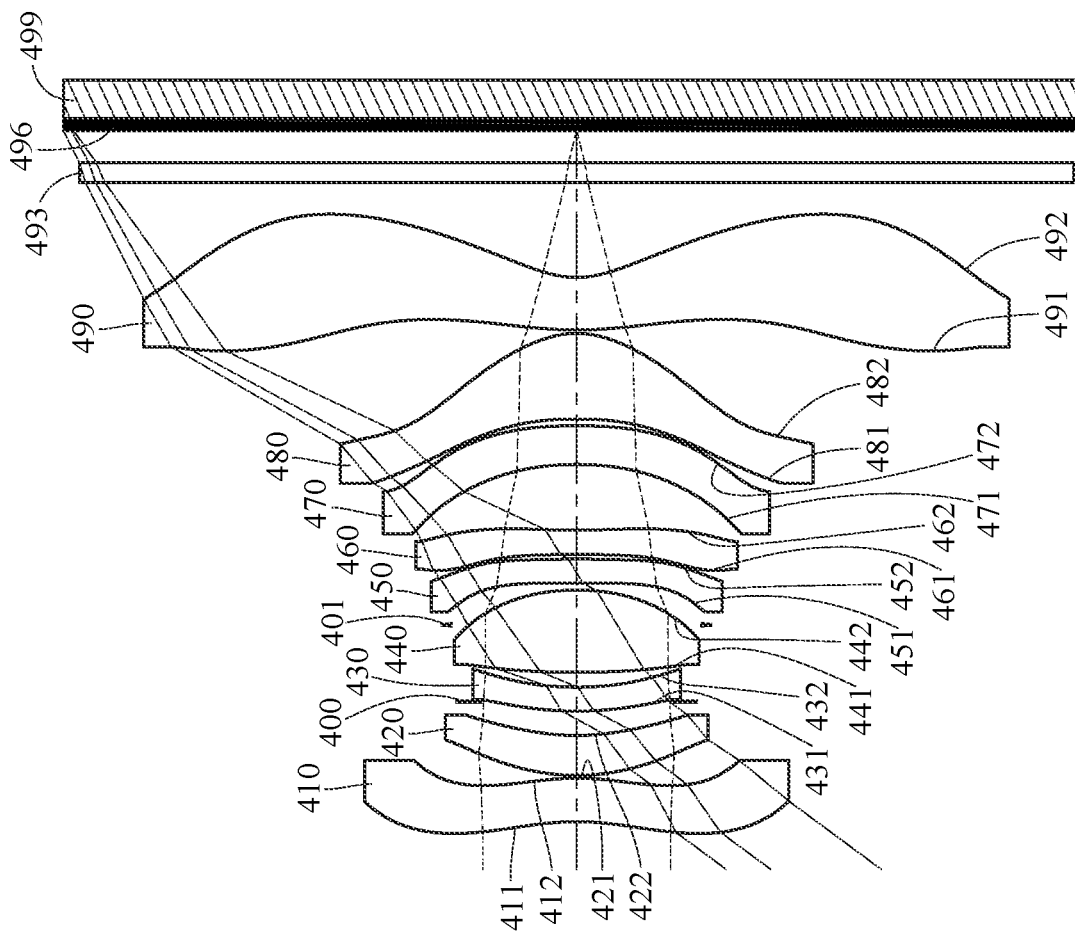
FIG. 7 is a schematic view of an image capturing unit according to the 4th embodiment of the present disclosure.

FIG. 7 is a schematic view of an image capturing unit according to the 4th embodiment of the present disclosure.

Figure 8:
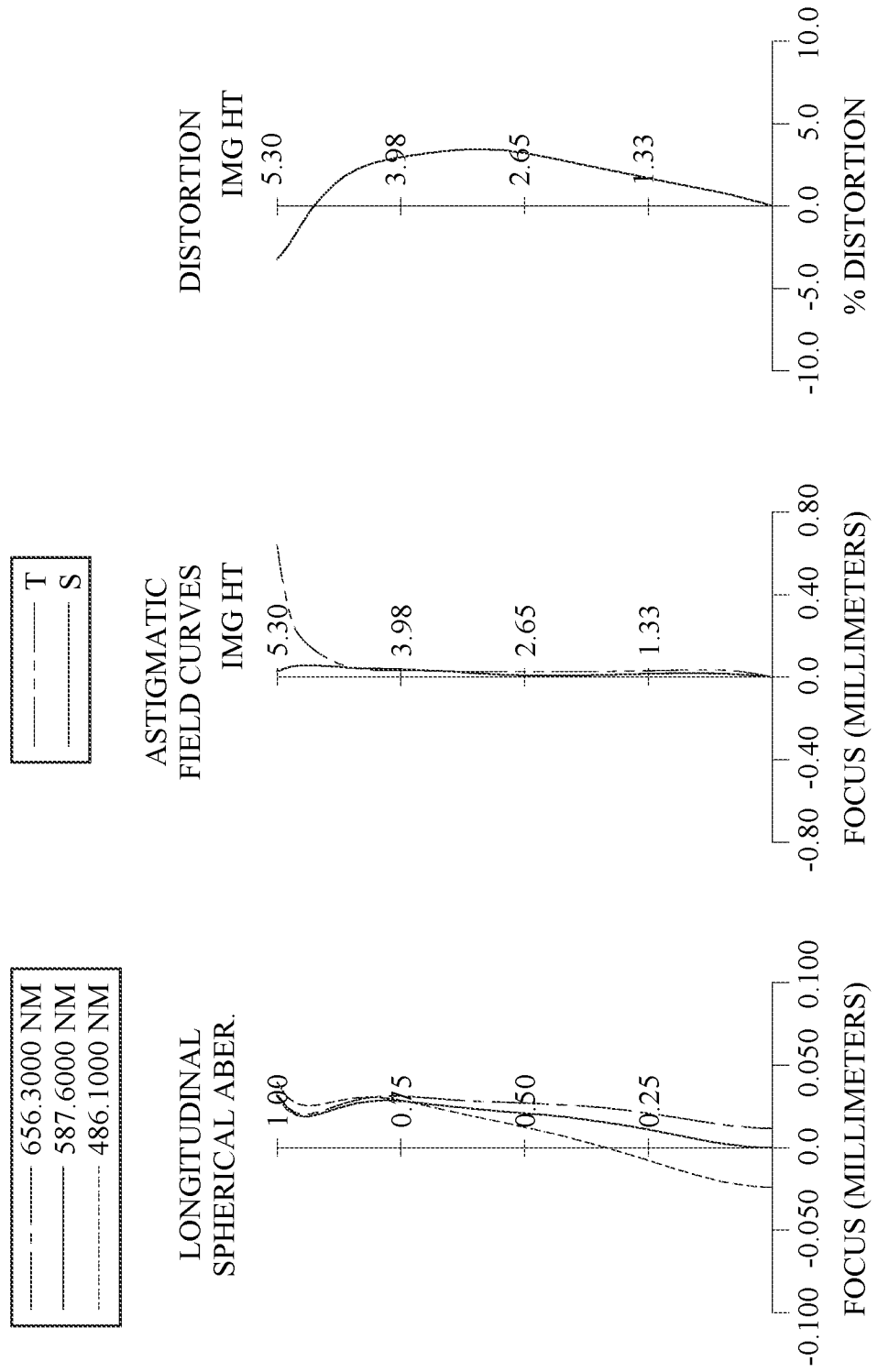
FIG. 8 shows spherical aberration curves, astigmatic field curves and a distortion curve of the image capturing unit according to the 4th embodiment.

FIG. 8 shows, in order from left to right, spherical aberration curves, astigmatic field curves and a distortion curve of the image capturing unit according to the 4th embodiment. In FIG. 7, the image capturing unit includes the imaging optical lens assembly (its reference numeral is omitted) of the present disclosure and an image sensor 499. The imaging optical lens assembly includes, in order from an object side to an image side along an optical path, a first lens element 410, a second lens element 420, an aperture stop 400, a third lens element 430, a fourth lens element 440, a stop 401, a fifth lens element 450, a sixth lens element 460, a seventh lens element 470, an eighth lens element 480, a ninth lens element 490, an IR-cut filter 493 and an image surface 496. The imaging optical lens assembly includes nine lens elements (410, 420, 430, 440, 450, 460, 470, 480 and 490) with no additional lens element disposed between each of the adjacent nine lens elements, wherein there is an air gap between each of all adjacent lens elements.

The first lens element 410 with positive refractive power has an object-side surface 411 being concave in a paraxial region thereof and an image-side surface 412 being convex in a paraxial region thereof. The first lens element 410 is made of plastic material and has the object-side surface 411 and the image-side surface 412 being both aspheric. The object-side surface 411 of the first lens element 410 has at least one convex critical point in an off-axis region thereof. The image-side surface 412 of the first lens element 410 has at least one critical point in an off-axis region thereof.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric.

The seventh lens element 470 with negative refractive power has an object-side surface 471 being concave in a paraxial region thereof and an image-side surface 472 being convex in a paraxial region thereof. The seventh lens element 470 is made of plastic material and has the object-side surface 471 and the image-side surface 472 being both aspheric.

The eighth lens element 480 with positive refractive power has an object-side surface 481 being concave in a paraxial region thereof and an image-side surface 482 being convex in a paraxial region thereof. The eighth lens element 480 is made of plastic material and has the object-side surface 481 and the image-side surface 482 being both aspheric.

The ninth lens element 490 with negative refractive power has an object-side surface 491 being convex in a paraxial region thereof and an image-side surface 492 being concave in a paraxial region thereof. The ninth lens element 490 is made of plastic material and has the object-side surface 491 and the image-side surface 492 being both aspheric. The image-side surface 492 of the ninth lens element 490 has at least one convex critical point in an off-axis region thereof.

The IR-cut filter 493 is made of glass material and located between the ninth lens element 490 and the image surface 496, and will not affect the focal length of the imaging optical lens assembly. The image sensor 499 is disposed on or near the image surface 496 of the imaging optical lens assembly.

The detailed optical data of the 4th embodiment are shown in Table 7 and the aspheric surface data are shown in Table 8 below.

TABLE 7

4th Embodiment
f = 4.03 mm, Fno = 2.05, HFOV = 53.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.673 | (ASP) | 0.456 | Plastic | 1.562 | 44.6 | 66.29 |
| 2 | | −2.647 | (ASP) | 0.030 | | | | |
| 3 | Lens 2 | 2.170 | (ASP) | 0.419 | Plastic | 1.634 | 23.8 | 27.55 |
| 4 | | 2.293 | (ASP) | 0.355 | | | | |
| 5 | Ape. Stop | Plano | | −0.098 | | | | |
| 6 | Lens 3 | 3.884 | (ASP) | 0.250 | Plastic | 1.642 | 22.5 | −60.59 |
| 7 | | 3.442 | (ASP) | 0.156 | | | | |
| 8 | Lens 4 | 10.726 | (ASP) | 0.863 | Plastic | 1.544 | 56.0 | 3.91 |
| 9 | | −2.575 | (ASP) | −0.365 | | | | |
| 10 | Stop | Plano | | 0.441 | | | | |
| 11 | Lens 5 | 113.394 | (ASP) | 0.250 | Plastic | 1.686 | 18.4 | 12.75 |
| 12 | | −9.468 | (ASP) | 0.050 | | | | |
| 13 | Lens 6 | −9.362 | (ASP) | 0.254 | Plastic | 1.686 | 18.4 | −6.37 |
| 14 | | 8.284 | (ASP) | 0.690 | | | | |
| 15 | Lens 7 | −3.054 | (ASP) | 0.406 | Plastic | 1.686 | 18.4 | −9.70 |
| 16 | | −5.949 | (ASP) | 0.071 | | | | |

TABLE 7-continued

4th Embodiment
f = 4.03 mm, Fno = 2.05, HFOV = 53.6 deg.

| Surface # | | Curvature Radius | | Thickness | Material | Index | Abbe # | Focal Length |
|---|---|---|---|---|---|---|---|---|
| 17 | Lens 8 | −4.032 | (ASP) | 0.899 | Plastic | 1.562 | 44.6 | 1.91 |
| 18 | | −0.916 | (ASP) | 0.035 | | | | |
| 19 | Lens 9 | 3.864 | (ASP) | 0.550 | Plastic | 1.562 | 44.6 | −2.21 |
| 20 | | 0.893 | (ASP) | 1.000 | | | | |
| 21 | IR-cut filter | Plano | | 0.210 | Glass | 1.517 | 64.2 | — |
| 22 | | Plano | | 0.332 | | | | |
| 23 | Image | Plano | | 0.000 | | | | |

Note:
Reference wavelength is 587.6 nm (d-line).
An effective radius of the stop 401 (Surface 10) is 1.320 mm.
An effective radius of the image-side surface 482 (Surface 18) is 2.480 mm.

TABLE 8

Aspheric Coefficients

| Surface # | 1 | 2 | 3 | 4 | 6 |
|---|---|---|---|---|---|
| k = | −1.5262E+01 | −1.7458E+01 | 5.1420E−01 | −1.0082E+01 | 0.0000E+00 |
| A4 = | 2.4243E−02 | 5.8421E−02 | −5.3272E−02 | −4.5324E−02 | 1.7321E−02 |
| A6 = | 1.0538E−02 | −3.0916E−03 | 4.8269E−02 | 1.4926E−01 | −6.9373E−03 |
| A8 = | −1.0716E−02 | 1.4112E−03 | −5.6675E−02 | −2.3332E−01 | −5.5179E−02 |
| A10 = | 5.9375E−03 | −4.4704E−03 | 4.3824E−02 | 1.7267E−01 | 4.8164E−02 |
| A12 = | −2.1478E−03 | 6.9032E−03 | −2.1359E−02 | 9.9994E−02 | −1.4656E−02 |
| A14 = | 5.1004E−04 | −4.9043E−03 | 3.9595E−03 | −3.8254E−01 | −3.4852E−04 |
| A16 = | −7.5830E−05 | 1.8516E−03 | — | 3.9099E−01 | — |
| A18 = | 6.3753E−06 | −3.5885E−04 | — | −1.8845E−01 | — |
| A20 = | −2.2895E−07 | 2.7772E−05 | — | 3.6761E−02 | — |

| Surface # | 7 | 8 | 9 | 11 | 12 |
|---|---|---|---|---|---|
| k = | 0.0000E+00 | 0.0000E+00 | −6.6561E+00 | −7.1421E+01 | 2.0528E+01 |
| A4 = | 5.0473E−02 | 2.2878E−02 | −2.1926E−01 | −1.2324E−01 | 1.6218E−01 |
| A6 = | −2.4272E−02 | 4.3132E−03 | 2.7541E−01 | 6.8711E−02 | −4.0410E−01 |
| A8 = | −4.9145E−02 | −2.7927E−02 | −2.8729E−01 | −1.3630E−02 | 4.6529E−01 |
| A10 = | 6.2282E−02 | 2.8245E−02 | 1.6977E−01 | −4.7110E−02 | −3.5028E−01 |
| A12 = | −3.1563E−02 | −1.6589E−02 | −4.9548E−02 | 2.7902E−02 | 1.6307E−01 |
| A14 = | 6.6054E−03 | 4.1797E−03 | 2.1993E−03 | −2.8450E−03 | −4.0724E−02 |
| A16 = | — | — | 1.2389E−03 | −4.8403E−04 | 4.1132E−03 |

| Surface # | 13 | 14 | 15 | 16 | 17 |
|---|---|---|---|---|---|
| k = | 1.7211E+01 | 1.4837E+01 | −4.4531E+00 | 0.0000E+00 | 5.1256E−01 |
| A4 = | 6.9430E−02 | −8.6871E−02 | −6.5647E−02 | −1.1504E−01 | −1.3219E−01 |
| A6 = | −2.1731E−01 | 5.6103E−02 | 4.3001E−02 | 1.1606E−01 | 1.5701E−01 |
| A8 = | 1.5993E−01 | −8.1108E−02 | −5.6675E−02 | −8.9074E−02 | −1.1289E−01 |
| A10 = | −3.9391E−02 | 9.2758E−02 | 6.0038E−02 | 3.7175E−02 | 4.8131E−02 |
| A12 = | −1.5876E−03 | −6.5580E−02 | −3.8058E−02 | −6.4008E−03 | −1.0864E−02 |
| A14 = | 2.2198E−03 | 2.8994E−02 | 1.3593E−02 | −9.6408E−04 | 9.2773E−04 |
| A16 = | −2.6906E−04 | −8.0707E−03 | −2.5779E−03 | 6.8881E−04 | 7.9797E−05 |
| A18 = | — | 1.3168E−03 | 2.0471E−04 | −1.2376E−04 | −2.0894E−05 |
| A20 = | — | −9.5139E−05 | — | 7.7417E−06 | 1.1029E−06 |

| Surface # | 18 | 19 | 20 |
|---|---|---|---|
| k = | −4.1044E+00 | −1.7019E+00 | −5.0080E+00 |
| A4 = | −1.4033E−01 | −5.9629E−02 | −2.6691E−02 |
| A6 = | 1.1233E−01 | 1.8296E−02 | 7.3713E−03 |
| A8 = | −7.4399E−02 | −4.3993E−03 | −1.5758E−03 |
| A10 = | 3.7382E−02 | 7.0528E−04 | 2.3178E−04 |
| A12 = | −1.1736E−02 | −7.1891E−05 | −2.3467E−05 |
| A14 = | 2.2347E−03 | 4.6383E−06 | 1.5823E−06 |
| A16 = | −2.5294E−04 | −1.8434E−07 | −6.7036E−08 |
| A18 = | 1.5693E−05 | 4.1331E−09 | 1.6039E−09 |
| A20 = | −4.1074E−07 | −4.0118E−11 | −1.6461E−11 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.03 | TL/ImgH | 1.37 |
| Fno | 2.05 | TL/[ImgH × tan(CRA)] | 2.53 |
| HFOV [deg.] | 53.6 | (R15 + R16)/(R15 − R16) | 1.59 |
| FOV [deg.] | 107.2 | \|f/R15\| + \|f/R16\| | 5.41 |
| V1/N1 | 28.57 | \|f/R16\| + \|f/R17\| | 5.45 |
| V2/N2 | 14.59 | R18/ImgH | 0.17 |
| V3/N3 | 13.70 | Y92/BL | 2.94 |
| V4/N4 | 36.26 | Yc11/Y11 | 0.58 |
| V5/N5 | 10.90 | MaxET9/ET9 | 2.64 |
| V6/N6 | 10.90 | Y_MaxET9/Y92 | 0.66 |
| V7/N7 | 10.90 | f/f1 | 0.06 |
| V8/N8 | 28.57 | f/f2 | 0.15 |
| V9/N9 | 28.57 | f/f3 | −0.07 |
| V20 | 3 | f/f4 | 1.03 |
| V26 | 5 | f/f5 | 0.32 |
| V40 | 5 | f/f6 | −0.63 |
| Vmin | 18.4 | f/f7 | −0.42 |
| Td/ΣCT | 1.31 | f/f8 | 2.11 |
| TL/f | 1.80 | f/f9 | −1.82 |

5th Embodiment

Figure 9:
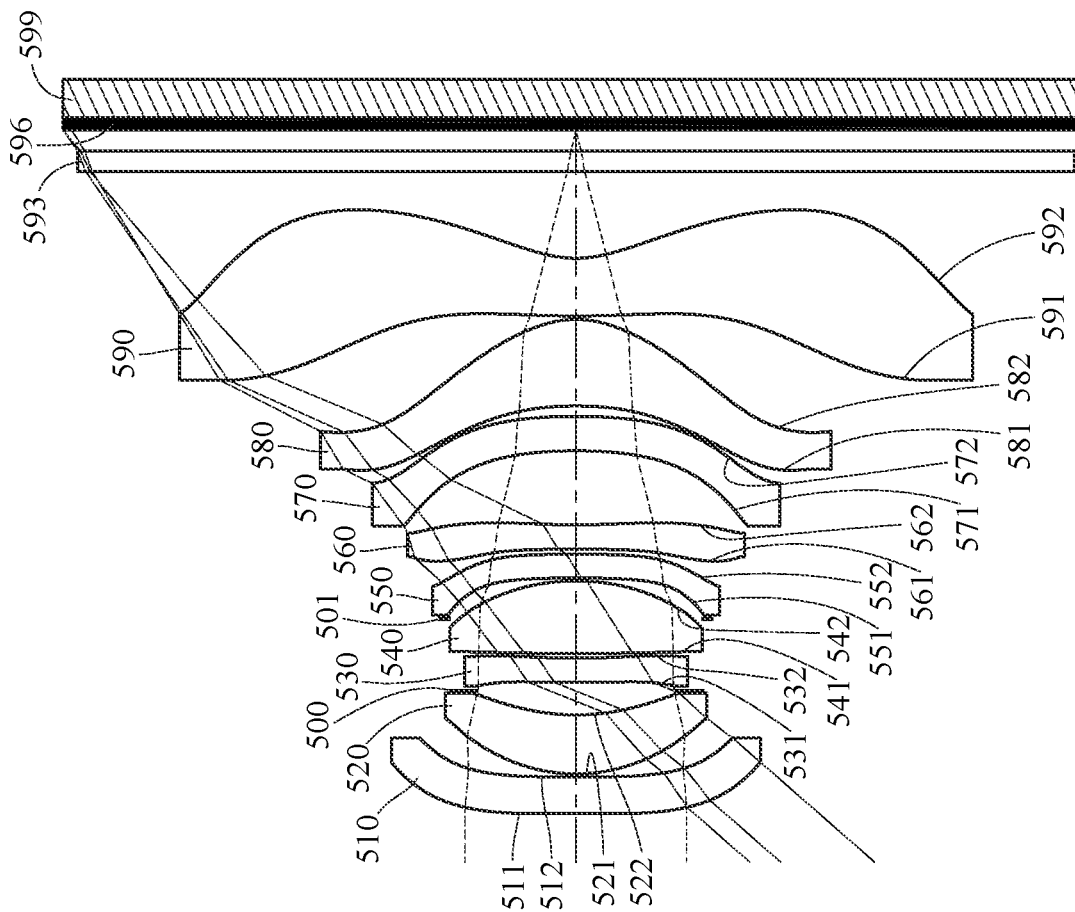
FIG. 9 is a schematic view of an image capturing unit according to the 5th embodiment of the present disclosure.
Figure 10:
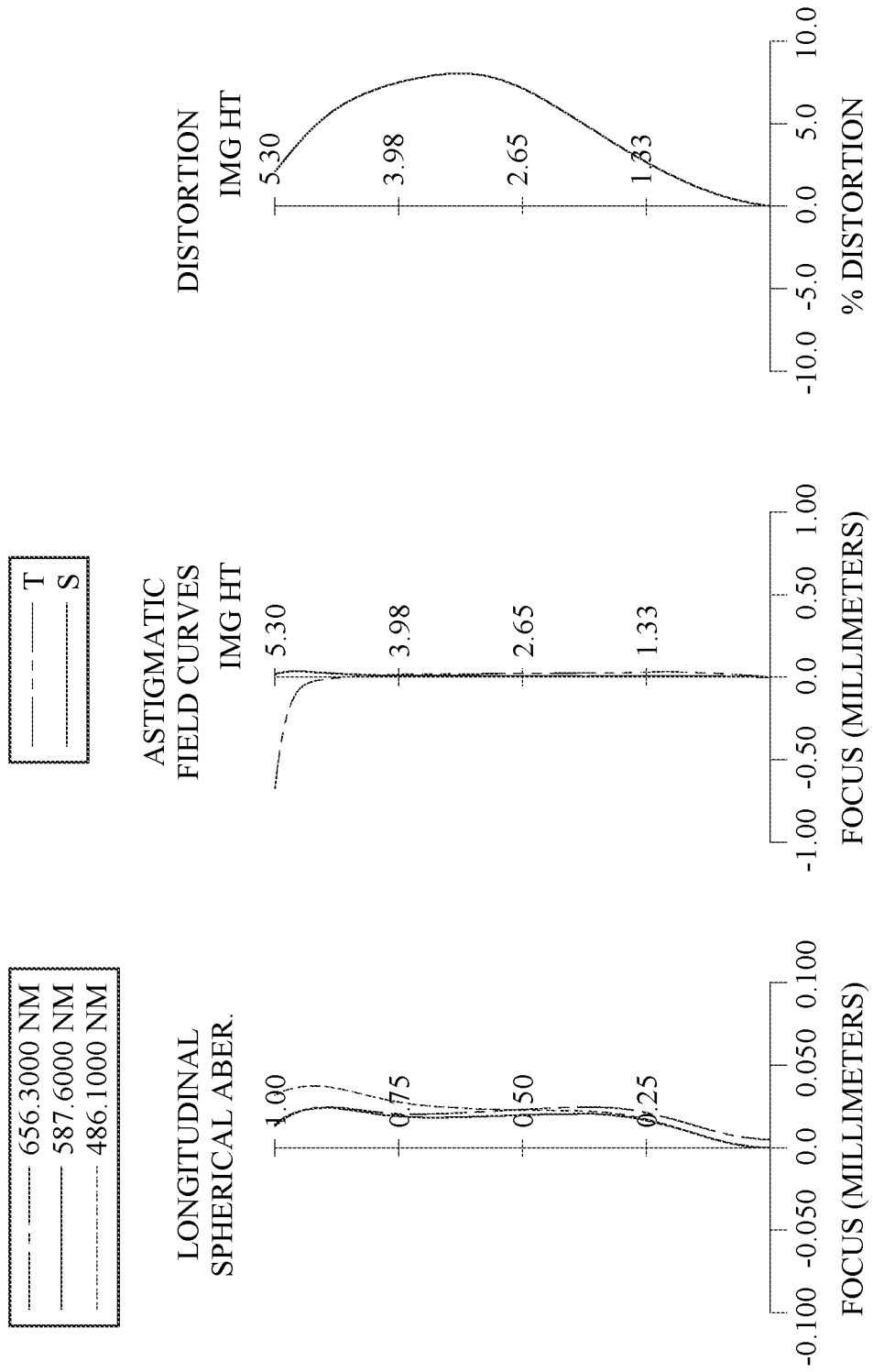
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens assembly (its reference numeral is omitted) of the present disclosure and an image sensor 599. The imaging optical lens assembly includes, in order from an object side to an image side along an optical path, a first lens element 510, a second lens element 520, an aperture stop 500, a third lens element 530, a fourth lens element 540, a stop 501, a fifth lens element 550, a sixth lens element 560, a seventh lens element 570, an eighth lens element 580, a ninth lens element 590, an IR-cut filter 593 and an image surface 596. The imaging optical lens assembly includes nine lens elements (510, 520, 530, 540, 550, 560, 570, 580 and 590) with no additional lens element disposed between each of the adjacent nine lens elements, wherein there is an air gap between each of all adjacent lens elements.

The first lens element 510 with negative refractive power has an object-side surface 511 being concave in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has at least one convex critical point in an off-axis region thereof.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being concave in a paraxial region thereof and an image-side surface 562 being concave in a paraxial region thereof. The sixth lens element 560 is made of plastic material and has the object-side surface 561 and the image-side surface 562 being both aspheric.

The seventh lens element 570 with negative refractive power has an object-side surface 571 being concave in a paraxial region thereof and an image-side surface 572 being convex in a paraxial region thereof. The seventh lens element 570 is made of plastic material and has the object-side surface 571 and the image-side surface 572 being both aspheric.

The eighth lens element 580 with positive refractive power has an object-side surface 581 being concave in a paraxial region thereof and an image-side surface 582 being convex in a paraxial region thereof. The eighth lens element 580 is made of plastic material and has the object-side surface 581 and the image-side surface 582 being both aspheric. The object-side surface 581 of the eighth lens element 580 has at least one critical point in an off-axis region thereof. The image-side surface 582 of the eighth lens element 580 has at least one critical point in an off-axis region thereof.

The ninth lens element 590 with negative refractive power has an object-side surface 591 being convex in a paraxial region thereof and an image-side surface 592 being concave in a paraxial region thereof. The ninth lens element 590 is made of plastic material and has the object-side surface 591 and the image-side surface 592 being both aspheric. The image-side surface 592 of the ninth lens element 590 has at least one convex critical point in an off-axis region thereof.

The IR-cut filter 593 is made of glass material and located between the ninth lens element 590 and the image surface 596, and will not affect the focal length of the imaging optical lens assembly. The image sensor 599 is disposed on or near the image surface 596 of the imaging optical lens assembly.

The detailed optical data of the 5th embodiment are shown in Table 9 and the aspheric surface data are shown in Table 10 below.

TABLE 9

5th Embodiment
f = 4.53 mm, Fno = 1.98, HFOV = 48.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −50.872 | (ASP) | 0.382 | Plastic | 1.639 | 23.5 | −52.75 |
| 2 | | 100.000 | (ASP) | 0.030 | | | | |
| 3 | Lens 2 | 1.685 | (ASP) | 0.611 | Plastic | 1.562 | 44.6 | 8.70 |
| 4 | | 2.237 | (ASP) | 0.247 | | | | |
| 5 | Ape. Stop | Plano | | 0.088 | | | | |
| 6 | Lens 3 | 13.336 | (ASP) | 0.253 | Plastic | 1.634 | 23.8 | −44.07 |
| 7 | | 8.961 | (ASP) | 0.050 | | | | |
| 8 | Lens 4 | 75.522 | (ASP) | 0.748 | Plastic | 1.544 | 56.0 | 4.16 |
| 9 | | −2.326 | (ASP) | −0.391 | | | | |
| 10 | Stop | Plano | | 0.421 | | | | |
| 11 | Lens 5 | −18.456 | (ASP) | 0.250 | Plastic | 1.614 | 26.0 | 18.04 |
| 12 | | −6.957 | (ASP) | 0.050 | | | | |
| 13 | Lens 6 | −12.343 | (ASP) | 0.250 | Plastic | 1.650 | 21.4 | −6.90 |
| 14 | | 7.094 | (ASP) | 0.768 | | | | |
| 15 | Lens 7 | −4.522 | (ASP) | 0.355 | Plastic | 1.705 | 14.0 | −23.00 |
| 16 | | −6.475 | (ASP) | 0.107 | | | | |
| 17 | Lens 8 | −3.863 | (ASP) | 0.897 | Plastic | 1.583 | 30.2 | 2.05 |
| 18 | | −0.989 | (ASP) | 0.035 | | | | |
| 19 | Lens 9 | 9.406 | (ASP) | 0.596 | Plastic | 1.639 | 23.5 | −1.97 |
| 20 | | 1.082 | (ASP) | 0.900 | | | | |
| 21 | IR-cut filter | Plano | | 0.210 | Glass | 1.517 | 64.2 | — |
| 22 | | Plano | | 0.218 | | | | |
| 23 | Image | Plano | | 0.000 | | | | |

Note:
Reference wavelength is 587.6 nm (d-line).
An effective radius of the stop 501 (Surface 10) is 1.320 mm.
An effective radius of the image-side surface 562 (Surface 14) is 1.740 mm.
An effective radius of the image-side surface 582 (Surface 18) is 2.640 mm.

TABLE 10

Aspheric Coefficients

| Surface # | 1 | 2 | 3 | 4 | 6 |
|---|---|---|---|---|---|
| k = | −1.6081E+01 | 7.1812E+01 | 5.4176E−02 | −4.7127E+00 | 0.0000E+00 |
| A4 = | 6.7229E−02 | 6.5590E−02 | −3.4110E−02 | 1.7508E−02 | −5.6096E−02 |
| A6 = | −3.6317E−02 | −4.2448E−02 | 1.7153E−03 | −2.2438E−02 | 4.0280E−03 |
| A8 = | 2.9144E−02 | 7.0982E−02 | 2.3154E−02 | 1.0308E−01 | −5.1750E−02 |
| A10 = | −1.7108E−02 | −7.9787E−02 | −3.1714E−02 | −2.4983E−01 | 7.9068E−02 |
| A12 = | 7.0669E−03 | 6.1373E−02 | 1.8730E−02 | 3.3401E−01 | −6.6430E−02 |
| A14 = | −1.8897E−03 | −3.0954E−02 | −4.6745E−03 | −2.4471E−01 | 2.1555E−02 |
| A16 = | 3.0099E−04 | 9.8612E−03 | — | 7.5031E−02 | — |
| A18 = | −2.3700E−05 | −1.7973E−03 | — | 4.3152E−03 | — |
| A20 = | 4.6918E−07 | 1.4093E−04 | — | −5.6702E−03 | — |

| Surface # | 7 | 8 | 9 | 11 | 12 |
|---|---|---|---|---|---|
| k = | 0.0000E+00 | 0.0000E+00 | −1.2545E+01 | 9.0000E+01 | 1.4745E+01 |
| A4 = | −3.2926E−02 | 2.5237E−03 | −1.8397E−01 | −4.1472E−02 | 1.8443E−01 |
| A6 = | 1.2324E−02 | 1.3082E−02 | 1.8672E−01 | −9.0251E−02 | −5.4575E−01 |
| A8 = | −2.7326E−02 | 1.1087E−02 | −1.3617E−01 | 1.8520E−01 | 6.5479E−01 |
| A10 = | 2.4650E−02 | −4.3027E−02 | 3.1375E−02 | −2.2474E−01 | −4.8097E−01 |
| A12 = | −2.5433E−02 | 2.7118E−02 | 2.1095E−02 | 1.2399E−01 | 2.1222E−01 |
| A14 = | 1.2896E−02 | −4.6812E−03 | −1.6190E−02 | −3.2442E−02 | −5.0067E−02 |
| A16 = | — | — | 2.9674E−03 | 3.4895E−03 | 4.8492E−03 |

| Surface # | 13 | 14 | 15 | 16 | 17 |
|---|---|---|---|---|---|
| k = | 1.7147E+01 | 1.2576E+01 | −8.7933E−01 | 0.0000E+00 | 2.2456E−01 |
| A4 = | 9.7863E−02 | −7.1038E−02 | −1.7567E−02 | −6.7046E−02 | −1.3590E−01 |
| A6 = | −3.3152E−01 | 2.2294E−02 | −4.0173E−02 | 4.4770E−02 | 1.5013E−01 |
| A8 = | 3.4346E−01 | −2.5780E−02 | 3.4255E−02 | −3.7956E−02 | −9.9902E−02 |
| A10 = | −1.7705E−01 | 3.6970E−02 | −1.9719E−02 | 2.1727E−02 | 4.2830E−02 |
| A12 = | 5.1249E−02 | −2.9764E−02 | 6.9045E−03 | −8.9811E−03 | −1.1893E−02 |
| A14 = | −7.9890E−03 | 1.3262E−02 | −1.0062E−03 | 2.6769E−03 | 2.1807E−03 |
| A16 = | 5.2623E−04 | −3.3272E−03 | −9.5990E−05 | −5.0427E−04 | −2.5843E−04 |
| A18 = | — | 4.3836E−04 | 3.3708E−05 | 5.2068E−05 | 1.8012E−05 |
| A20 = | — | −2.2728E−05 | — | −2.2452E−06 | −5.5997E−07 |

TABLE 10-continued

| Aspheric Coefficients | | | |
|---|---|---|---|
| Surface # | 18 | 19 | 20 |
| k = | −4.0153E+00 | −9.5370E−02 | −5.8862E+00 |
| A4 = | −1.0399E−01 | −3.1252E−02 | −2.6126E−02 |
| A6 = | 6.6124E−02 | 1.0296E−03 | 6.0695E−03 |
| A8 = | −2.9882E−02 | 4.5799E−04 | −1.2643E−03 |
| A10 = | 9.4716E−03 | −7.8978E−05 | 1.9832E−04 |
| A12 = | −1.7485E−03 | 8.6236E−06 | −2.2672E−05 |
| A14 = | 1.6656E−04 | −7.7866E−07 | 1.7537E−06 |
| A16 = | −5.4852E−06 | 4.8963E−08 | −8.5304E−08 |
| A18 = | −2.2391E−07 | −1.7250E−09 | 2.3360E−09 |
| A20 = | 1.5019E−08 | 2.5168E−11 | −2.7202E−11 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.53 | TL/[ImgH × tan(CRA)] | 2.02 |
| Fno | 1.98 | (R15 + R16)/(R15 − R16) | 1.69 |
| HFOV [deg.] | 48.8 | |f/R15| + |f/R16| | 5.76 |
| FOV [deg.] | 97.6 | |f/R16| + |f/R17| | 5.07 |
| V1/N1 | 14.34 | R18/ImgH | 0.20 |
| V2/N2 | 28.57 | Y92/BL | 3.09 |
| V3/N3 | 14.59 | Yc11/Y11 | 0.15 |
| V4/N4 | 36.26 | Yc92/Yc81 | 1.01 |
| V5/N5 | 16.09 | MaxET9/ET9 | 2.23 |
| V6/N6 | 12.96 | Y_MaxET9/Y92 | 0.70 |
| V7/N7 | 8.21 | f/f1 | −0.09 |
| V8/N8 | 19.11 | f/f2 | 0.52 |
| V9/N9 | 14.34 | f/f3 | −0.10 |
| V20 | 1 | f/f4 | 1.09 |
| V26 | 5 | f/f5 | 0.25 |
| V40 | 6 | f/f6 | −0.66 |
| Vmin | 14.0 | f/f7 | −0.20 |
| Td/ΣCT | 1.32 | f/f8 | 2.21 |
| TL/f | 1.56 | f/f9 | −2.30 |
| TL/ImgH | 1.33 | — | — |

6th Embodiment

Figure 11:
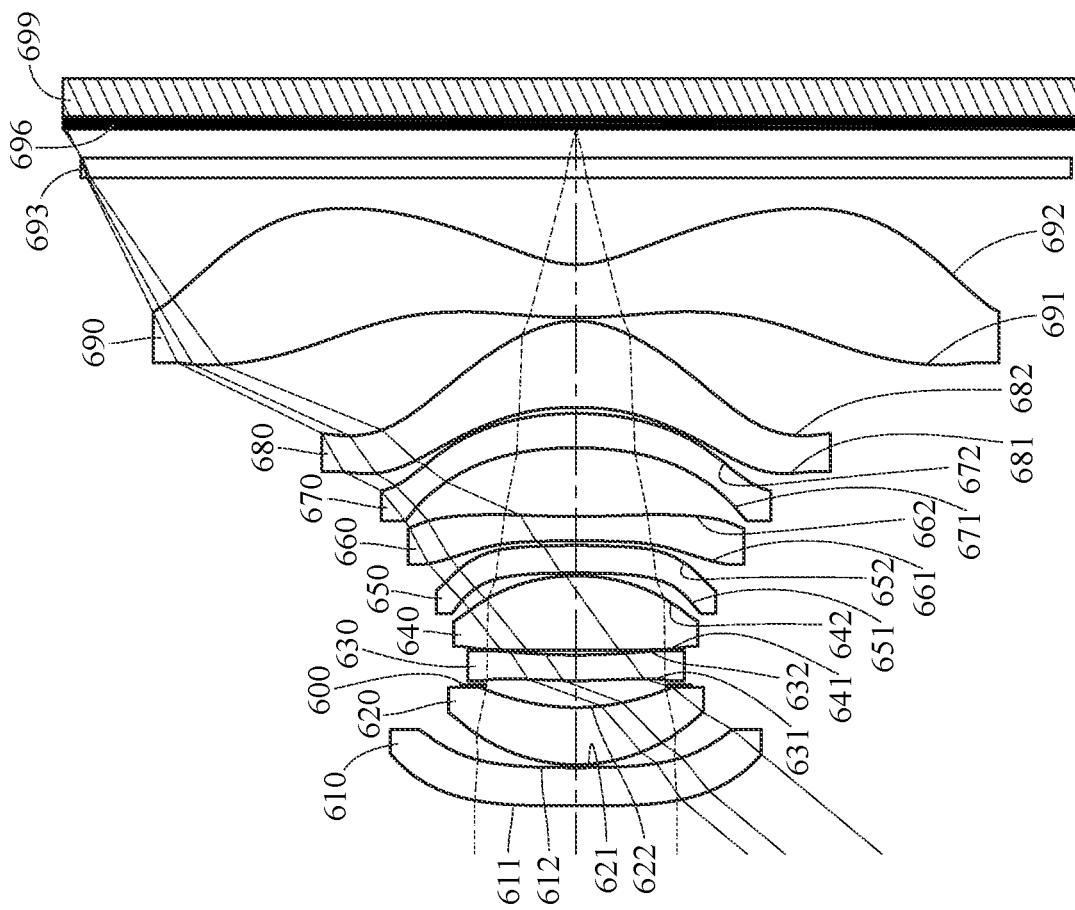
FIG. 11 is a schematic view of an image capturing unit according to the 6th embodiment of the present disclosure.
Figure 12:
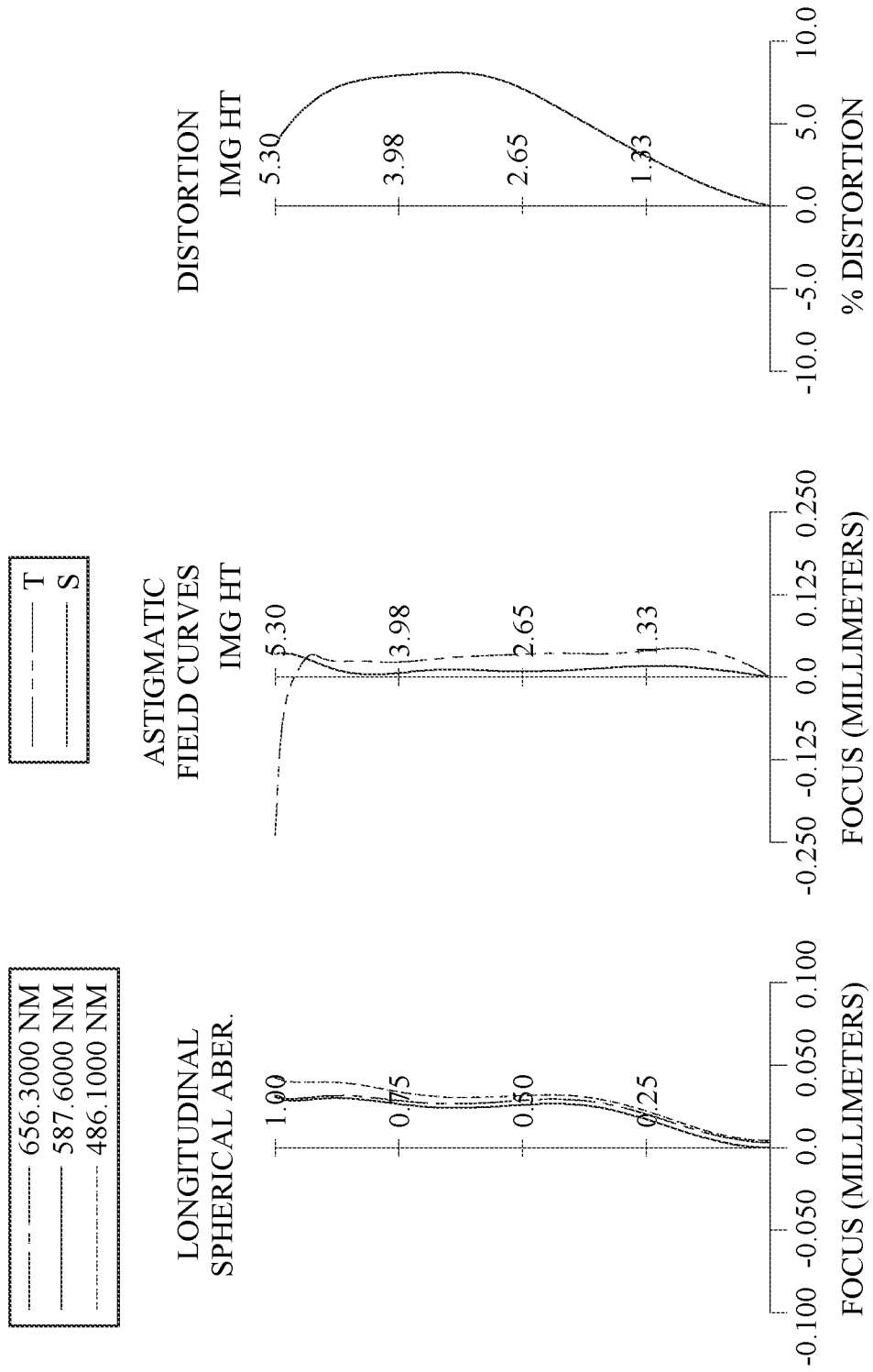
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens assembly (its reference numeral is omitted) of the present disclosure and an image sensor 699. The imaging optical lens assembly includes, in order from an object side to an image side along an optical path, a first lens element 610, a second lens element 620, an aperture stop 600, a third lens element 630, a fourth lens element 640, a fifth lens element 650, a sixth lens element 660, a seventh lens element 670, an eighth lens element 680, a ninth lens element 690, an IR-cut filter 693 and an image surface 696. The imaging optical lens assembly includes nine lens elements (610, 620, 630, 640, 650, 660, 670, 680 and 690) with no additional lens element disposed between each of the adjacent nine lens elements, wherein there is an air gap between each of all adjacent lens elements.

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric.

The seventh lens element 670 with positive refractive power has an object-side surface 671 being concave in a paraxial region thereof and an image-side surface 672 being convex in a paraxial region thereof. The seventh lens element 670 is made of plastic material and has the object-side surface 671 and the image-side surface 672 being both aspheric.

The eighth lens element 680 with positive refractive power has an object-side surface 681 being concave in a paraxial region thereof and an image-side surface 682 being convex in a paraxial region thereof. The eighth lens element 680 is made of plastic material and has the object-side surface 681 and the image-side surface 682 being both aspheric. The object-side surface 681 of the eighth lens element 680 has at least one critical point in an off-axis region thereof. The image-side surface 682 of the eighth lens element 680 has at least one critical point in an off-axis region thereof.

The ninth lens element 690 with negative refractive power has an object-side surface 691 being convex in a paraxial region thereof and an image-side surface 692 being concave in a paraxial region thereof. The ninth lens element 690 is made of plastic material and has the object-side surface 691 and the image-side surface 692 being both aspheric. The image-side surface 692 of the ninth lens element 690 has at least one convex critical point in an off-axis region thereof.

The IR-cut filter 693 is made of glass material and located between the ninth lens element 690 and the image surface 696, and will not affect the focal length of the imaging optical lens assembly. The image sensor 699 is disposed on or near the image surface 696 of the imaging optical lens assembly.

The detailed optical data of the 6th embodiment are shown in Table 11 and the aspheric surface data are shown in Table 12 below.

TABLE 11

6th Embodiment
f = 4.22 mm, Fno = 2.01, HFOV = 50.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 89.182 | (ASP) | 0.398 | Plastic | 1.614 | 26.0 | −37.92 |
| 2 | | 18.424 | (ASP) | 0.030 | | | | |
| 3 | Lens 2 | 1.758 | (ASP) | 0.595 | Plastic | 1.580 | 36.0 | 9.22 |
| 4 | | 2.294 | (ASP) | 0.230 | | | | |
| 5 | Ape. Stop | Plano | | 0.048 | | | | |
| 6 | Lens 3 | 6.608 | (ASP) | 0.266 | Plastic | 1.639 | 23.5 | −96.97 |
| 7 | | 5.877 | (ASP) | 0.050 | | | | |
| 8 | Lens 4 | 2525.715 | (ASP) | 0.774 | Plastic | 1.544 | 56.0 | 3.82 |
| 9 | | −2.078 | (ASP) | 0.030 | | | | |
| 10 | Lens 5 | −13.005 | (ASP) | 0.285 | Plastic | 1.639 | 23.5 | 20.99 |
| 11 | | −6.657 | (ASP) | 0.050 | | | | |
| 12 | Lens 6 | −9.075 | (ASP) | 0.250 | Plastic | 1.686 | 18.4 | −5.76 |
| 13 | | 7.083 | (ASP) | 0.716 | | | | |
| 14 | Lens 7 | −3.463 | (ASP) | 0.355 | Plastic | 1.705 | 14.0 | 143.88 |
| 15 | | −3.491 | (ASP) | 0.064 | | | | |
| 16 | Lens 8 | −3.340 | (ASP) | 0.898 | Plastic | 1.580 | 36.0 | 1.97 |
| 17 | | −0.935 | (ASP) | 0.035 | | | | |
| 18 | Lens 9 | 5.051 | (ASP) | 0.550 | Plastic | 1.650 | 21.4 | −1.91 |
| 19 | | 0.953 | (ASP) | 0.900 | | | | |
| 20 | IR-cut filter | Plano | | 0.210 | Glass | 1.517 | 64.2 | — |
| 21 | | Plano | | 0.300 | | | | |
| 22 | Image | Plano | | 0.000 | | | | |

Note:
Reference wavelength is 587.6 nm (d-line).
An effective radius of the image-side surface 662 (Surface 13) is 1.740 mm.
An effective radius of the image-side surface 682 (Surface 17) is 2.640 mm.

TABLE 12

Aspheric Coefficients

| Surface # | 1 | 2 | 3 | 4 | 6 |
|---|---|---|---|---|---|
| k = | 9.0000E+01 | 6.6782E+01 | 1.4078E−01 | −4.1517E+00 | 0.0000E+00 |
| A4 = | 5.6584E−02 | 5.5201E−02 | −2.9145E−02 | 1.5285E−02 | −5.5249E−02 |
| A6 = | −2.5495E−02 | −2.4475E−02 | 1.2346E−02 | 6.3313E−03 | −1.8440E−02 |
| A8 = | 1.8053E−02 | 3.7409E−02 | −1.7849E−03 | −3.7591E−02 | −2.4781E−02 |
| A10 = | −9.1285E−03 | −3.9424E−02 | −4.0358E−03 | 2.0220E−01 | 3.1896E−02 |
| A12 = | 3.0526E−03 | 2.8975E−02 | 4.7313E−03 | −5.5571E−01 | −2.1131E−02 |
| A14 = | −5.2061E−04 | −1.3636E−02 | −2.1768E−03 | 8.8770E−01 | 1.7255E−03 |
| A16 = | −5.0181E−06 | 3.7971E−03 | — | −8.3480E−01 | — |
| A18 = | 1.6244E−05 | −5.6394E−04 | — | 4.2217E−01 | — |
| A20 = | −1.7630E−06 | 3.3130E−05 | — | −8.8922E−02 | — |

| Surface # | 7 | 8 | 9 | 10 | 11 |
|---|---|---|---|---|---|
| k = | 0.0000E+00 | 0.0000E+00 | −7.4450E+00 | 8.0358E+01 | 1.8848E+01 |
| A4 = | −2.5084E−02 | 5.3439E−03 | −1.9455E−01 | −6.6900E−02 | 2.1148E−01 |
| A6 = | −1.0181E−02 | 1.9341E−02 | 2.0724E−01 | −4.8597E−02 | −5.8975E−01 |
| A8 = | −1.6287E−02 | −1.4584E−02 | −1.5153E−01 | 1.6263E−01 | 6.8793E−01 |
| A10 = | 1.6723E−02 | −9.9546E−03 | −4.7070E−03 | −2.5622E−01 | −5.3123E−01 |

TABLE 12-continued

| Aspheric Coefficients | | | | | |
|---|---|---|---|---|---|
| A12 = | −6.8401E−03 | 2.1225E−02 | 8.3255E−02 | 1.6861E−01 | 2.6047E−01 |
| A14 = | 2.2199E−03 | −6.6916E−03 | −5.2530E−02 | −5.9097E−02 | −7.3430E−02 |
| A16 = | — | — | 1.1685E−02 | 1.0278E−02 | 9.3016E−03 |

| Surface # | 12 | 13 | 14 | 15 | 16 |
|---|---|---|---|---|---|
| k = | 2.2122E+01 | 7.7763E+00 | −4.5605E+00 | 0.0000E+00 | 4.2734E−02 |
| A4 = | 1.0734E−01 | −8.4218E−02 | −2.0209E−02 | −9.6622E−02 | −1.9661E−01 |
| A6 = | −3.0807E−01 | 6.3528E−02 | −1.1136E−02 | 1.5271E−01 | 2.7462E−01 |
| A8 = | 2.3886E−01 | −8.9465E−02 | −3.6944E−02 | −1.6491E−01 | −2.0765E−01 |
| A10 = | −6.3290E−02 | 1.0338E−01 | 6.6978E−02 | 1.0915E−01 | 9.5309E−02 |
| A12 = | −7.5741E−03 | −7.2500E−02 | −4.9801E−02 | −4.7991E−02 | −2.7434E−02 |
| A14 = | 6.9453E−03 | 3.0086E−02 | 1.9802E−02 | 1.4052E−02 | 5.0471E−03 |
| A16 = | −9.6009E−04 | −7.2687E−03 | −4.1385E−03 | −2.5659E−03 | −5.8104E−04 |
| A18 = | — | 9.2779E−04 | 3.5576E−04 | 2.6007E−04 | 3.8329E−05 |
| A20 = | — | −4.6078E−05 | — | −1.1084E−05 | −1.1093E−06 |

| Surface # | 17 | 18 | 19 |
|---|---|---|---|
| k = | −3.9243E+00 | −3.0461E+00 | −5.0284E+00 |
| A4 = | −1.2230E−01 | −5.1565E−02 | −3.0297E−02 |
| A6 = | 7.6690E−02 | 1.2355E−02 | 7.8204E−03 |
| A8 = | −3.3880E−02 | −2.5642E−03 | −1.5936E−03 |
| A10 = | 1.1413E−02 | 4.0015E−04 | 2.2957E−04 |
| A12 = | −2.4992E−03 | −4.0966E−05 | −2.3216E−05 |
| A14 = | 3.3641E−04 | 2.6566E−06 | 1.5689E−06 |
| A16 = | −2.6785E−05 | −1.0556E−07 | −6.6275E−08 |
| A18 = | 1.1543E−06 | 2.3536E−09 | 1.5706E−09 |
| A20 = | −2.0835E−08 | −2.2608E−11 | −1.5869E−11 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.22 | TL/ImgH | 1.33 |
| Fno | 2.01 | TL/[ImgH × tan(CRA)] | 2.66 |
| HFOV [deg.] | 50.4 | (R15 + R16)/(R15 − R16) | 1.78 |
| FOV [deg.] | 100.8 | \|f/R15\| + \|f/R16\| | 5.78 |
| V1/N1 | 16.09 | \|f/R16\| + \|f/R17\| | 5.36 |
| V2/N2 | 22.78 | R18/ImgH | 0.18 |
| V3/N3 | 14.34 | Y92/BL | 3.11 |
| V4/N4 | 36.26 | Yc92/Yc81 | 1.10 |
| V5/N5 | 14.34 | MaxET9/ET9 | 2.69 |
| V6/N6 | 10.90 | Y_MaxET9/Y92 | 0.67 |
| V7/N7 | 8.21 | f/f1 | −0.11 |
| V8/N8 | 22.78 | f/f2 | 0.46 |
| V9/N9 | 12.96 | f/f3 | −0.04 |
| V20 | 2 | f/f4 | 1.11 |
| V26 | 5 | f/f5 | 0.20 |
| V40 | 7 | f/f6 | −0.73 |
| Vmin | 14.0 | f/f7 | 0.03 |
| Td/ΣCT | 1.29 | f/f8 | 2.14 |
| TL/f | 1.67 | f/f9 | −2.21 |

7th Embodiment

Figure 13:
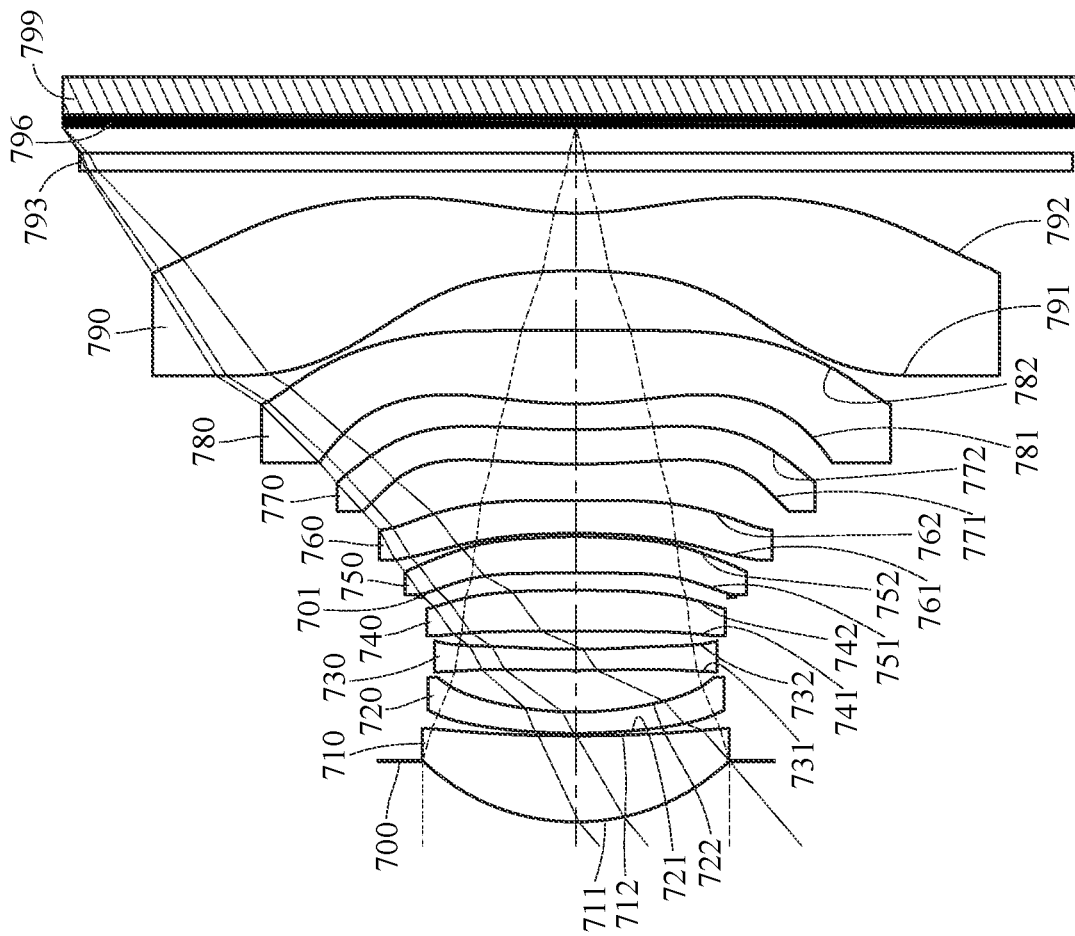
FIG. 13 is a schematic view of an image capturing unit according to the 7th embodiment of the present disclosure.
Figure 14:
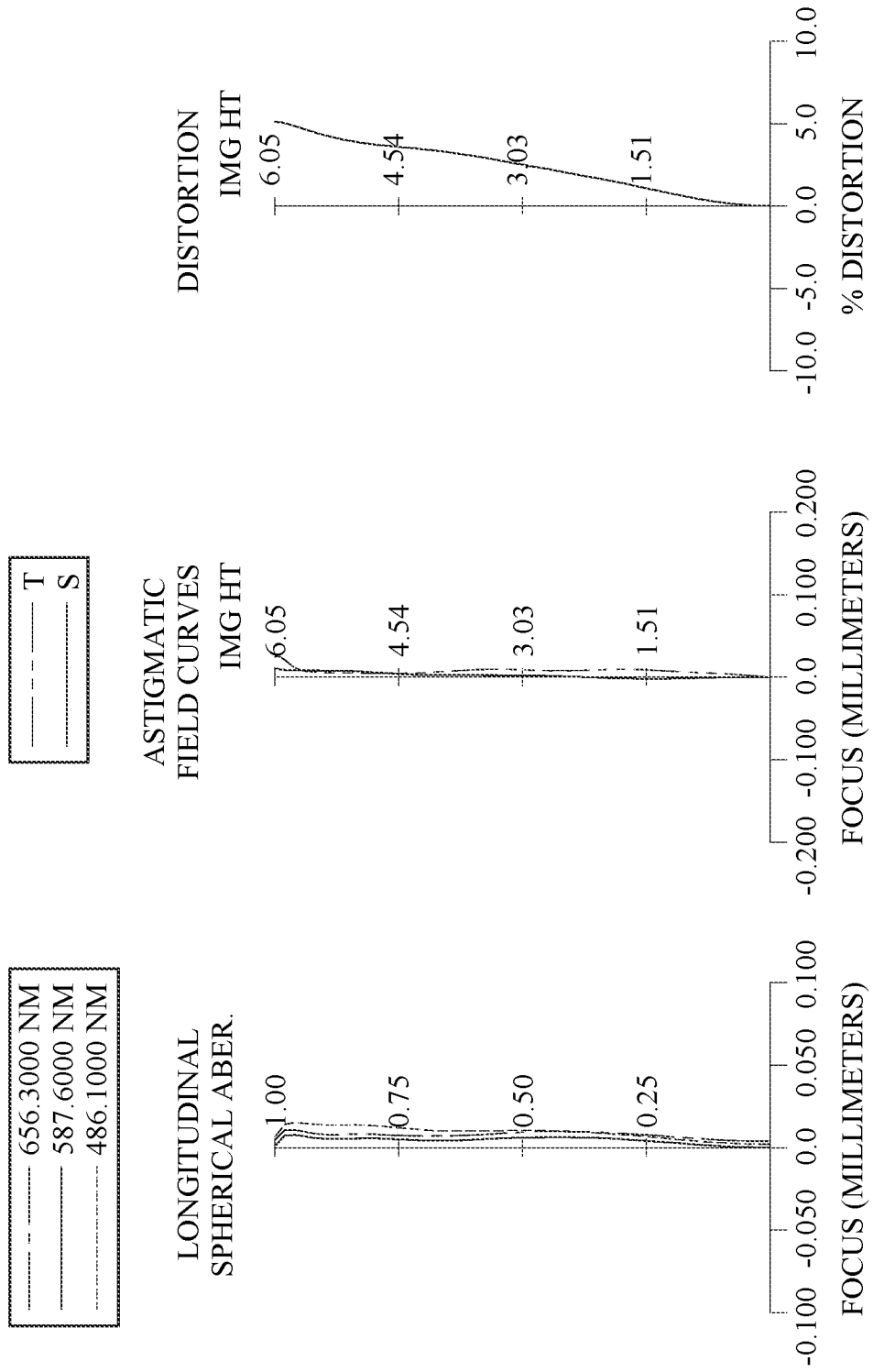
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens assembly (its reference numeral is omitted) of the present disclosure and an image sensor 799. The imaging optical lens assembly includes, in order from an object side to an image side along an optical path, an aperture stop 700, a first lens element 710, a second lens element 720, a third lens element 730, a fourth lens element 740, a stop 701, a fifth lens element 750, a sixth lens element 760, a seventh lens element 770, an eighth lens element 780, a ninth lens element 790, an IR-cut filter 793 and an image surface 796. The imaging optical lens assembly includes nine lens elements (710, 720, 730, 740, 750, 760, 770, 780 and 790) with no additional lens element disposed between each of the adjacent nine lens elements, wherein there is an air gap between each of all adjacent lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with negative refractive power has an object-side surface 761 being concave in a paraxial region thereof and an image-side surface 762 being concave in a paraxial region thereof. The sixth lens element 760 is made of plastic material and has the object-side surface 761 and the image-side surface 762 being both aspheric.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric.

The eighth lens element 780 with positive refractive power has an object-side surface 781 being convex in a paraxial region thereof and an image-side surface 782 being convex in a paraxial region thereof. The eighth lens element 780 is made of plastic material and has the object-side surface 781 and the image-side surface 782 being both aspheric. The object-side surface 781 of the eighth lens element 780 has at least one critical point in an off-axis region thereof.

The ninth lens element 790 with negative refractive power has an object-side surface 791 being concave in a paraxial region thereof and an image-side surface 792 being concave in a paraxial region thereof. The ninth lens element 790 is made of plastic material and has the object-side surface 791 and the image-side surface 792 being both aspheric. The image-side surface 792 of the ninth lens element 790 has at least one convex critical point in an off-axis region thereof.

The IR-cut filter 793 is made of glass material and located between the ninth lens element 790 and the image surface 796, and will not affect the focal length of the imaging optical lens assembly. The image sensor 799 is disposed on or near the image surface 796 of the imaging optical lens assembly.

The detailed optical data of the 7th embodiment are shown in Table 13 and the aspheric surface data are shown in Table 14 below.

TABLE 13

7th Embodiment
f = 6.74 mm, Fno = 1.86, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.719 | | | | |
| 2 | Lens 1 | 2.653 | (ASP) | 1.016 | Plastic | 1.544 | 56.0 | 5.67 |
| 3 | | 16.304 | (ASP) | 0.030 | | | | |
| 4 | Lens 2 | 6.840 | (ASP) | 0.252 | Plastic | 1.669 | 19.5 | −16.02 |
| 5 | | 4.114 | (ASP) | 0.490 | | | | |
| 6 | Lens 3 | 13.271 | (ASP) | 0.250 | Plastic | 1.660 | 20.4 | −43.74 |
| 7 | | 9.023 | (ASP) | 0.213 | | | | |
| 8 | Lens 4 | 255.563 | (ASP) | 0.484 | Plastic | 1.544 | 56.0 | 36.81 |
| 9 | | −21.711 | (ASP) | −0.076 | | | | |
| 10 | Stop | Plano | | 0.281 | | | | |
| 11 | Lens 5 | −71.842 | (ASP) | 0.429 | Plastic | 1.544 | 56.0 | 13.20 |
| 12 | | −6.542 | (ASP) | 0.040 | | | | |
| 13 | Lens 6 | −8.196 | (ASP) | 0.388 | Plastic | 1.584 | 28.2 | −13.15 |
| 14 | | 125.614 | (ASP) | 0.430 | | | | |
| 15 | Lens 7 | 10.227 | (ASP) | 0.405 | Plastic | 1.642 | 22.5 | −303.12 |
| 16 | | 9.566 | (ASP) | 0.305 | | | | |
| 17 | Lens 8 | 5.184 | (ASP) | 0.870 | Plastic | 1.559 | 40.4 | 8.14 |
| 18 | | −34.696 | (ASP) | 0.702 | | | | |
| 19 | Lens 9 | −7.691 | (ASP) | 0.682 | Plastic | 1.559 | 40.4 | −4.67 |
| 20 | | 4.078 | (ASP) | 0.500 | | | | |
| 21 | IR-cut filter | Plano | | 0.210 | Glass | 1.517 | 64.2 | — |
| 22 | | Plano | | 0.301 | | | | |
| 23 | Image | Plano | | 0.000 | | | | |

Note:
Reference wavelength is 587.6 nm (d-line).
An effective radius of the stop 701 (Surface 10) is 1.800 mm.

TABLE 14

Aspheric Coefficients

| Surface # | 2 | 3 | 4 | 5 | 6 |
|---|---|---|---|---|---|
| k = | −6.3440E−01 | −9.8009E+01 | −3.5090E+00 | 1.6069E+00 | 1.3053E−16 |
| A4 = | 5.0326E−03 | −3.1444E−03 | −1.0242E−02 | −9.4693E−03 | −2.6042E−02 |
| A6 = | 1.2156E−03 | 7.8923E−03 | 9.9379E−03 | 3.4250E−03 | −1.6767E−03 |
| A8 = | −8.3765E−04 | −6.2594E−03 | −4.7832E−03 | −2.0737E−05 | 9.5461E−04 |
| A10 = | 7.0408E−04 | 3.1104E−03 | 2.0328E−03 | 2.0033E−04 | 1.3237E−03 |
| A12 = | −3.1662E−04 | −9.7349E−04 | −4.2357E−04 | 4.4109E−05 | −3.4588E−04 |

TABLE 14-continued

| Aspheric Coefficients | | | | | |
|---|---|---|---|---|---|
| A14 = | 7.4471E−05 | 1.7105E−04 | 3.8308E−05 | 9.2970E−06 | −2.6787E−06 |
| A16 = | −7.7163E−06 | −1.3556E−05 | — | — | — |

| Surface # | 7 | 8 | 9 | 11 | 12 |
|---|---|---|---|---|---|
| k = | 9.7944E+00 | −1.0000E+00 | 9.9000E+01 | −1.0000E+00 | 5.3458E+00 |
| A4 = | −2.1989E−02 | −3.3613E−03 | −8.6213E−03 | 1.8650E−03 | 8.0594E−02 |
| A6 = | −1.2458E−03 | −4.5661E−03 | −1.6590E−02 | −4.0324E−02 | −1.3641E−01 |
| A8 = | −5.5245E−04 | 6.3908E−03 | 2.1496E−02 | 3.2934E−02 | 1.1066E−01 |
| A10 = | 2.5511E−03 | −1.0872E−02 | −1.8780E−02 | −2.1042E−02 | −5.6795E−02 |
| A12 = | −7.1734E−04 | 9.0474E−03 | 1.0193E−02 | 9.1456E−03 | 1.8492E−02 |
| A14 = | 5.0934E−05 | −3.9997E−03 | −3.3307E−03 | −2.3135E−03 | −3.5814E−03 |
| A16 = | — | 9.2931E−04 | 6.1269E−04 | 3.2277E−04 | 3.6863E−04 |
| A18 = | — | −8.7601E−05 | −4.7878E−05 | −2.2837E−05 | −1.5236E−05 |
| A20 = | — | — | — | 6.4957E−07 | — |

| Surface # | 13 | 14 | 15 | 16 | 17 |
|---|---|---|---|---|---|
| k = | −7.6161E−01 | −1.0000E+00 | −7.8470E−01 | −1.5470E+01 | −5.5689E−01 |
| A4 = | 3.8545E−02 | −3.2531E−02 | −4.9171E−03 | −1.6845E−02 | −1.9858E−02 |
| A6 = | −9.9425E−02 | 6.9859E−04 | −3.9405E−03 | 3.4233E−03 | −2.1534E−03 |
| A8 = | 9.1659E−02 | 4.6921E−03 | −2.4622E−05 | −1.9062E−03 | 9.5908E−04 |
| A10 = | −4.6979E−02 | −2.3106E−03 | −1.1366E−04 | 1.7466E−04 | −2.9915E−04 |
| A12 = | 1.4501E−02 | 5.3909E−04 | 1.4146E−04 | 1.3087E−04 | 8.7030E−05 |
| A14 = | −2.6572E−03 | −8.6000E−05 | −4.6571E−05 | −4.9760E−05 | −1.6565E−05 |
| A16 = | 2.6547E−04 | 1.3683E−05 | 6.3748E−06 | 7.7990E−06 | 1.7912E−06 |
| A18 = | −1.1119E−05 | −1.6356E−06 | −3.0919E−07 | −5.9116E−07 | −1.0266E−07 |
| A20 = | — | 8.1882E−08 | — | 1.7680E−08 | 2.4778E−09 |

| Surface # | | 18 | 19 | 20 |
|---|---|---|---|---|
| k = | | −1.0000E+00 | −6.0654E−01 | −1.2092E+00 |
| A4 = | | 1.7764E−02 | −1.6197E−02 | −3.0619E−02 |
| A6 = | | −1.1235E−02 | −2.7133E−03 | 4.3816E−03 |
| A8 = | | 2.4702E−03 | 1.4209E−03 | −4.5887E−04 |
| A10 = | | −2.6802E−04 | −2.1320E−04 | 3.4186E−05 |
| A12 = | | 1.0363E−05 | 1.7535E−05 | −1.8161E−06 |
| A14 = | | 7.2313E−07 | −8.8245E−07 | 6.7012E−08 |
| A16 = | | −1.0268E−07 | 2.7196E−08 | −1.6085E−09 |
| A18 = | | 4.6071E−09 | −4.7278E−10 | 2.2510E−11 |
| A20 = | | −7.6087E−11 | 3.5483E−12 | −1.4222E−13 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.74 | TL/ImgH | 1.36 |
| Fno | 1.86 | TL/[ImgH × tan(CRA)] | 1.93 |
| HFOV [deg.] | 40.5 | (R15 + R16)/(R15 − R16) | −0.74 |
| FOV [deg.] | 81.0 | |f/R15| + |f/R16| | 1.49 |
| V1/N1 | 36.26 | |f/R16| + |f/R17| | 1.07 |
| V2/N2 | 11.65 | R18/ImgH | 0.67 |
| V3/N3 | 12.29 | Y92/BL | 4.94 |
| V4/N4 | 36.26 | Yc92/Yc81 | 1.36 |
| V5/N5 | 36.26 | MaxET9/ET9 | 1.54 |
| V6/N6 | 17.83 | Y_MaxET9/Y92 | 0.66 |
| V7/N7 | 13.70 | f/f1 | 1.19 |
| V8/N8 | 25.95 | f/f2 | −0.42 |
| V9/N9 | 25.95 | f/f3 | −0.15 |
| V20 | 1 | f/f4 | 0.18 |
| V26 | 3 | f/f5 | 0.51 |
| V40 | 4 | f/f6 | −0.51 |
| Vmin | 19.5 | f/f7 | −0.02 |

| -continued | | | |
|---|---|---|---|
| 7th Embodiment | | | |
| Td/ΣCT | 1.51 | f/f8 | 0.83 |
| TL/f | 1.22 | f/f9 | −1.44 |

8th Embodiment

Figure 15:
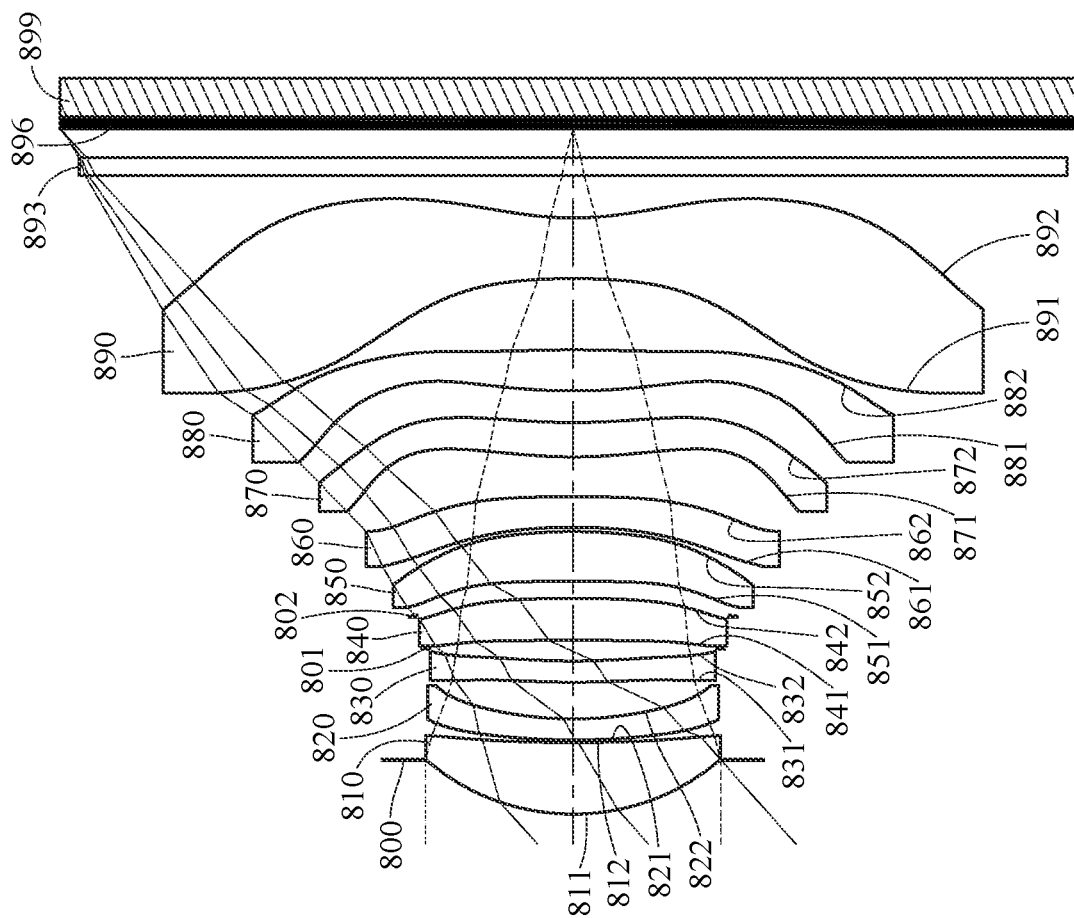
FIG. 15 is a schematic view of an image capturing unit according to the 8th embodiment of the present disclosure.
Figure 16:
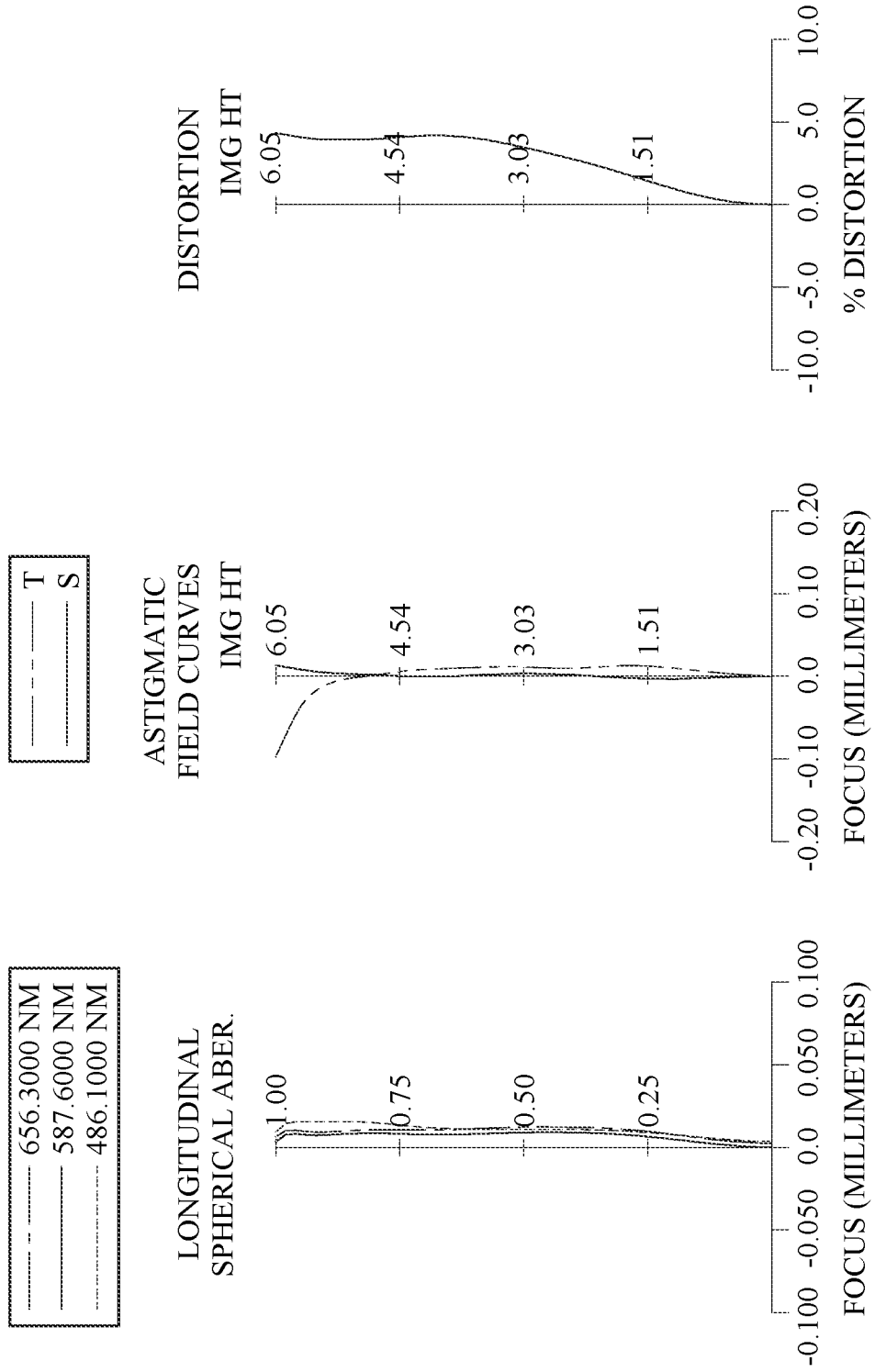
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging optical lens assembly (its reference numeral is omitted) of the present disclosure and an image sensor 899. The imaging optical lens assembly includes, in order from an object side to an image side along an optical path, an aperture stop 800, a first lens element 810, a second lens element 820, a third lens element 830, a stop 801, a fourth lens element 840, a stop 802, a fifth lens element 850, a sixth lens element 860, a seventh lens element 870, an eighth lens element 880, a ninth lens element 890, an IR-cut filter 893 and an image surface 896. The imaging optical lens assembly includes nine lens elements (810, 820, 830, 840, 850, 860, 870, 880 and 890) with no additional lens element disposed between each of the adjacent nine lens elements, wherein there is an air gap between each of all adjacent lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with negative refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric.

The seventh lens element 870 with positive refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric.

The eighth lens element 880 with positive refractive power has an object-side surface 881 being convex in a paraxial region thereof and an image-side surface 882 being convex in a paraxial region thereof. The eighth lens element 880 is made of plastic material and has the object-side surface 881 and the image-side surface 882 being both aspheric. The object-side surface 881 of the eighth lens element 880 has at least one critical point in an off-axis region thereof. The image-side surface 882 of the eighth lens element 880 has at least one critical point in an off-axis region thereof.

The ninth lens element 890 with negative refractive power has an object-side surface 891 being concave in a paraxial region thereof and an image-side surface 892 being concave in a paraxial region thereof. The ninth lens element 890 is made of plastic material and has the object-side surface 891 and the image-side surface 892 being both aspheric. The image-side surface 892 of the ninth lens element 890 has at least one convex critical point in an off-axis region thereof.

The IR-cut filter 893 is made of glass material and located between the ninth lens element 890 and the image surface 896, and will not affect the focal length of the imaging optical lens assembly. The image sensor 899 is disposed on or near the image surface 896 of the imaging optical lens assembly.

The detailed optical data of the 8th embodiment are shown in Table 15 and the aspheric surface data are shown in Table 16 below.

TABLE 15

8th Embodiment
f = 6.48 mm, Fno = 1.86, HFOV = 41.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.643 | | | | |
| 2 | Lens 1 | 2.721 | (ASP) | 0.845 | Plastic | 1.544 | 56.0 | 5.80 |
| 3 | | 17.632 | (ASP) | 0.030 | | | | |
| 4 | Lens 2 | 7.773 | (ASP) | 0.250 | Plastic | 1.639 | 23.3 | −15.57 |
| 5 | | 4.308 | (ASP) | 0.434 | | | | |
| 6 | Lens 3 | 10.204 | (ASP) | 0.250 | Plastic | 1.669 | 19.5 | −62.09 |
| 7 | | 8.111 | (ASP) | 0.151 | | | | |
| 8 | Stop | Plano | | 0.092 | | | | |
| 9 | Lens 4 | 564.214 | (ASP) | 0.496 | Plastic | 1.544 | 56.0 | 39.00 |
| 10 | | −22.041 | (ASP) | −0.208 | | | | |
| 11 | Stop | Plano | | 0.410 | | | | |
| 12 | Lens 5 | −78.263 | (ASP) | 0.589 | Plastic | 1.544 | 56.0 | 11.32 |
| 13 | | −5.725 | (ASP) | 0.052 | | | | |
| 14 | Lens 6 | −6.116 | (ASP) | 0.360 | Plastic | 1.686 | 18.4 | −10.91 |
| 15 | | −34.287 | (ASP) | 0.471 | | | | |
| 16 | Lens 7 | 5.841 | (ASP) | 0.406 | Plastic | 1.686 | 18.4 | 42.48 |
| 17 | | 7.099 | (ASP) | 0.374 | | | | |
| 18 | Lens 8 | 7.281 | (ASP) | 0.486 | Plastic | 1.584 | 28.2 | 7.83 |
| 19 | | −11.997 | (ASP) | 0.842 | | | | |
| 20 | Lens 9 | −8.291 | (ASP) | 0.717 | Plastic | 1.583 | 30.2 | −4.20 |
| 21 | | 3.578 | (ASP) | 0.500 | | | | |

TABLE 15-continued

8th Embodiment
f = 6.48 mm, Fno = 1.86, HFOV = 41.8 deg.

| Surface # | | Curvature Radius | Thickness | Material | Index | Abbe # | Focal Length |
|---|---|---|---|---|---|---|---|
| 22 | IR-cut filter | Plano | 0.210 | Glass | 1.517 | 64.2 | — |
| 23 | | Plano | 0.342 | | | | |
| 24 | Image | Plano | 0.000 | | | | |

Note:
Reference wavelength is 587.6 nm (d-line).
An effective radius of the stop 801 (Surface 8) is 1.700 mm.
An effective radius of the stop 802 (Surface 11) is 1.850 mm.

TABLE 16

Aspheric Coefficients

| Surface # | 2 | 3 | 4 | 5 | 6 |
|---|---|---|---|---|---|
| k = | −6.5811E−01 | −7.1296E+01 | −3.6358E+00 | 1.7984E+00 | −4.9466E+00 |
| A4 = | 5.2638E−03 | −1.1560E−03 | −8.2514E−03 | −9.8125E−03 | −2.3840E−02 |
| A6 = | 1.7006E−03 | 4.8320E−03 | 7.8728E−03 | 4.0797E−03 | −1.9735E−03 |
| A8 = | −1.5180E−03 | −3.2612E−03 | −2.7870E−03 | −5.5509E−04 | 1.3948E−03 |
| A10 = | 1.3160E−03 | 1.3998E−03 | 8.9037E−04 | 5.6201E−04 | 6.5379E−04 |
| A12 = | −6.2472E−04 | −4.3817E−04 | −1.0975E−04 | −1.4223E−04 | −1.3108E−04 |
| A14 = | 1.5622E−04 | 8.7278E−05 | 7.7234E−06 | 5.1273E−05 | −1.5682E−05 |
| A16 = | −1.7292E−05 | −9.1524E−06 | — | — | — |

| Surface # | 7 | 9 | 10 | 12 | 13 |
|---|---|---|---|---|---|
| k = | 8.1282E+00 | −1.0000E+00 | 9.4811E+01 | −1.0000E+00 | 5.2172E+00 |
| A4 = | −2.1475E−02 | −6.9424E−03 | −1.4555E−02 | −1.3769E−02 | 4.6930E−02 |
| A6 = | −2.4315E−03 | −4.1893E−03 | −1.0815E−02 | −1.8472E−02 | −9.0059E−02 |
| A8 = | 1.4642E−03 | 3.6932E−03 | 1.2420E−02 | 1.3098E−02 | 7.4172E−02 |
| A10 = | 9.1407E−04 | −5.2927E−03 | −9.8664E−03 | −7.7018E−03 | −3.6787E−02 |
| A12 = | −1.7960E−04 | 4.3330E−03 | 5.2420E−03 | 3.6569E−03 | 1.1158E−02 |
| A14 = | −1.6134E−05 | −1.8279E−03 | −1.6694E−03 | −1.0811E−03 | −1.9777E−03 |
| A16 = | — | 3.9709E−04 | 2.8930E−04 | 1.7416E−04 | 1.8501E−04 |
| A18 = | — | −3.4172E−05 | −2.0188E−05 | −1.1666E−05 | −6.8661E−06 |
| A20 = | — | — | — | 2.8030E−08 | — |

| Surface # | 14 | 15 | 16 | 17 | 18 |
|---|---|---|---|---|---|
| k = | 1.0746E+00 | −1.0000E+00 | −6.5697E+00 | −1.9940E+01 | 1.7628E+00 |
| A4 = | 2.0580E−02 | −2.8999E−02 | −1.8060E−02 | −1.8476E−02 | 9.8437E−04 |
| A6 = | −6.6525E−02 | −7.2640E−04 | 3.0974E−03 | 3.7028E−03 | −4.9765E−03 |
| A8 = | 6.5307E−02 | 8.1007E−03 | −1.6741E−03 | −2.0244E−03 | −1.6894E−04 |
| A10 = | −3.4557E−02 | −5.4868E−03 | 2.9742E−04 | 5.0815E−04 | 1.8429E−04 |
| A12 = | 1.0705E−02 | 1.9826E−03 | −1.8971E−06 | −6.0001E−05 | −1.0209E−05 |
| A14 = | −1.9293E−03 | −4.5065E−04 | −1.1041E−05 | −2.1029E−07 | −2.0396E−06 |
| A16 = | 1.8822E−04 | 6.5727E−05 | 1.8375E−06 | 9.8659E−07 | 2.0234E−07 |
| A18 = | −7.7323E−06 | −5.5423E−06 | −8.7830E−08 | −1.0640E−07 | 4.3602E−10 |
| A20 = | — | 2.0097E−07 | — | 3.6093E−09 | −3.5117E−10 |

| Surface # | 19 | 20 | 21 |
|---|---|---|---|
| k = | −1.0000E+00 | −2.8949E+00 | −1.4341E+00 |
| A4 = | 3.3724E−02 | −1.8328E−02 | −3.2740E−02 |
| A6 = | −9.6702E−03 | −2.7587E−03 | 5.0286E−03 |
| A8 = | −2.5026E−04 | 1.3533E−03 | −6.1919E−04 |
| A10 = | 5.9676E−04 | −1.7476E−04 | 5.7647E−05 |
| A12 = | −1.3237E−04 | 1.0822E−05 | −3.8686E−06 |
| A14 = | 1.4613E−05 | −3.0202E−07 | 1.7348E−07 |
| A16 = | −9.0533E−07 | −1.8529E−10 | −4.8180E−09 |
| A18 = | 3.0108E−08 | 2.0583E−10 | 7.4703E−11 |
| A20 = | −4.1941E−10 | −3.4018E−12 | −4.9861E−13 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 6.48 | TL/ImgH | 1.34 |
| Fno | 1.86 | TL/[ImgH × tan(CRA)] | 1.91 |
| HFOV [deg.] | 41.8 | (R15 + R16)/(R15 − R16) | −0.24 |
| FOV [deg.] | 83.6 | |f/R15| + |f/R16| | 1.43 |
| V1/N1 | 36.26 | |f/R16| + |f/R17| | 1.32 |
| V2/N2 | 14.21 | R18/ImgH | 0.59 |
| V3/N3 | 11.65 | Y92/BL | 4.61 |
| V4/N4 | 36.26 | Yc92/Yc81 | 1.32 |
| V5/N5 | 36.26 | MaxET9/ET9 | 1.99 |
| V6/N6 | 10.90 | Y_MaxET9/Y92 | 0.66 |
| V7/N7 | 10.90 | f/f1 | 1.12 |
| V8/N8 | 17.83 | f/f2 | −0.42 |
| V9/N9 | 19.11 | f/f3 | −0.10 |
| V20 | 3 | f/f4 | 0.17 |
| V26 | 4 | f/f5 | 0.57 |
| V40 | 6 | f/f6 | −0.59 |
| Vmin | 18.4 | f/f7 | 0.15 |
| Td/ΣCT | 1.60 | f/f8 | 0.83 |
| TL/f | 1.25 | f/f9 | −1.54 |

9th Embodiment

Figure 17:
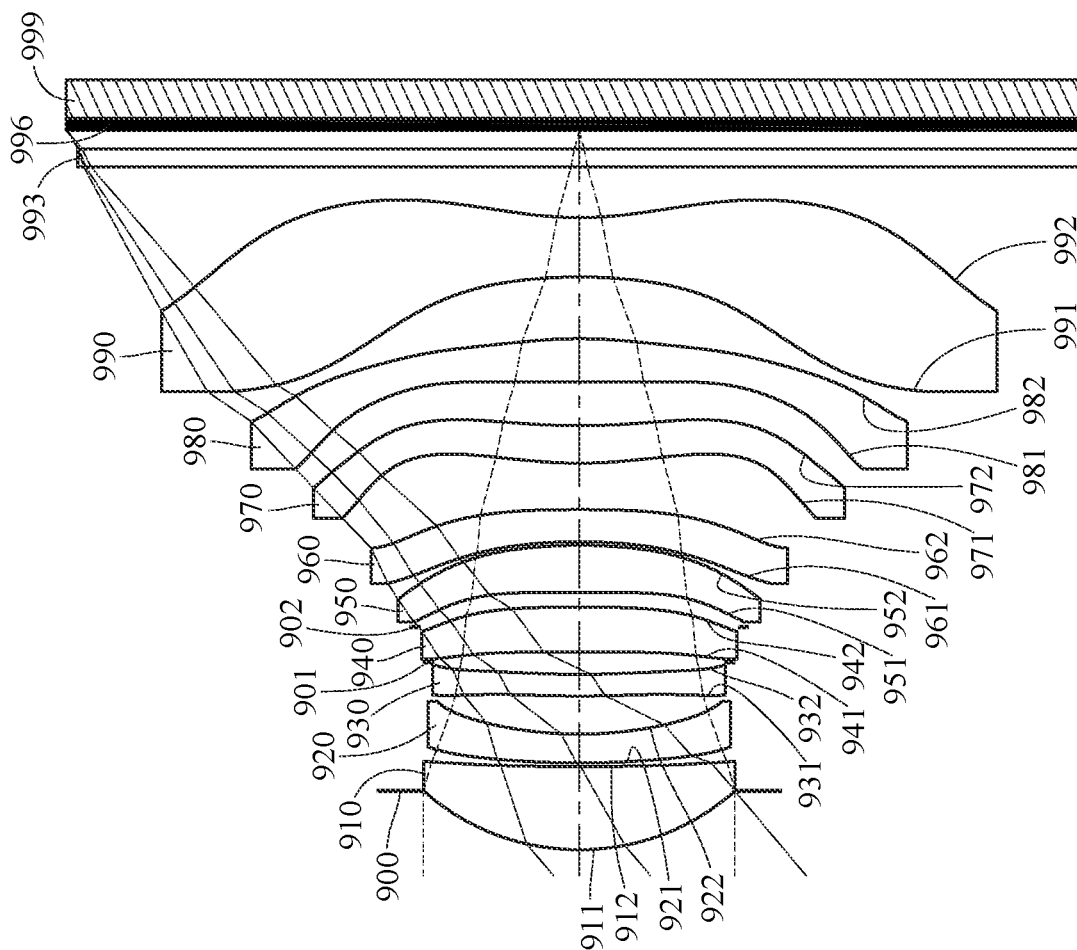
FIG. 17 is a schematic view of an image capturing unit according to the 9th embodiment of the present disclosure.
Figure 18:
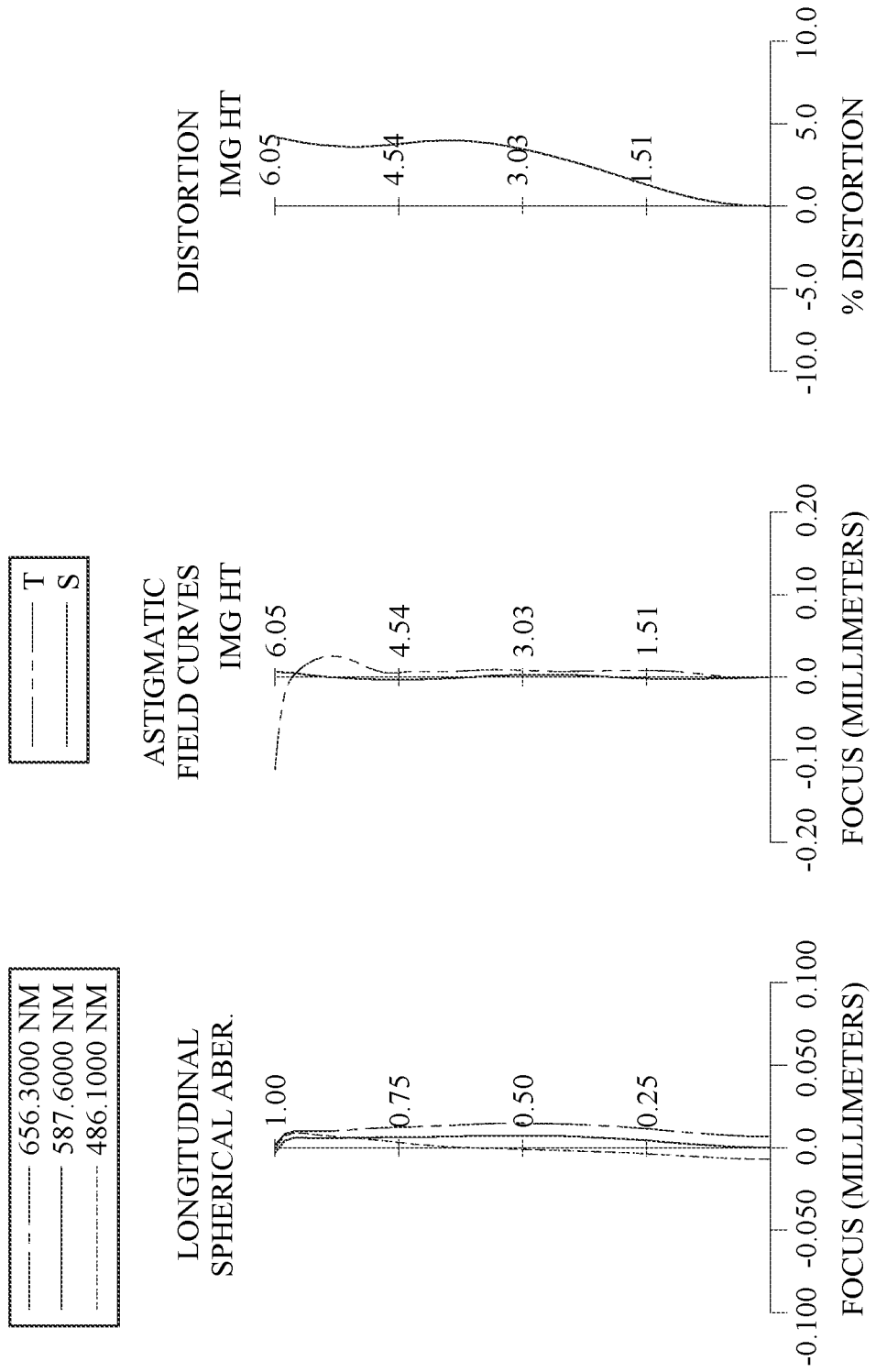
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging optical lens assembly (its reference numeral is omitted) of the present disclosure and an image sensor 999. The imaging optical lens assembly includes, in order from an object side to an image side along an optical path, an aperture stop 900, a first lens element 910, a second lens element 920, a third lens element 930, a stop 901, a fourth lens element 940, a stop 902, a fifth lens element 950, a sixth lens element 960, a seventh lens element 970, an eighth lens element 980, a ninth lens element 990, an IR-cut filter 993 and an image surface 996. The imaging optical lens assembly includes nine lens elements (910, 920, 930, 940, 950, 960, 970, 980 and 990) with no additional lens element disposed between each of the adjacent nine lens elements, wherein there is an air gap between each of all adjacent lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric.

The sixth lens element 960 with negative refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric.

The seventh lens element 970 with positive refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both aspheric.

The eighth lens element 980 with positive refractive power has an object-side surface 981 being concave in a paraxial region thereof and an image-side surface 982 being convex in a paraxial region thereof. The eighth lens element 980 is made of plastic material and has the object-side surface 981 and the image-side surface 982 being both aspheric. The object-side surface 981 of the eighth lens element 980 has at least one critical point in an off-axis region thereof.

The ninth lens element 990 with negative refractive power has an object-side surface 991 being concave in a paraxial region thereof and an image-side surface 992 being concave in a paraxial region thereof. The ninth lens element 990 is made of plastic material and has the object-side surface 991 and the image-side surface 992 being both aspheric. The image-side surface 992 of the ninth lens element 990 has at least one convex critical point in an off-axis region thereof.

The IR-cut filter 993 is made of glass material and located between the ninth lens element 990 and the image surface 996, and will not affect the focal length of the imaging optical lens assembly. The image sensor 999 is disposed on or near the image surface 996 of the imaging optical lens assembly.

The detailed optical data of the 9th embodiment are shown in Table 17 and the aspheric surface data are shown in Table 18 below.

TABLE 17

9th Embodiment
f = 6.91 mm, Fno = 1.88, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.694 | | | | |
| 2 | Lens 1 | 2.825 | (ASP) | 0.982 | Plastic | 1.545 | 56.0 | 5.58 |
| 3 | | 35.104 | (ASP) | 0.043 | | | | |
| 4 | Lens 2 | 10.206 | (ASP) | 0.340 | Plastic | 1.614 | 26.0 | −13.33 |
| 5 | | 4.483 | (ASP) | 0.452 | | | | |
| 6 | Lens 3 | 13.692 | (ASP) | 0.254 | Plastic | 1.656 | 21.3 | −64.97 |
| 7 | | 10.287 | (ASP) | 0.145 | | | | |
| 8 | Stop | Plano | | 0.122 | | | | |
| 9 | Lens 4 | −76.366 | (ASP) | 0.529 | Plastic | 1.544 | 55.9 | 61.43 |
| 10 | | −23.293 | (ASP) | −0.236 | | | | |
| 11 | Stop | Plano | | 0.412 | | | | |
| 12 | Lens 5 | −114.846 | (ASP) | 0.554 | Plastic | 1.544 | 55.9 | 10.59 |
| 13 | | −5.491 | (ASP) | 0.042 | | | | |
| 14 | Lens 6 | −5.976 | (ASP) | 0.379 | Plastic | 1.679 | 18.4 | −11.63 |
| 15 | | −25.137 | (ASP) | 0.549 | | | | |
| 16 | Lens 7 | 5.369 | (ASP) | 0.442 | Plastic | 1.705 | 14.0 | 24.38 |
| 17 | | 7.543 | (ASP) | 0.520 | | | | |
| 18 | Lens 8 | −64.124 | (ASP) | 0.509 | Plastic | 1.607 | 26.6 | 9.08 |
| 19 | | −5.093 | (ASP) | 0.728 | | | | |
| 20 | Lens 9 | −6.135 | (ASP) | 0.702 | Plastic | 1.607 | 26.6 | −4.01 |
| 21 | | 4.217 | (ASP) | 0.600 | | | | |
| 22 | IR-cut filter | Plano | | 0.210 | Glass | 1.517 | 64.2 | — |
| 23 | | Plano | | 0.221 | | | | |
| 24 | Image | Plano | | 0.000 | | | | |

Note:
Reference wavelength is 587.6 nm (d-line).
An effective radius of the stop 901 (Surface 8) is 1.740 mm.
An effective radius of the stop 902 (Surface 11) is 1.900 mm.

TABLE 18

Aspheric Coefficients

| Surface # | 2 | 3 | 4 | 5 | 6 |
|---|---|---|---|---|---|
| k = | −6.6829E−01 | −5.3676E+01 | −3.3020E+00 | 1.6576E+00 | −4.4309E−01 |
| A4 = | 4.6187E−03 | −8.5044E−04 | −7.2062E−03 | −9.0811E−03 | −1.9867E−02 |
| A6 = | 1.0000E−03 | 4.7649E−03 | 7.1572E−03 | 3.5368E−03 | −1.2586E−03 |
| A8 = | −6.3711E−04 | −3.4534E−03 | −3.2961E−03 | −6.9493E−04 | 1.2019E−03 |
| A10 = | 5.2868E−04 | 1.4494E−03 | 1.0437E−03 | 2.9888E−04 | 2.1217E−04 |
| A12 = | −2.2755E−04 | −3.9798E−04 | −1.4841E−04 | −2.1194E−05 | 6.5373E−06 |
| A14 = | 5.1338E−05 | 6.6666E−05 | 9.2252E−06 | 1.8588E−05 | −1.8117E−05 |
| A16 = | −5.1031E−06 | −5.4549E−06 | — | — | — |

| Surface # | 7 | 9 | 10 | 12 | 13 |
|---|---|---|---|---|---|
| k = | 1.4816E+01 | −1.0000E+00 | 6.1520E+01 | −1.0000E+00 | 3.9283E+00 |
| A4 = | −1.6963E−02 | −6.5090E−03 | −1.6230E−02 | −1.4642E−02 | 3.8966E−02 |
| A6 = | −1.5611E−03 | −2.9914E−03 | −9.4687E−03 | −1.7912E−02 | −6.9411E−02 |
| A8 = | 1.4545E−03 | 2.5937E−03 | 1.1553E−02 | 1.5078E−02 | 5.3271E−02 |
| A10 = | 3.3376E−04 | −3.2449E−03 | −9.2638E−03 | −9.3147E−03 | −2.4733E−02 |
| A12 = | −2.3966E−05 | 2.4211E−03 | 4.5939E−03 | 3.7069E−03 | 7.0559E−03 |
| A14 = | −1.7587E−05 | −9.3555E−04 | −1.3272E−03 | −8.2446E−04 | −1.1892E−03 |
| A16 = | — | 1.8684E−04 | 2.0724E−04 | 8.3966E−05 | 1.0793E−04 |
| A18 = | — | −1.4822E−05 | −1.3256E−05 | 9.8172E−08 | −4.0438E−06 |
| A20 = | — | — | — | −4.7679E−07 | — |

| Surface # | 14 | 15 | 16 | 17 | 18 |
|---|---|---|---|---|---|
| k = | 1.2099E+00 | −1.0000E+00 | −1.1057E+01 | −5.3785E+00 | −9.9000E+01 |
| A4 = | 1.3503E−02 | −3.1508E−02 | −1.3156E−02 | −9.8672E−03 | 1.2501E−02 |
| A6 = | −4.1093E−02 | 1.0502E−02 | −1.6423E−03 | −5.5679E−03 | −4.9453E−03 |
| A8 = | 3.5740E−02 | −3.4360E−03 | 1.6633E−03 | 3.3124E−03 | −7.4805E−04 |
| A10 = | −1.6966E−02 | 7.6903E−04 | −9.2191E−04 | −1.2981E−03 | 4.4999E−04 |
| A12 = | 4.7596E−03 | −9.1782E−05 | 2.6329E−04 | 3.2753E−04 | −6.9115E−05 |
| A14 = | −7.7971E−04 | −5.0900E−06 | −4.3010E−05 | −5.2528E−05 | 4.6713E−06 |
| A16 = | 6.9375E−05 | 3.9018E−06 | 3.6930E−06 | 5.1529E−06 | −1.3197E−07 |
| A18 = | −2.6132E−06 | −5.0660E−07 | −1.2581E−07 | −2.7904E−07 | 1.1947E−09 |
| A20 = | — | 2.0882E−08 | — | 6.3413E−09 | −1.8828E−11 |

TABLE 18-continued

| Aspheric Coefficients | | | |
|---|---|---|---|
| Surface # | 19 | 20 | 21 |
| k = | −1.0000E+00 | −2.6084E+01 | −1.0247E+00 |
| A4 = | 3.2535E−02 | −1.4580E−02 | −2.3999E−02 |
| A6 = | −5.2618E−03 | −2.6715E−03 | 2.3427E−03 |
| A8 = | −1.7750E−03 | 1.0402E−03 | −1.1337E−04 |
| A10 = | 8.7610E−04 | −1.4866E−04 | −9.3825E−06 |
| A12 = | −1.6070E−04 | 1.5796E−05 | 2.2660E−06 |
| A14 = | 1.6046E−05 | −1.4502E−06 | −2.0007E−07 |
| A16 = | −9.2098E−07 | 1.0317E−07 | 9.4070E−09 |
| A18 = | 2.8630E−08 | −5.0091E−09 | −2.1316E−10 |
| A20 = | −3.7436E−10 | 1.5219E−10 | 4.3607E−13 |
| A22 = | — | −2.5900E−12 | 7.2483E−14 |
| A24 = | — | 1.8757E−14 | −9.8123E−16 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 6.91 | TL/ImgH | 1.40 |
| Fno | 1.88 | TL/[ImgH × tan(CRA)] | 2.18 |
| HFOV [deg.] | 40.0 | (R15 + R16)/(R15 − R16) | 1.17 |
| FOV [deg.] | 80.0 | |f/R15| + |f/R16| | 1.47 |
| V1/N1 | 36.27 | |f/R16| + |f/R17| | 2.48 |
| V2/N2 | 16.09 | R18/ImgH | 0.70 |
| V3/N3 | 12.84 | Y92/BL | 4.78 |
| V4/N4 | 36.23 | Yc92/Yc81 | 1.97 |
| V5/N5 | 36.23 | MaxET9/ET9 | 2.00 |
| V6/N6 | 10.98 | Y_MaxET9/Y92 | 0.66 |
| V7/N7 | 8.21 | f/f1 | 1.24 |
| V8/N8 | 16.57 | f/f2 | −0.52 |
| V9/N9 | 16.57 | f/f3 | −0.11 |
| V20 | 2 | f/f4 | 0.11 |
| V26 | 4 | f/f5 | 0.65 |
| V40 | 6 | f/f6 | −0.59 |
| Vmin | 14.0 | f/f7 | 0.28 |
| Td/ΣCT | 1.59 | f/f8 | 0.76 |
| TL/f | 1.23 | f/f9 | −1.72 |

10th Embodiment

Figure 19:
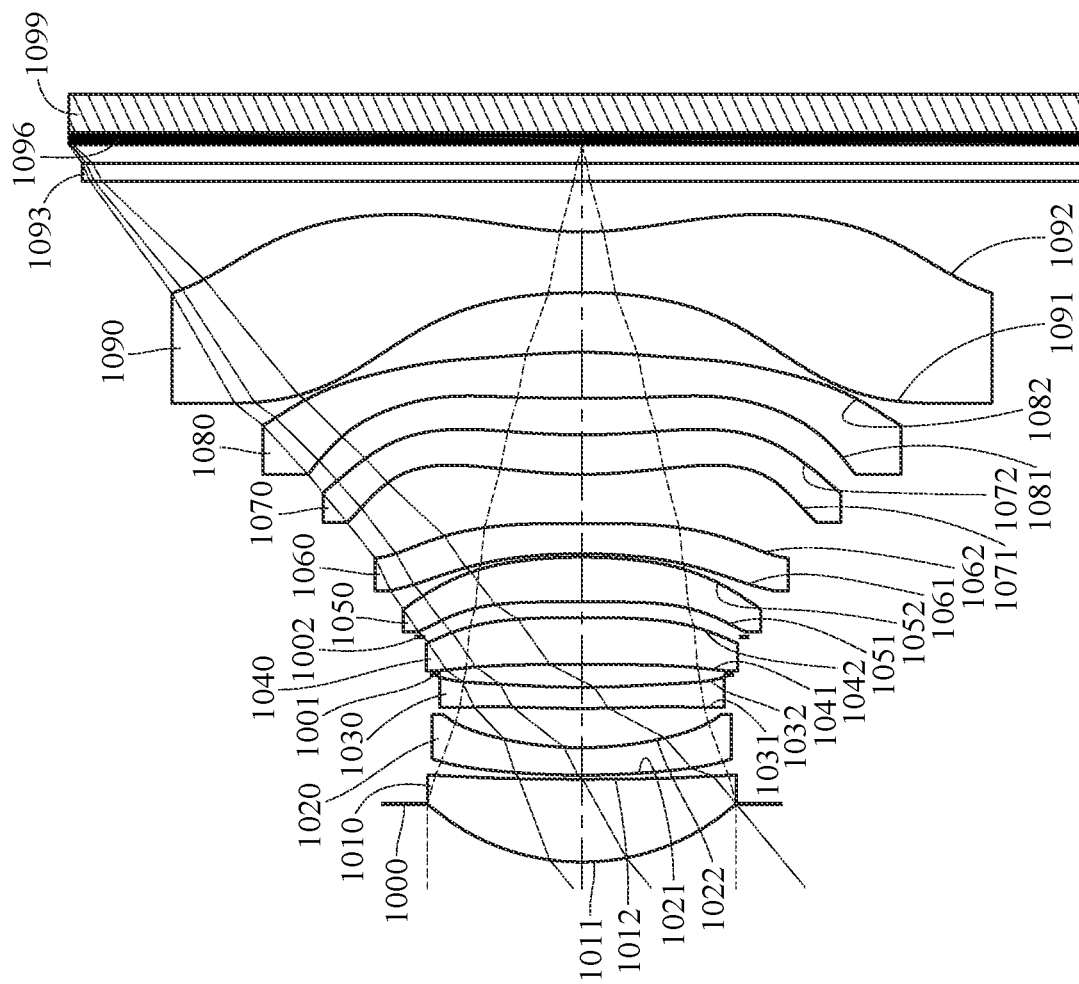
FIG. 19 is a schematic view of an image capturing unit according to the 10th embodiment of the present disclosure.
Figure 20:
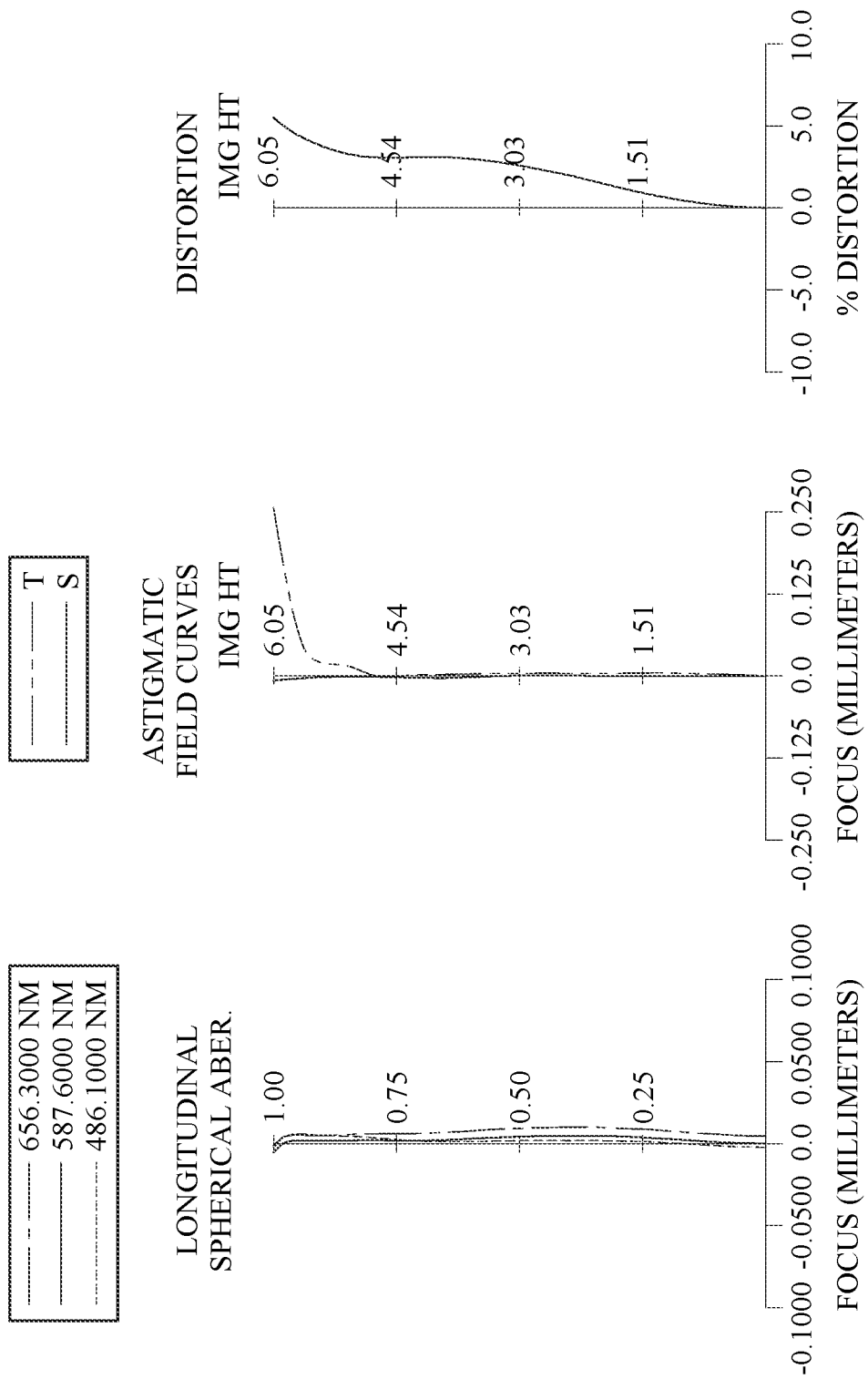
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging optical lens assembly (its reference numeral is omitted) of the present disclosure and an image sensor 1099. The imaging optical lens assembly includes, in order from an object side to an image side along an optical path, an aperture stop 1000, a first lens element 1010, a second lens element 1020, a third lens element 1030, a stop 1001, a fourth lens element 1040, a stop 1002, a fifth lens element 1050, a sixth lens element 1060, a seventh lens element 1070, an eighth lens element 1080, a ninth lens element 1090, an IR-cut filter 1093 and an image surface 1096. The imaging optical lens assembly includes nine lens elements (1010, 1020, 1030, 1040, 1050, 1060, 1070, 1080 and 1090) with no additional lens element disposed between each of the adjacent nine lens elements, wherein there is an air gap between each of all adjacent lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with positive refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric.

The sixth lens element 1060 with negative refractive power has an object-side surface 1061 being concave in a paraxial region thereof and an image-side surface 1062 being convex in a paraxial region thereof. The sixth lens element 1060 is made of plastic material and has the object-side surface 1061 and the image-side surface 1062 being both aspheric.

The seventh lens element 1070 with positive refractive power has an object-side surface 1071 being convex in a paraxial region thereof and an image-side surface 1072 being concave in a paraxial region thereof. The seventh lens element 1070 is made of plastic material and has the object-side surface 1071 and the image-side surface 1072 being both aspheric.

The eighth lens element 1080 with positive refractive power has an object-side surface 1081 being convex in a paraxial region thereof and an image-side surface 1082 being convex in a paraxial region thereof. The eighth lens element 1080 is made of plastic material and has the object-side surface 1081 and the image-side surface 1082 being both aspheric. The object-side surface 1081 of the eighth lens element 1080 has at least one critical point in an off-axis region thereof.

The ninth lens element 1090 with negative refractive power has an object-side surface 1091 being concave in a paraxial region thereof and an image-side surface 1092 being concave in a paraxial region thereof. The ninth lens element 1090 is made of plastic material and has the object-side surface 1091 and the image-side surface 1092 being both aspheric. The image-side surface 1092 of the ninth lens element 1090 has at least one convex critical point in an off-axis region thereof.

The IR-cut filter 1093 is made of glass material and located between the ninth lens element 1090 and the image surface 1096, and will not affect the focal length of the imaging optical lens assembly. The image sensor 1099 is disposed on or near the image surface 1096 of the imaging optical lens assembly.

The detailed optical data of the 10th embodiment are shown in Table 19 and the aspheric surface data are shown in Table 20 below.

TABLE 19

10th Embodiment
f = 6.95 mm, Fno = 1.90, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.687 | | | | |
| 2 | Lens 1 | 2.798 | (ASP) | 0.980 | Plastic | 1.545 | 56.1 | 5.49 |
| 3 | | 38.155 | (ASP) | 0.051 | | | | |
| 4 | Lens 2 | 9.661 | (ASP) | 0.325 | Plastic | 1.634 | 23.8 | −11.92 |
| 5 | | 4.186 | (ASP) | 0.465 | | | | |
| 6 | Lens 3 | 13.008 | (ASP) | 0.250 | Plastic | 1.634 | 23.8 | −56.17 |
| 7 | | 9.457 | (ASP) | 0.146 | | | | |
| 8 | Stop | Plano | | 0.124 | | | | |
| 9 | Lens 4 | −160.829 | (ASP) | 0.559 | Plastic | 1.544 | 56.0 | 40.80 |
| 10 | | −19.531 | (ASP) | −0.232 | | | | |
| 11 | Stop | Plano | | 0.417 | | | | |
| 12 | Lens 5 | −87.174 | (ASP) | 0.530 | Plastic | 1.544 | 56.0 | 10.67 |
| 13 | | −5.452 | (ASP) | 0.040 | | | | |
| 14 | Lens 6 | −6.753 | (ASP) | 0.360 | Plastic | 1.639 | 23.5 | −12.07 |
| 15 | | −55.496 | (ASP) | 0.582 | | | | |
| 16 | Lens 7 | 5.700 | (ASP) | 0.467 | Plastic | 1.669 | 19.5 | 27.56 |
| 17 | | 7.981 | (ASP) | 0.435 | | | | |
| 18 | Lens 8 | 42.012 | (ASP) | 0.544 | Plastic | 1.583 | 30.2 | 9.26 |
| 19 | | −6.161 | (ASP) | 0.708 | | | | |
| 20 | Lens 9 | −5.807 | (ASP) | 0.719 | Plastic | 1.583 | 30.2 | −3.99 |
| 21 | | 4.058 | (ASP) | 0.600 | | | | |
| 22 | IR-cut filter | Plano | | 0.210 | Glass | 1.517 | 64.2 | — |
| 23 | | Plano | | 0.221 | | | | |
| 24 | Image | Plano | | 0.000 | | | | |

Note:
Reference wavelength is 587.6 nm (d-line).
An effective radius of the stop 1001 (Surface 8) is 1.700 mm.
An effective radius of the stop 1002 (Surface 11) is 1.880 mm.

TABLE 20

Aspheric Coefficients

| Surface # | 2 | 3 | 4 | 5 | 6 |
|---|---|---|---|---|---|
| k = | −6.6400E−01 | −9.8871E+01 | −4.9918E+00 | 1.6727E+00 | −4.9062E−01 |
| A4 = | 4.7045E−03 | 6.3619E−04 | −5.9798E−03 | −9.1343E−03 | −1.9034E−02 |
| A6 = | 1.0143E−03 | 1.5075E−03 | 3.7937E−03 | 2.8227E−03 | −1.8819E−03 |
| A8 = | −6.7722E−04 | −1.0022E−03 | −6.0774E−03 | −1.0701E−04 | 1.2069E−03 |
| A10 = | 5.5329E−04 | 4.6922E−04 | 1.1223E−04 | 3.0061E−04 | 5.9344E−04 |
| A12 = | −2.4377E−04 | −1.7732E−04 | 1.9076E−06 | −9.1259E−05 | −1.9503E−04 |
| A14 = | 5.6436E−05 | 3.9110E−05 | 3.2693E−07 | 3.1300E−05 | 1.0102E−05 |
| A16 = | −5.8131E−06 | −3.9791E−06 | — | — | — |

| Surface # | 7 | 9 | 10 | 12 | 13 |
|---|---|---|---|---|---|
| k = | 1.4821E+01 | −1.0000E+00 | 5.9415E+01 | −1.0000E+00 | 3.8796E+00 |
| A4 = | −1.7052E−02 | −7.4775E−03 | −1.7726E−02 | −1.7212E−02 | 3.3209E−02 |
| A6 = | −1.4916E−03 | −1.2034E−03 | −5.6439E−03 | −1.2738E−02 | −5.5131E−02 |
| A8 = | 9.8084E−04 | 1.7483E−04 | 6.8535E−03 | 8.0921E−03 | 3.7938E−02 |

TABLE 20-continued

| Aspheric Coefficients | | | | | |
|---|---|---|---|---|---|
| A10 = | 9.0014E−04 | −9.8039E−04 | −5.5846E−03 | −3.6300E−03 | −1.5781E−02 |
| A12 = | −2.4969E−04 | 1.0844E−03 | 2.7567E−03 | 6.2287E−04 | 3.8698E−03 |
| A14 = | 1.0721E−05 | −4.5207E−04 | −7.6414E−04 | 2.9698E−04 | −4.5460E−04 |
| A16 = | — | 9.0070E−05 | 1.1185E−04 | −1.7031E−04 | −2.5758E−06 |
| A18 = | — | −6.7487E−06 | −6.5707E−06 | 3.1901E−05 | 6.0046E−06 |
| A20 = | — | — | — | −2.1383E−06 | −4.1743E−07 |

| Surface # | 14 | 15 | 16 | 17 | 18 |
|---|---|---|---|---|---|
| k = | 1.1589E+00 | −1.0000E+00 | −9.1401E+00 | −3.9951E+00 | −1.0000E+00 |
| A4 = | 1.0125E−02 | −3.1368E−02 | −1.2311E−02 | −9.0099E−03 | 1.4436E−02 |
| A6 = | −3.1668E−02 | 1.0766E−02 | −1.4882E−03 | −6.2642E−03 | −9.5985E−03 |
| A8 = | 2.4814E−02 | −4.5202E−03 | 1.5973E−03 | 3.6247E−03 | 1.5984E−03 |
| A10 = | −1.0222E−02 | 1.6753E−03 | −9.9906E−04 | −1.4213E−03 | −2.9240E−04 |
| A12 = | 2.3188E−03 | −4.7911E−04 | 3.3216E−04 | 3.6518E−04 | 9.6058E−05 |
| A14 = | −2.4218E−04 | 9.0500E−05 | −6.7548E−05 | −5.9823E−05 | −2.0486E−05 |
| A16 = | −2.0329E−06 | −9.7680E−06 | 8.4535E−06 | 5.9867E−06 | 2.3646E−06 |
| A18 = | 2.6902E−06 | 5.4402E−07 | −6.5777E−07 | −3.3242E−07 | −1.5219E−07 |
| A20 = | −1.7053E−07 | −1.2918E−08 | 3.4208E−08 | 8.0403E−09 | 5.4662E−09 |
| A22 = | — | — | −1.2164E−09 | −2.1215E−11 | −1.0872E−10 |
| A24 = | — | — | 2.0121E−11 | 2.1319E−13 | 1.2260E−12 |

| Surface # | 19 | 20 | 21 |
|---|---|---|---|
| k = | −1.0000E+00 | −2.2133E+01 | −1.0000E+00 |
| A4 = | 3.5134E−02 | −2.1407E−02 | −3.0787E−02 |
| A6 = | −8.4824E−03 | 2.1159E−03 | 5.5685E−03 |
| A8 = | −4.5745E−04 | −5.7986E−04 | −9.3214E−04 |
| A10 = | 5.6348E−04 | 1.8076E−04 | 1.2087E−04 |
| A12 = | −1.1364E−04 | −2.6925E−05 | −1.1463E−05 |
| A14 = | 1.1399E−05 | 2.1823E−06 | 7.8601E−07 |
| A16 = | −6.1913E−07 | −1.0001E−07 | −3.9182E−08 |
| A18 = | 1.5981E−08 | 2.2925E−09 | 1.4078E−09 |
| A20 = | −4.3130E−11 | −6.0557E−12 | −3.4645E−11 |
| A22 = | −5.2559E−12 | −8.0063E−13 | 5.1743E−13 |
| A24 = | 4.5775E−14 | 1.1693E−14 | −3.4888E−15 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 6.95 | TL/ImgH | 1.41 |
| Fno | 1.90 | TL/[ImgH × tan(CRA)] | 1.73 |
| HFOV [deg.] | 39.5 | (R15 + R16)/(R15 − R16) | 0.74 |
| FOV [deg.] | 79.0 | \|f/R15\| + \|f/R16\| | 1.29 |
| V1/N1 | 36.30 | \|f/R16\| + \|f/R17\| | 2.32 |
| V2/N2 | 14.59 | R18/ImgH | 0.67 |
| V3/N3 | 14.59 | Y92/BL | 4.71 |
| V4/N4 | 36.26 | Yc92/Yc81 | 1.61 |
| V5/N5 | 36.26 | MaxET9/ET9 | 1.50 |
| V6/N6 | 14.34 | Y_MaxET9/Y92 | 0.67 |
| V7/N7 | 11.65 | f/f1 | 1.27 |
| V8/N8 | 19.11 | f/f2 | −0.58 |
| V9/N9 | 19.11 | f/f3 | −0.12 |
| V20 | 1 | f/f4 | 0.17 |
| V26 | 4 | f/f5 | 0.65 |
| V40 | 6 | f/f6 | −0.58 |
| Vmin | 19.5 | f/f7 | 0.25 |
| Td/ΣCT | 1.58 | f/f8 | 0.75 |
| TL/f | 1.22 | f/f9 | −1.74 |

11th Embodiment

Figure 21:
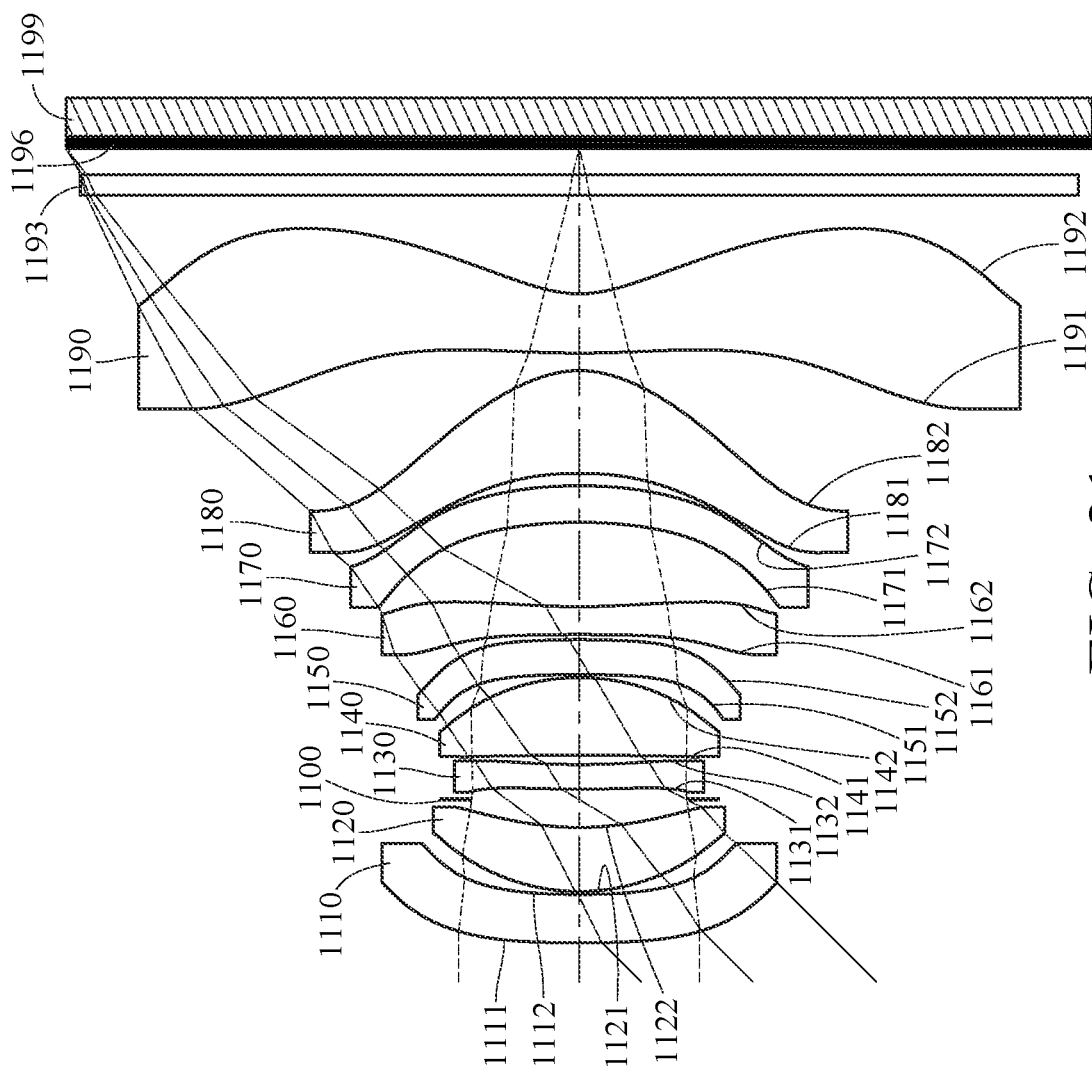
FIG. 21 is a schematic view of an image capturing unit according to the 11th embodiment of the present disclosure.
Figure 22:
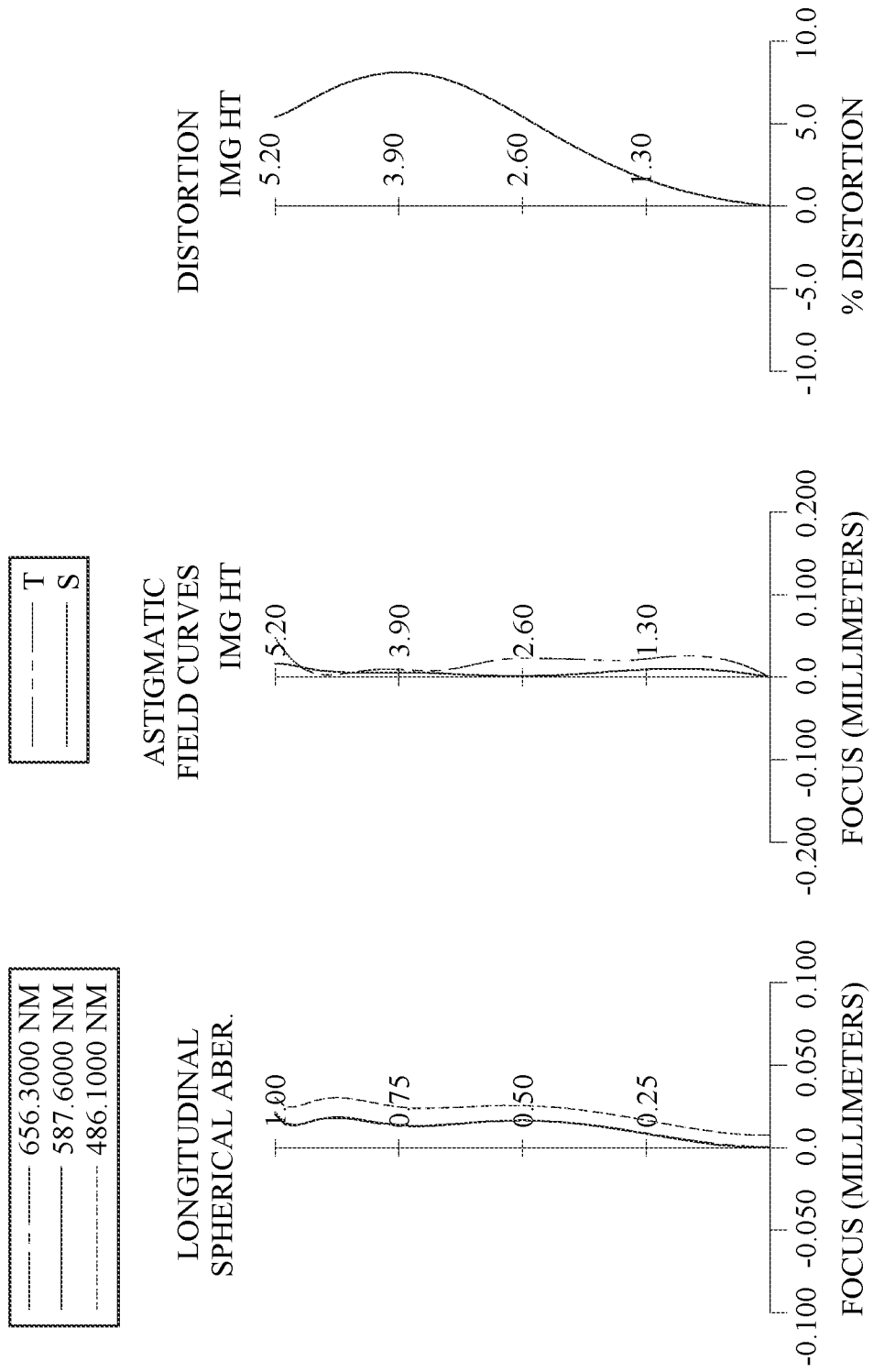
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging optical lens assembly (its reference numeral is omitted) of the present disclosure and an image sensor 1199. The imaging optical lens assembly includes, in order from an object side to an image side along an optical path, a first lens element 1110, a second lens element 1120, an aperture stop 1100, a third lens element 1130, a fourth lens element 1140, a fifth lens element 1150, a sixth lens element 1160, a seventh lens element 1170, an eighth lens element 1180, a ninth lens element 1190, an IR-cut filter 1193 and an image surface 1196. The imaging optical lens assembly includes nine lens elements (1110, 1120, 1130, 1140, 1150, 1160, 1170, 1180 and 1190) with no additional lens element disposed between each of the adjacent nine lens elements, wherein there is an air gap between each of all adjacent lens elements.

The first lens element 1110 with negative refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric.

The second lens element 1120 with positive refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with negative refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with positive refractive power has an object-side surface 1141 being concave in a paraxial region thereof and an image-side surface 1142 being convex in a paraxial region thereof. The fourth lens element 1140 is made of plastic material and has the object-side surface 1141 and the image-side surface 1142 being both aspheric.

The fifth lens element 1150 with positive refractive power has an object-side surface 1151 being concave in a paraxial region thereof and an image-side surface 1152 being convex in a paraxial region thereof. The fifth lens element 1150 is made of plastic material and has the object-side surface 1151 and the image-side surface 1152 being both aspheric.

The sixth lens element 1160 with negative refractive power has an object-side surface 1161 being concave in a paraxial region thereof and an image-side surface 1162 being concave in a paraxial region thereof. The sixth lens element 1160 is made of plastic material and has the object-side surface 1161 and the image-side surface 1162 being both aspheric.

The seventh lens element 1170 with positive refractive power has an object-side surface 1171 being concave in a paraxial region thereof and an image-side surface 1172 being convex in a paraxial region thereof. The seventh lens element 1170 is made of plastic material and has the object-side surface 1171 and the image-side surface 1172 being both aspheric.

The eighth lens element 1180 with positive refractive power has an object-side surface 1181 being concave in a paraxial region thereof and an image-side surface 1182 being convex in a paraxial region thereof. The eighth lens element 1180 is made of plastic material and has the object-side surface 1181 and the image-side surface 1182 being both aspheric. The object-side surface 1181 of the eighth lens element 1180 has at least one critical point in an off-axis region thereof. The image-side surface 1182 of the eighth lens element 1180 has at least one critical point in an off-axis region thereof.

The ninth lens element 1190 with negative refractive power has an object-side surface 1191 being convex in a paraxial region thereof and an image-side surface 1192 being concave in a paraxial region thereof. The ninth lens element 1190 is made of plastic material and has the object-side surface 1191 and the image-side surface 1192 being both aspheric. The image-side surface 1192 of the ninth lens element 1190 has at least one convex critical point in an off-axis region thereof.

The IR-cut filter 1193 is made of glass material and located between the ninth lens element 1190 and the image surface 1196, and will not affect the focal length of the imaging optical lens assembly. The image sensor 1199 is disposed on or near the image surface 1196 of the imaging optical lens assembly.

The detailed optical data of the 11th embodiment are shown in Table 21 and the aspheric surface data are shown in Table 22 below.

TABLE 21

11th Embodiment
f = 4.91 mm, Fno = 2.01, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 16.974 | (ASP) | 0.490 | Plastic | 1.639 | 23.5 | −26.65 |
| 2 | | 8.403 | (ASP) | 0.030 | | | | |
| 3 | Lens 2 | 2.054 | (ASP) | 0.650 | Plastic | 1.566 | 37.4 | 8.90 |
| 4 | | 3.071 | (ASP) | 0.282 | | | | |
| 5 | Ape. Stop | Plano | | 0.106 | | | | |
| 6 | Lens 3 | 10.118 | (ASP) | 0.250 | Plastic | 1.607 | 26.6 | −55.53 |
| 7 | | 7.710 | (ASP) | 0.096 | | | | |
| 8 | Lens 4 | −36.039 | (ASP) | 0.786 | Plastic | 1.544 | 56.0 | 4.29 |
| 9 | | −2.210 | (ASP) | 0.030 | | | | |
| 10 | Lens 5 | −14.198 | (ASP) | 0.355 | Plastic | 1.639 | 23.5 | 26.67 |
| 11 | | −7.818 | (ASP) | 0.052 | | | | |
| 12 | Lens 6 | −16.996 | (ASP) | 0.282 | Plastic | 1.669 | 19.5 | −6.97 |
| 13 | | 6.464 | (ASP) | 0.857 | | | | |
| 14 | Lens 7 | −4.637 | (ASP) | 0.371 | Plastic | 1.705 | 14.0 | 271.49 |
| 15 | | −4.677 | (ASP) | 0.126 | | | | |
| 16 | Lens 8 | −3.622 | (ASP) | 1.042 | Plastic | 1.559 | 40.4 | 2.33 |
| 17 | | −1.056 | (ASP) | 0.177 | | | | |
| 18 | Lens 9 | 9.722 | (ASP) | 0.602 | Plastic | 1.639 | 23.5 | −2.10 |
| 19 | | 1.148 | (ASP) | 1.000 | | | | |
| 20 | IR-cut filter | Plano | | 0.210 | Glass | 1.517 | 64.2 | — |
| 21 | | Plano | | 0.264 | | | | |
| 22 | Image | Plano | | 0.000 | | | | |

Note:
Reference wavelength is 587.6 nm (d-line).
An effective radius of the object-side surface 1141 (Surface 8) is 1.300 mm.
An effective radius of the image-side surface 1162 (Surface 13) is 2.000 mm.

TABLE 22

Aspheric Coefficients

| Surface # | 1 | 2 | 3 | 4 | 6 |
|---|---|---|---|---|---|
| k = | 3.5774E+01 | 2.3181E+01 | 2.1341E−01 | −7.4643E+00 | 0.0000E+00 |
| A4 = | 4.0601E−02 | 5.8646E−02 | −2.7128E−03 | 5.4480E−03 | −3.9646E−02 |
| A6 = | −1.1707E−02 | −4.9023E−02 | −3.8213E−02 | −2.9464E−03 | −1.2490E−02 |
| A8 = | 5.3660E−03 | 7.0804E−02 | 5.9916E−02 | −1.0440E−02 | −9.8735E−04 |
| A10 = | −1.2089E−03 | −6.6766E−02 | −4.8482E−02 | 4.9934E−02 | −8.7028E−04 |
| A12 = | −1.3820E−04 | 4.4323E−02 | 2.1379E−02 | −1.1255E−01 | 1.4471E−03 |
| A14 = | 2.0408E−04 | −1.9986E−02 | −3.9351E−03 | 1.4263E−01 | −1.3207E−03 |
| A16 = | −6.2267E−05 | 5.9429E−03 | — | −1.0219E−01 | — |
| A18 = | 8.3542E−06 | −1.0227E−03 | — | 3.8320E−02 | — |
| A20 = | −4.2796E−07 | 6.8562E−05 | — | −5.8739E−03 | — |

| Surface # | 7 | 8 | 9 | 10 | 11 |
|---|---|---|---|---|---|
| k = | 0.0000E+00 | −1.0000E+00 | −7.6400E+00 | 3.6668E+01 | 2.0145E+01 |
| A4 = | −1.9417E−02 | −9.0353E−04 | −1.1135E−01 | −2.9516E−02 | 1.0278E−01 |
| A6 = | −1.1486E−03 | 6.1162E−03 | 5.9761E−02 | −5.7901E−02 | −2.7114E−01 |
| A8 = | −1.3672E−02 | −6.3434E−03 | −2.1571E−02 | 8.9447E−02 | 2.6279E−01 |
| A10 = | 1.2746E−02 | −3.6766E−03 | −1.4156E−02 | −9.9620E−02 | −1.6230E−01 |
| A12 = | −5.3040E−03 | 6.0278E−03 | 1.8112E−02 | 6.0446E−02 | 6.3451E−02 |
| A14 = | 1.0533E−03 | −1.3616E−03 | −7.3213E−03 | −1.9817E−02 | −1.4604E−02 |
| A16 = | — | — | 1.1867E−03 | 2.7109E−03 | 1.5261E−03 |

| Surface # | 12 | 13 | 14 | 15 | 16 |
|---|---|---|---|---|---|
| k = | 3.8252E+01 | 5.0512E+00 | −4.9734E+00 | 0.0000E+00 | −3.5211E−02 |
| A4 = | 6.2669E−02 | −5.0299E−02 | −1.7701E−02 | −5.6697E−02 | −1.1450E−01 |
| A6 = | −1.7500E−01 | 2.1301E−02 | 1.8344E−02 | 9.6587E−02 | 1.4531E−01 |
| A8 = | 1.5958E−01 | −1.5155E−02 | −4.0442E−02 | −9.8387E−02 | −1.1528E−01 |
| A10 = | −7.8256E−02 | 1.3296E−02 | 3.3423E−02 | 5.6419E−02 | 5.8452E−02 |
| A12 = | 2.1693E−02 | −8.6896E−03 | −1.5740E−02 | −2.0293E−02 | −1.8825E−02 |
| A14 = | −3.1440E−03 | 3.4453E−03 | 4.4559E−03 | 4.6899E−03 | 3.8351E−03 |
| A16 = | 1.8463E−04 | −8.0673E−04 | −7.0166E−04 | −6.7120E−04 | −4.7726E−04 |
| A18 = | — | 1.0276E−04 | 4.6659E−05 | 5.3892E−05 | 3.3062E−05 |
| A20 = | — | −5.4031E−06 | — | −1.8524E−06 | −9.7687E−07 |

| Surface # | 17 | 18 | 19 |
|---|---|---|---|
| k = | −3.7044E+00 | 9.1826E−01 | −5.3302E+00 |
| A4 = | −9.2335E−02 | −2.5802E−02 | −2.2012E−02 |
| A6 = | 6.0704E−02 | 5.6123E−03 | 6.6653E−03 |
| A8 = | −3.4952E−02 | −1.3075E−03 | −1.7253E−03 |
| A10 = | 1.4752E−02 | 2.0160E−04 | 3.2452E−04 |
| A12 = | −3.9687E−03 | −1.7702E−05 | −4.3579E−05 |
| A14 = | 6.6967E−04 | 7.6153E−07 | 4.1415E−06 |
| A16 = | −6.8968E−05 | 1.5250E−09 | −2.7602E−07 |
| A18 = | 3.9704E−06 | −1.8774E−09 | 1.2607E−08 |
| A20 = | −9.8077E−08 | 9.3004E−11 | −3.7534E−10 |
| A22 = | — | −2.0296E−12 | 6.5490E−12 |
| A24 = | — | 1.7462E−14 | −5.0647E−14 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 4.91 | TL/ImgH | 1.55 |
| Fno | 2.01 | TL/[ImgH × tan(CRA)] | 2.64 |
| HFOV [deg.] | 45.1 | (R15 + R16)/(R15 − R16) | 1.82 |
| FOV [deg.] | 90.2 | |f/R15| + |f/R16| | 6.01 |
| V1/N1 | 14.34 | |f/R16| + |f/R17| | 5.16 |
| V2/N2 | 23.91 | R18/ImgH | 0.22 |
| V3/N3 | 16.57 | Y92/BL | 3.03 |

-continued

| 11th Embodiment | | | |
|---|---|---|---|
| V4/N4 | 36.26 | Yc92/Yc81 | 1.15 |
| V5/N5 | 14.34 | MaxET9/ET9 | 1.58 |
| V6/N6 | 11.65 | Y_MaxET9/Y92 | 0.75 |
| V7/N7 | 8.21 | f/f1 | −0.18 |
| V8/N8 | 25.95 | f/f2 | 0.55 |
| V9/N9 | 14.34 | f/f3 | −0.09 |
| V20 | 2 | f/f4 | 1.14 |
| V26 | 4 | f/f5 | 0.18 |
| V40 | 6 | f/f6 | −0.70 |
| Vmin | 14.0 | f/f7 | 0.02 |
| Td/ΣCT | 1.36 | f/f8 | 2.11 |
| TL/f | 1.64 | f/f9 | −2.34 |

12th Embodiment

Figure 23:
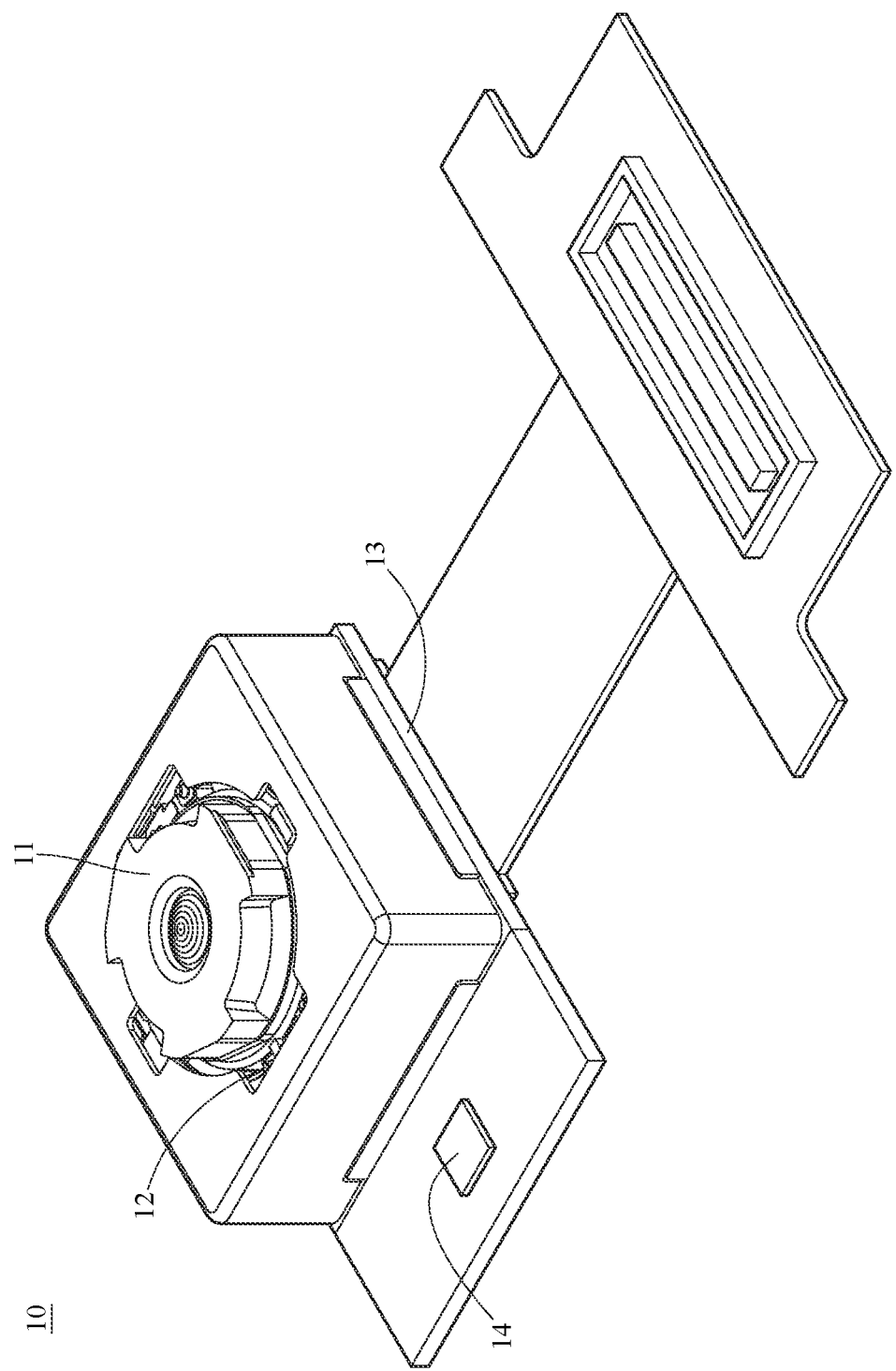
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 10 is a camera module including a lens unit 11, a driving device 12, an image sensor 13 and an image stabilizer 14. The lens unit 11 includes the imaging optical lens assembly disclosed in the 1st embodiment, a barrel and a holder member (their reference numerals are omitted) for holding the imaging optical lens assembly. However, the lens unit 11 may alternatively be provided with the imaging optical lens assembly disclosed in other embodiments, the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

13th Embodiment

Figure 24:
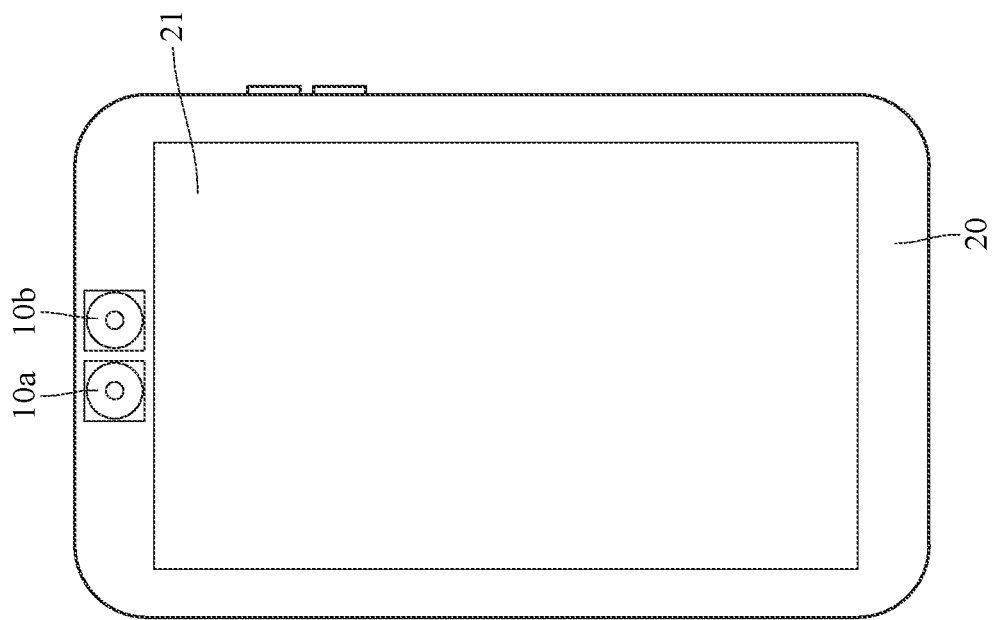
FIG. 24 is a perspective view of an electronic device according to the 13th embodiment of the present disclosure.

FIG. 24 is a perspective view of an electronic device according to the 13th embodiment of the present disclosure.

In this embodiment, an electronic device 20 is a smartphone including an image capturing unit 10a, an image capturing unit 10b and a display unit 21, wherein the image capturing unit 10a includes the imaging optical lens assembly disclosed in the 2nd embodiment. In FIG. 24, the image capturing units 10a, 10b and the display unit 21 are disposed on the same side of the electronic device 20, such that the image capturing units 10a and 10b can be front-facing cameras of the electronic device 20 for taking selfies, but the present disclosure is not limited thereto.

The image capturing unit 10a is a standard image capturing unit, and the image capturing unit 10b is a ToF (time of flight) image capturing unit, wherein the image capturing unit 10b can determine depth information of the imaged object. In this embodiment, the electronic device 20 includes multiple image capturing units 10a and 10b, but the present disclosure is not limited to the number and arrangement of image capturing units.

14th Embodiment

Figure 25:
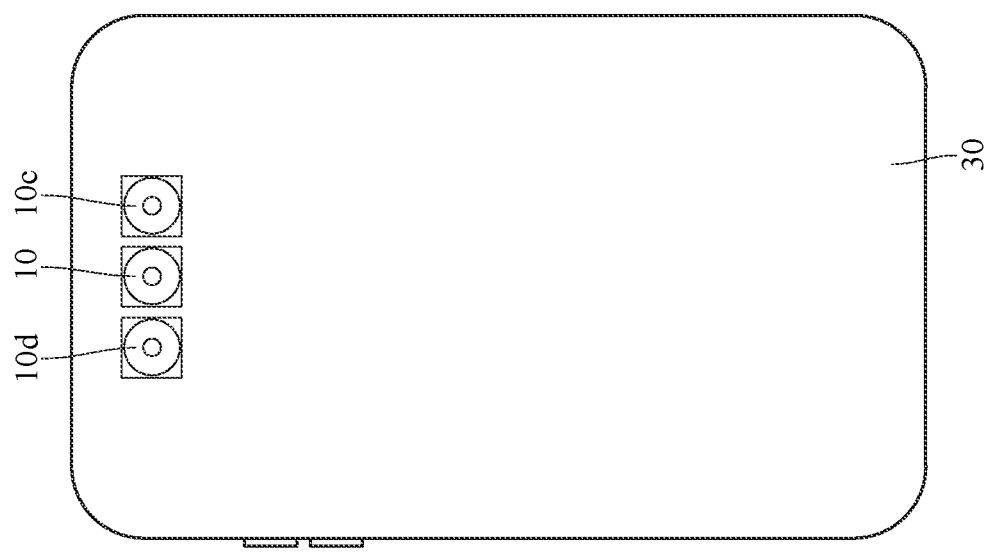
FIG. 25 is a perspective view of an electronic device according to the 14th embodiment of the present disclosure.

FIG. 25 is a perspective view of an electronic device according to the 14th embodiment of the present disclosure.

In this embodiment, an electronic device 30 is a smartphone including the image capturing unit 10 disclosed in the 12th embodiment, an image capturing unit 10c, an image capturing unit 10d and a display unit (not shown in the figure), wherein the image capturing unit 10c includes the imaging optical lens assembly disclosed in the 9th embodiment. In FIG. 25, the image capturing units 10, 10c and 10d are disposed on the same side of the electronic device 30, and the display unit is disposed on another side of the electronic device 30.

The image capturing unit 10 is a wide-angle image capturing unit, the image capturing unit 10c is a standard image capturing unit, and the image capturing unit 10d is a telephoto image capturing unit. In this embodiment, the image capturing units 10, 10c and 10d have different fields of view, wherein the maximum fields of view of each two of the image capturing units 10, 10c, and 10d can differ by at least 20 degrees. As such, the electronic device 30 has various magnification ratios so as to meet the requirement of optical zoom functionality. Moreover, the maximum fields of view of each two of the image capturing units 10, 10c and 10d can differ by at least 30 degrees. Moreover, the maximum fields of view of each two of the image capturing units 10, 10c and 10d can differ by at least 40 degrees. Moreover, the maximum fields of view of each two of the image capturing units 10, 10c and 10d can differ by at least 60 degrees. Moreover, the maximum field of view of the image capturing unit 10 is 122.4 degrees, the maximum field of view of the image capturing unit 10c is 80.0 degrees, and the maximum field of view of the image capturing unit 10d can range between 15 and 45 degrees. The electronic device 30 includes multiple image capturing units 10, 10c and 10d, but the present disclosure is not limited to the number and arrangement of image capturing units.

15th Embodiment

Figure 26:
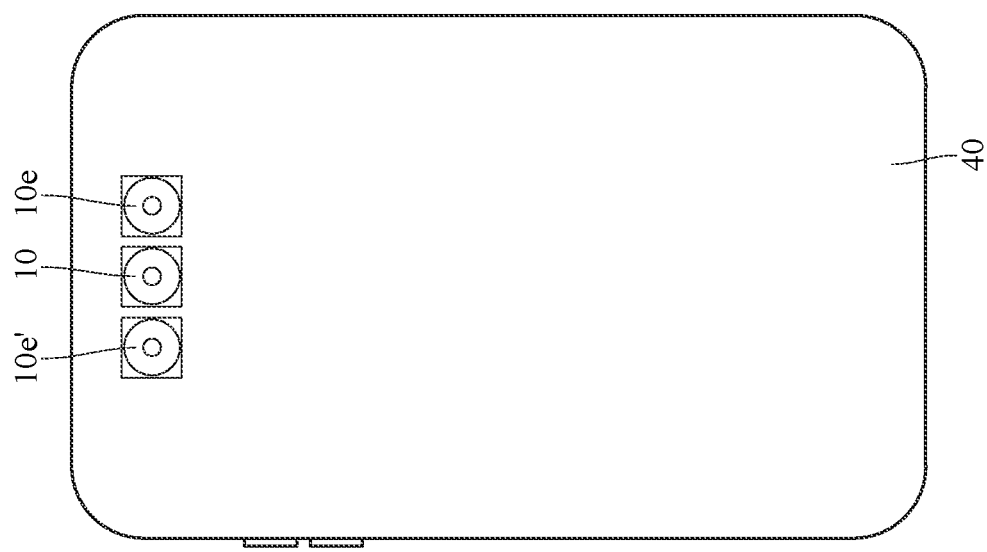
FIG. 26 is a perspective view of an electronic device according to the 15th embodiment of the present disclosure.

FIG. 26 is a perspective view of an electronic device according to the 15th embodiment of the present disclosure.

In this embodiment, an electronic device 40 is a smartphone including the image capturing unit 10 disclosed in the 12th embodiment, an image capturing unit 10e, an image capturing unit 10e' and a display unit (not shown in the figure), wherein the image capturing unit 10e includes the imaging optical lens assembly disclosed in the 9th embodiment. In FIG. 26 and the image capturing unit 10e' includes the imaging optical lens assembly disclosed in the 2nd embodiment, the image capturing units 10, 10e and 10e' are disposed on the same side of the electronic device 40, and the display unit is disposed on another side of the electronic device 40.

The image capturing unit 10 is a wide-angle image capturing unit, the image capturing unit 10e is a telephoto image capturing unit, and the image capturing unit 10e' is an ultra-wide-angle image capturing unit. In this embodiment, the image capturing units 10, 10e and 10e' have different fields of view, wherein the maximum field of view of the image capturing unit 10 and the maximum field of view of the image capturing unit 10e can differ by at least 20 degrees. As such, the electronic device 40 has various magnification ratios so as to meet the requirement of optical zoom functionality. Moreover, the maximum fields of view of the image capturing units 10 and 10e can differ by at least 30 degrees. Moreover, the maximum fields of view of the image capturing units 10 and 10e can differ by at least 40 degrees. Specifically, the maximum field of view of the image capturing unit 10 is 122.4 degrees, the maximum field of view of the image capturing unit 10e is 80.0 degrees, and the maximum field of view of the image capturing unit 10 and the maximum field of view of the image capturing unit 10e differs by 42.4 degrees. The electronic device 40 includes multiple image capturing units 10, 10e and 10e', but the present disclosure is not limited to the number and arrangement of image capturing units.

16th Embodiment

Figure 27:
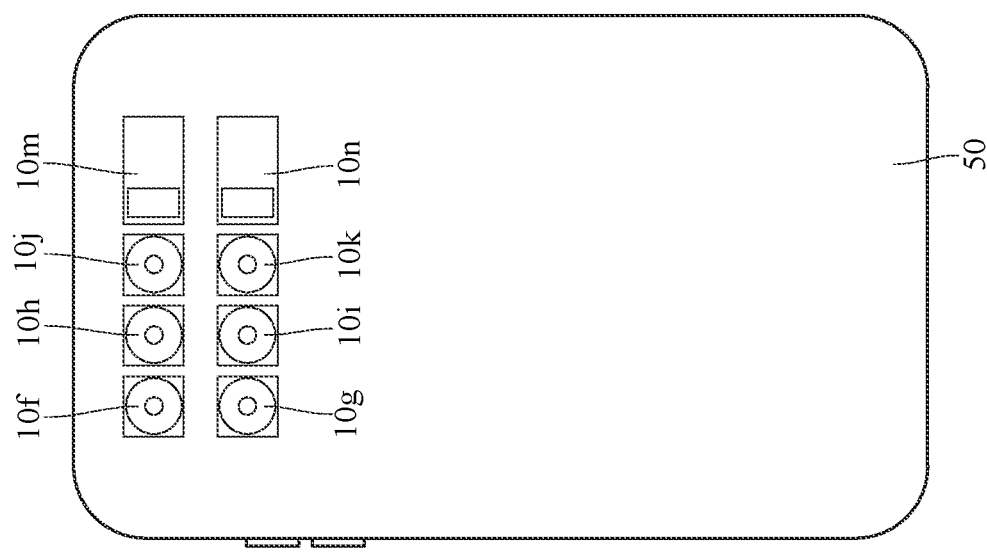
FIG. 27 is one perspective view of an electronic device according to the 16th embodiment of the present disclosure.

FIG. 27 is a perspective view of an electronic device according to the 16th embodiment of the present disclosure.

In this embodiment, an electronic device 50 is a smartphone including an image capturing unit 10f, an image capturing unit 10g, an image capturing unit 10h, an image capturing unit 10i, an image capturing unit 10j, an image capturing unit 10k, an image capturing unit 10m, an image capturing unit 10n and a display unit (not shown in the figure), wherein the image capturing unit 10h or 10i includes the imaging optical lens assembly disclosed in the 7th embodiment. The image capturing units 10f, 10g, 10h, 10i, 10j, 10k, 10m, 10n are disposed on the same side of the electronic device 50, and the display unit is disposed on another side of the electronic device 50.

The image capturing units 10f and 10g are ultra-wide-angle image capturing units, the image capturing units 10h, 10i are wide-angle image capturing units, the image capturing units 10j, 10k are telephoto image capturing units, and the image capturing units 10m, 10n are telephoto image capturing units configured with light-folding element(s). The image capturing units 10m, 10n with light-folding element(s) may respectively have a configuration, for example, similar to that as shown in FIG. 31, FIG. 32 or FIG. 33, and a description in this regard will not be provided again. In this embodiment, the image capturing units 10f, 10g, 10h, 10i, 10j, 10k, 10m, 10n have different fields of view, such that the electronic device 50 has various magnification ratios so as to meet the requirement of optical zoom functionality. The electronic device 50 includes multiple image capturing units 10f, 10g, 10h, 10i, 10j, 10k, 10m, 10n, but the present disclosure is not limited to the number and arrangement of image capturing units.

The smartphone in this embodiment is only exemplary for showing the image capturing units 10, 10a, 10c and 10e of the disclosure installed in an electronic device, and the present disclosure is not limited thereto. The image capturing units 10, 10a, 10c and 10e can be optionally applied to optical systems with a movable focus. Furthermore, the imaging optical lens assembly of the image capturing units 10, 10a, 10c and 10e feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising nine lens elements, and the nine lens elements being, in order from an object side to an image side along an optical path, a first lens element, a second lens element, a third lens element, a fourth lens element, a fifth lens element, a sixth lens element, a seventh lens element, an eighth lens element and a ninth lens element, and each of the nine lens elements having an object-side surface facing toward the object side and an image-side surface facing toward the image side;
  wherein the first lens element has positive refractive power, the second lens element has negative refractive power, the eighth lens element has positive refractive power, the ninth lens element has negative refractive power, and the image-side surface of the ninth lens element is concave in a paraxial region thereof and has at least one convex critical point in an off-axis region thereof;
  wherein a focal length of the imaging optical lens assembly is f, a focal length of the ninth lens element is f9, a total number of lens elements having an Abbe number smaller than 40 in the imaging optical lens assembly is V40, and the following conditions are satisfied:

$$-3.0 < f/f9 < -1.0; \text{ and}$$

$$4 \le V40;$$

wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the i-th lens element is Ni, and at least one lens element of the imaging optical lens assembly satisfies the following condition:

$$6.0 < Vi/Ni \le 11.7, \text{ wherein } i=1, 2, 3, 4, 5, 6, 7, 8, \text{ or } 9.$$

2. The imaging optical lens assembly of claim 1, wherein a curvature radius of the object-side surface of the eighth lens element is R15, a curvature radius of the image-side surface of the eighth lens element is R16, and the following condition is satisfied:

$$-0.75 < (R15+R16)/(R15-R16).$$

3. The imaging optical lens assembly of claim 1, wherein the image-side surface of the eighth lens element is convex in a paraxial region thereof.

4. The imaging optical lens assembly of claim 1, wherein the object-side surface of the ninth lens element is concave in a paraxial region thereof, and an absolute value of a curvature radius of the object-side surface of the ninth lens element is larger than an absolute value of a curvature radius of the image-side surface of the ninth lens element.

5. The imaging optical lens assembly of claim 1, wherein the image-side surface of the seventh lens element is concave in a paraxial region thereof, and a central thickness of the fourth lens element is larger than a central thickness of the second lens element.

6. The imaging optical lens assembly of claim 1, wherein the focal length of the imaging optical lens assembly is f, a focal length of the eighth lens element is f8, and the following condition is satisfied:

$0.75 \leq f/f8 < 4.0$.

7. The imaging optical lens assembly of claim 1, wherein a curvature radius of the image-side surface of the ninth lens element is R18, a maximum image height of the imaging optical lens assembly is ImgH, and the following condition is satisfied:

$0.59 \leq R18/ImgH < 1.0$.

8. The imaging optical lens assembly of claim 1, wherein an absolute value of a curvature radius of the object-side surface of the eighth lens element is larger than an absolute value of a curvature radius of the image-side surface of the second lens element.

9. The imaging optical lens assembly of claim 1, wherein the Abbe number of the fourth lens element is larger than the Abbe number of the ninth lens element.

10. An image capturing unit, comprising:
   the imaging optical lens assembly of claim 1; and
   an image sensor disposed on an image surface of the imaging optical lens assembly.

11. An electronic device, comprising at least two image capturing units which face a same direction, wherein the at least two image capturing units comprise the image capturing unit of claim 10, maximum fields of view of the at least two image capturing units are different from each other, and the maximum fields of view of the at least two image capturing units differ by at least 20 degrees.

12. The electronic device of claim 11, wherein the maximum fields of view of the at least two image capturing units differ by at least 40 degrees.

* * * * *